United States Patent
Yusa et al.

(10) Patent No.: US 9,421,704 B2
(45) Date of Patent: Aug. 23, 2016

(54) METHOD FOR PRODUCING MOLDED PRODUCT, METHOD FOR PRODUCING MOLDED PRODUCT HAVING PLATING FILM, METHOD FOR PRODUCING RESIN PELLET, FOAM MOLDED PRODUCT HAVING PLATING FILM, FOAM INJECTION MOLDING METHOD, NOZZLE UNIT, AND INJECTION MOLDING APPARATUS

(71) Applicant: HITACHI MAXELL, LTD., Ibaraki-shi, Osaka (JP)

(72) Inventors: Atsushi Yusa, Nagaokakyo (JP); Satoshi Yamamoto, Settsu (JP); Tetsuya Ano, Takatsuki (JP); Hironori Ota, Ibaraki (JP); Masahiro Oshima, Otsu (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/016,861

(22) Filed: Sep. 3, 2013

(65) Prior Publication Data
US 2014/0004335 A1 Jan. 2, 2014

Related U.S. Application Data

(63) Continuation of application No. PCT/JP2013/055724, filed on Mar. 1, 2013.

(30) Foreign Application Priority Data

Mar. 2, 2012 (JP) .................................. 2012-046723
Mar. 8, 2012 (JP) .................................. 2012-052230
Mar. 30, 2012 (JP) .................................. 2012-081870

(51) Int. Cl.
B29C 44/56 (2006.01)
B29B 7/42 (2006.01)
(Continued)

(52) U.S. Cl.
CPC ............. *B29C 44/5681* (2013.01); *B29B 7/421* (2013.01); *B29B 7/90* (2013.01);
(Continued)

(58) Field of Classification Search
CPC .......... B29C 45/00; B29C 47/00; C08K 3/02; C08K 2003/2282; C08K 3/10
See application file for complete search history.

(56) References Cited

U.S. PATENT DOCUMENTS 4,098,860 A * 7/1978 Etou et al. ................... 264/210.7
5,997,781 A * 12/1999 Nishikawa et al. .......... 264/45.1
(Continued)

FOREIGN PATENT DOCUMENTS

JP    B2 2625576        7/1997
JP    A 2002-322288     11/2002
(Continued)

OTHER PUBLICATIONS

Adams, C. P. et. al, PLOS ONE, Jan. 2014, vol. 9 (1).*
(Continued)

*Primary Examiner* — Monica Huson
(74) *Attorney, Agent, or Firm* — Oliff PLC

(57) ABSTRACT

There is provided a method for producing a molded product of which surface is modified by a functional material using a molding machine such as a general-purpose injection molding machine or extrusion molding machine. The method for producing the molded product includes: mixing a block copolymer having a hydrophilic segment with the functional material; mixing the block copolymer, which has been mixed with the functional material, with a thermoplastic resin; and molding the thermoplastic resin in which the functional material and the block copolymer are mixed.

12 Claims, 14 Drawing Sheets

(51) Int. Cl.

| | | |
|---|---|---|
| B29B 9/06 | (2006.01) | |
| B29B 9/16 | (2006.01) | |
| C08K 3/10 | (2006.01) | |
| C08L 71/02 | (2006.01) | |
| C08L 77/06 | (2006.01) | |
| C23C 22/00 | (2006.01) | |
| B29B 9/12 | (2006.01) | |
| C08L 77/02 | (2006.01) | |
| C08L 77/12 | (2006.01) | |
| B29B 7/90 | (2006.01) | |
| B29C 47/36 | (2006.01) | |
| B29C 47/44 | (2006.01) | |
| B29C 47/54 | (2006.01) | |
| B29C 47/60 | (2006.01) | |
| B29C 47/66 | (2006.01) | |
| B29C 47/92 | (2006.01) | |
| B29C 47/10 | (2006.01) | |
| B29C 44/34 | (2006.01) | |
| B29C 44/42 | (2006.01) | |
| B29C 45/18 | (2006.01) | |
| B29C 45/52 | (2006.01) | |
| B29C 47/00 | (2006.01) | |
| B29B 7/84 | (2006.01) | |
| B29B 9/14 | (2006.01) | |
| B29K 503/06 | (2006.01) | |
| B29K 105/04 | (2006.01) | |
| B29C 45/17 | (2006.01) | |
| B29C 45/60 | (2006.01) | |
| B29K 105/00 | (2006.01) | |

(52) U.S. Cl.
CPC .. *B29B 9/06* (2013.01); *B29B 9/12* (2013.01); *B29B 9/16* (2013.01); *B29C 44/3461* (2013.01); *B29C 44/42* (2013.01); *B29C 45/1816* (2013.01); *B29C 45/52* (2013.01); *B29C 47/0004* (2013.01); *B29C 47/1063* (2013.01); *B29C 47/366* (2013.01); *B29C 47/369* (2013.01); *B29C 47/44* (2013.01); *B29C 47/54* (2013.01); *B29C 47/605* (2013.01); *B29C 47/6012* (2013.01); *B29C 47/6018* (2013.01); *B29C 47/6056* (2013.01); *B29C 47/661* (2013.01); *B29C 47/667* (2013.01); *B29C 47/92* (2013.01); *C08K 3/10* (2013.01); *C08L 71/02* (2013.01); *C08L 77/02* (2013.01); *C08L 77/06* (2013.01); *C08L 77/12* (2013.01); *C23C 22/00* (2013.01); *B29B 7/422* (2013.01); *B29B 7/845* (2013.01); *B29B 9/14* (2013.01); *B29C 2045/1722* (2013.01); *B29C 2045/605* (2013.01); *B29C 2947/926* (2013.01); *B29C 2947/92514* (2013.01); *B29C 2947/92704* (2013.01); *B29K 2105/0011* (2013.01); *B29K 2105/046* (2013.01); *B29K 2503/06* (2013.01); *B29K 2995/0063* (2013.01); *B29K 2995/0092* (2013.01); *C08G 2261/126* (2013.01); *Y10T 428/24999* (2015.04); *Y10T 428/249953* (2015.04); *Y10T 428/249976* (2015.04); *Y10T 428/249986* (2015.04)

(56) References Cited

U.S. PATENT DOCUMENTS

| | | | | |
|---|---|---|---|---|
| 6,120,790 | A * | 9/2000 | Kuratsuji et al. | 424/443 |
| 8,088,326 | B2 | 1/2012 | Yusa et al. | |
| 8,168,098 | B2 | 5/2012 | Yusa et al. | |
| 2007/0190310 | A1* | 8/2007 | Yusa et al. | 428/323 |
| 2007/0264451 | A1 | 11/2007 | Yusa et al. | |
| 2008/0038453 | A1 | 2/2008 | Yusa et al. | |
| 2008/0241514 | A1* | 10/2008 | Yusa et al. | 428/328 |
| 2010/0025880 | A1 | 2/2010 | Ano et al. | |
| 2010/0065990 | A1 | 3/2010 | Yusa et al. | |
| 2011/0305940 | A1* | 12/2011 | Usami | B29C 44/04 429/144 |

FOREIGN PATENT DOCUMENTS

| | | |
|---|---|---|
| JP | A 2003-175533 | 6/2003 |
| JP | A 2005-280362 | 10/2005 |
| JP | A 2006-69215 | 3/2006 |
| JP | B2 3845191 | 11/2006 |
| JP | A 2007-130982 | 5/2007 |
| JP | A 2008-144197 | 6/2008 |
| JP | A 2008-247962 | 10/2008 |
| JP | A 2008-255390 | 10/2008 |
| JP | B2 4160623 | 10/2008 |
| JP | A 2010-30106 | 2/2010 |
| JP | A 2010-46952 | 3/2010 |
| WO | WO 92/17533 A1 | 10/1992 |

OTHER PUBLICATIONS

Dabi, S. et a. EP0476963(A2)—Mar. 25, 1992.*
May 7, 2013 Written Opinion issued in International Patent Application No. PCT/JP2013/055724 (with translation).
May 7, 2013 Search Report issued in International Patent Application No. PCT/JP2013/055724 (with translation).
Jun. 19, 2015 Partial Supplementary European Search Report issued in European Application No. 13753253.7.

* cited by examiner

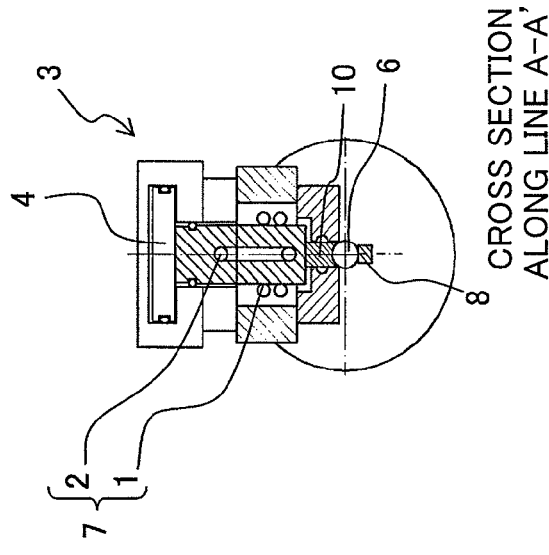
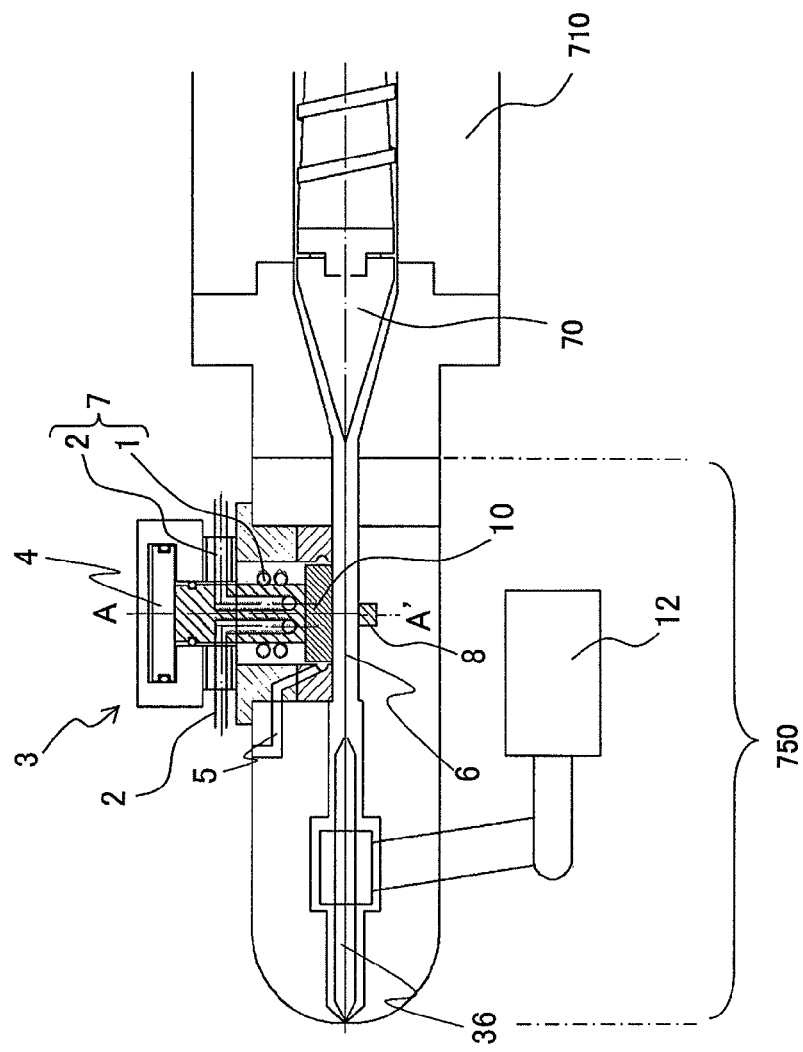
Fig. 12B
Fig. 12A

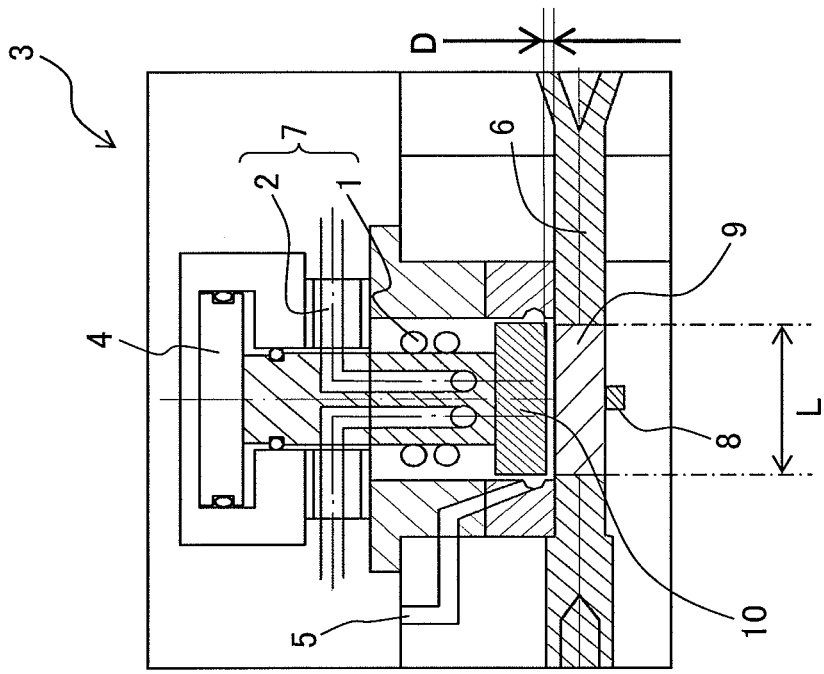
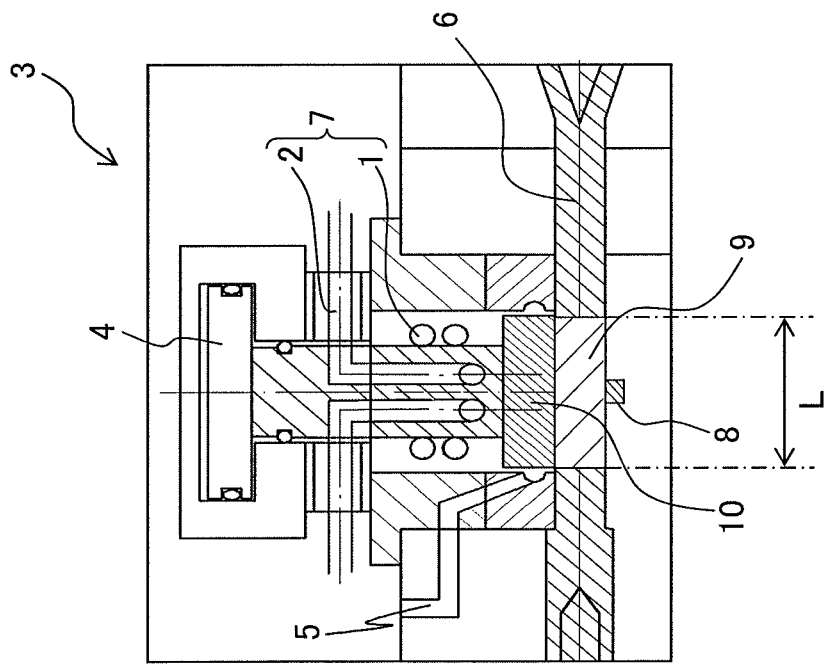
Fig. 13A
Fig. 13B

METHOD FOR PRODUCING MOLDED PRODUCT, METHOD FOR PRODUCING MOLDED PRODUCT HAVING PLATING FILM, METHOD FOR PRODUCING RESIN PELLET, FOAM MOLDED PRODUCT HAVING PLATING FILM, FOAM INJECTION MOLDING METHOD, NOZZLE UNIT, AND INJECTION MOLDING APPARATUS

CROSS REFERENCE TO RELATED APPLICATION

This application is a Continuation application of International Application No. PCT/JP2013/055724 which was filed on Mar. 1, 2013 claiming the conventional priority of Japanese patent Application No. 2012-046723 filed on Mar. 2, 2012, Japanese patent Application No. 2012-052230 filed on Mar. 8, 2012 and Japanese patent Application No. 2012-081870 filed on Mar. 30, 2012, the disclosure of which is incorporated herein by reference in its entirety.

BACKGROUND OF THE INVENTION

1. Field of the Invention

The present invention relates to a method for producing a molded product, a method for producing a molded product having a plating film, a method for producing a resin pellet, and a foam molded product having a plating film. Further, the present invention relates to a foam injection molding method.

2. Description of the Related Art

As a method for forming a metal film on a molded product at low cost, there has been known an electroless plating method. In the electroless plating method, in order to ensure tight contact performance of the metal film to the molded product, it is performed a pretreatment in which the surface of the molded product is roughened by using an etching solution including an oxidizing agent such as hexavalent chromic acid, permanganic acid, or the like. Thus, ABS resin (acrylonitrile-butadiene-styrene copolymer synthetic resin) eroded by the etching solution has been mainly used in the electroless plating method. Butadiene rubber component of the ABS resin is selectively eroded by the etching solution, thereby forming concavity and convexity on the surface of the ABS resin. On the other hand, regarding a resin other than the ABS resin such as polycarbonate or the like, plating grade, which is mixed with the component, such as the ABS resin, elastomer, or the like, selectively oxidized by the etching solution, is commercially available so as to enable the electroless plating. However, the pretreatment for the electroless plating method has a problem such that environmental burden is heavy, because hexavalent chromic acid, permanganic acid, or the like is used.

Meanwhile, as a method for forming the metal film on the molded product without the etching step as the pretreatment, there has been suggested use of a surface modification method of the molded product in which pressurized carbon dioxide such as supercritical carbon dioxide is used. The inventors of the present invention have suggested a method in which the surface modification process using pressurized carbon dioxide is performed along with injection molding to disperse metallic fine particles, such as palladium, which function as the catalyst cores of the electroless plating, on the surface of the molded product (Japanese Patent Application Laid-open No. 2005-280362, Japanese Patent Application Laid-open No. 2010-30106 and Japanese Patent No. 4160623). In this method, by performing the electroless plating with respect to the surface of the molded product including the metallic fine particles, it is possible to form a plating film on the surface of the molded product without the etching step.

Further, Japanese Patent Application Laid-open No. 2007-130982 suggests as follows. That is, another functional material is used, instead of the metallic fine particles, in the surface modification method of the molded product using pressurized carbon dioxide such as supercritical carbon dioxide, thereby modifying the surface of the molded product to have highly advanced function property or high performance property.

Further, in recent years, a foam injection molding method using a physical foaming agent such as supercritical nitrogen, supercritical carbon dioxide, or the like has been studied and practically used (for example, Japanese Patent No. 2625576). This method is, for example, a technique or approach as follows. At first, the physical foaming agent is brought into contact with a resin plasticized and melted in a hermetically closed plasticizing cylinder, and the physical foaming agent and the resin plasticized and melted are compatibly dissolved with each other. Next, the molten resin in which the physical foaming agent is dissolved is weighed, while maintaining the high pressure in the plasticizing cylinder to such an extent that the physical foaming agent can be in a supercritical state, and the molten resin is injected and charged into a mold. The supercritical fluid compatibly dissolved in the molten resin upon the injection and charging is subjected to sudden pressure reduction and gasified. By solidifying the molten resin, foams (bubbles) are formed at the inside of the molded product.

The foam injection molding using the supercritical fluid is clean and any residue of the foaming agent does not remain as compared with foam molding using any chemical foaming agent. Further, since the foamed cell diameters become fine and minute, mechanical strength of the molded product is hardly lowered. Furthermore, since the high pressure physical foaming agent functions as a plasticizing agent for the molten resin, the following advantages are also provided. That is, resin viscosity is decreased upon the injection and charging and the fluidity is improved. Sink marks are suppressed, which would be otherwise caused by the shrinkage when the resin is solidified on account of the gas pressure upon the foaming. The latent heat is deprived from the interior of the molten resin upon the foaming and thus the cooling strain and the warpage are decreased.

As shown in FIG. 15, a general injection molding apparatus 4000 using the physical foaming agent such as the supercritical fluid includes a bomb 922 for supplying the physical foaming agent such as nitrogen, carbon dioxide, or the like, a high-pressure device 918 for raising pressure of the physical foaming agent and controlling the feed of the physical foaming agent, and a plasticizing cylinder 907 in which the resin is plasticized and melted and the resin is mixed with the physical foaming agent. The physical foaming agent is fed from the bomb 922 to the high-pressure device 918, and the pressure of the physical foaming agent is raised by the high-pressure device 918. Then, the physical foaming agent is introduced into the plasticizing cylinder 907 by an introducing valve 920, which is opened and closed intermittently, via an injection adjustment mechanism 917. The introduction amount of the physical foaming agent into the plasticizing cylinder 907 is, for example, adjusted by the following method. The physical foaming agent always circulates between the high-pressure device 918 and the injection adjustment mechanism 917. The pressure of a circulation system is higher than the pressure in the plasticizing cylinder 907 and a constant differential pressure is held with respect to the pressure in the plasticizing cylinder 907. The flow rate of the circulation system is constantly controlled by an orifice or the like incorporated into the high-pressure device 918. Then, the physical foaming agent is taken from the circulation system by opening and closing of the introducing valve 920 and introduced into the plasticizing cylinder 907. The introduction amount of the physical foaming agent is controlled by an open time of the introducing valve 920 and the like, based on the flow rate of the circulation system etc.

As described above, in order to provide the constant flow rate of the physical foaming agent to be supplied to the plasticizing cylinder 907, the system of the high-pressure device 918 in the conventional injection molding apparatus 4000 has complexity. Further, in order to obtain the stable flow rate of the physical foaming agent, it is necessary to prepare the physical foaming agent having pressure several times higher than the introduction pressure (for example, 30 to 40 MPa). Therefore, the injection molding apparatus 4000 needs a pump having a high ability and thus uneconomical.

Next, an explanation will be made about the plasticizing cylinder 907 of the injection molding apparatus 4000. As shown in FIG. 15, the plasticizing cylinder 907 includes a screw 921 which is arranged rotatably and movably back and forth in the plasticizing cylinder 907, a shutoff valve 915 provided at the forward end of the screw 921, and an introduction opening 919 through which a resin pellet is introduced. An unillustrated mold is provided in close contact with the forward end of the plasticizing cylinder 907. Further, the plasticizing cylinder 907 includes a plasticizing and melting zone 925 in which the resin introduced from the introduction opening 919 is plasticized and melted, a physical foaming agent kneading zone 926 in which the plasticized and melted resin and the physical foaming agent are kneaded, and a zone for again raising pressure 927 in which the molten resin in which the physical foaming agent is dissolved is weighed or measured. The introducing valve 920 through which the physical foaming agent is introduced is provided in the physical foaming agent kneading zone 926. Further, there is provided a seal mechanism such as a halved seal ring 924, between the plasticizing and melting zone 925 and the physical foaming agent kneading zone 926, to prevent the high pressure physical foaming agent from flowing backward in a right-hand direction in FIG. 15.

The physical foaming agent introduced into the plasticizing cylinder 907 is kneaded with the resin and the foam injection molding is performed by, for example, a technique or approach described below. At first, the resin pellet supplied from the introduction opening 919 is plasticized and melted in the plasticizing and melting zone 925. Next, the physical foaming agent introduced from the introducing valve 920 is sheared by rotation of the screw to be compatibly dissolved with the molten resin uniformly in the physical foaming agent kneading zone 926. Subsequently, the molten resin in which the physical foaming agent is dissolved is fed to the front of the screw 921 and weighed, while adjusting the pressure by back pressure, in the zone for again raising pressure 927. The screw 921 moves backward in the right-hand direction in FIG. 15 upon the weighing, and stops at a weighing position to accumulate the molten resin of a predetermined amount at the front of the screw 921. Thereafter, the shutoff valve 915 is opened to move the screw forward (left-land direction in FIG. 15) while controlling velocity, and the resin in which the physical foaming agent is dissolved is injected and charged into the mold (not shown). The volume of the physical foaming agent, which is subjected to the sudden pressure reduction in the mold, expands in the molten resin to form foams (bubbles). By solidifying the resin, fine closed foams of about several microns to about 100 microns are formed at the inside of the molded product.

In the foam injection molding, the low molecular physical foaming agent having low viscosity is partially separated from the surface of the molten resin and gasified upon the injection and charging, and then discharged into the mold before the molten resin. Regarding the molten resin injected into the mold, at first, the resin at the forefront of resin flow, referred to as a flow front, is cooled on a wall surface of the mold to form a skin layer of the molded product. Although a part of the gasified physical foaming agent is redissolved in the skin layer of the molten resin, since the skin layer of the molded product is cooled and solidified instantly by being brought into contact with the surface of the mold, the skin layer has high viscosity and is less likely to redissolve the gas. Therefore, the gas which is not redissolved remains at a gap between the wall surface of the mold and the skin layer of the molded product to form a concavity on the surface of the molded product. The concavity on the surface is referred to as a swirl mark, which is a problem in terms of poor appearance of the foam molded product.

Meanwhile, the inventors of the present invention have suggested a method for producing a foam molded plating product, in which the metallic fine particles functioning as the catalyst cores of the plating are segregated on the surface of the molded product concurrently with the physical foaming to be capable of performing the plating without any chemical agents having heavy environmental burden (for example, Japanese Patent Application Laid-open No. 2007-130982). Also in this method, there is a problem that remains to be solved that the foam molded product is manufactured to have a smooth surface in which the catalyst cores of the plating are dispersed.

As a technique for making the surface of the foam molded product smooth to prevent the occurrence of the poor appearance, improvement of the mold has been suggested. For example, in Japanese Patent No. 3845191, it has been suggested a method for avoiding the swirl mark by performing heat insulation of the surface of the mold. In this method, by twilling the surface of the mold with a base material having low thermal conductivity to provide heat insulation of the surface of the mold, growth of the skin layer is suppressed. Further, by facilitating redissolution of the gas, the swirl mark is avoided.

As another improvement of the mold, it has been also suggested a technique in which temperature of the surface of the mold is made to be high upon the injection and charging to control the growth of the skin layer. In this technique, the swirl mark is redissolved into the skin layer to disappear, and thereafter the mold is cooled to solidify the molded product. Accordingly, it is possible to form the foam molded product having a foamed layer therein and a smooth surface. As a method for heating the surface of the mold, a method for flowing steam through a temperature control channel, a method for embedding a heater, a method for heating a cavity by an electromagnetic induction heating method, and the like have been investigated.

The method for forming the metal film on the molded product without the etching step as the pretreatment, described in each of Japanese Patent Application Laid-open No. 2005-280362, Japanese Patent Application Laid-open No. 2010-30106 and Japanese Patent No. 4160623, requires a dedicated molding machine. Therefore, in the method suggested in each of Japanese Patent Application Laid-open No. 2005-280362, Japanese Patent Application Laid-open No. 2010-30106 and Japanese Patent No. 4160623, it is not possible to form the molded product subjected to the electroless plating without the etching step having heavy environmental burden by using a general-purpose molding machine. It is considered that popularization of the method described in each of Japanese Patent Application Laid-open No. 2005-280362, Japanese Patent Application Laid-open No. 2010-30106 and Japanese Patent No. 4160623 is prevented due to an inability to use the general-purpose molding machine.

Further, in the method described in each of Japanese Patent Application Laid-open No. 2005-280362, Japanese Patent Application Laid-open No. 2010-30106 and Japanese Patent No. 4160623, the plating film grows toward the surface of the molded product from the inside of the molded product by using the palladium in the molded product as the catalyst. In this situation, in a case that the palladium is not unevenly distributed in the vicinity of the surface, a plating solution penetrates deeply in search of the catalyst and the plating film grows from a deep portion in the molded product. Accordingly, the resin is stretched at the inside of the molded product to occur brittle failure, thereby decreasing tight contact force of the plating film. Further, in a case that density of the palladium in the vicinity of the surface of the molded product is lowered, an uniform plating film can not be formed and thereby the poor appearance such as unevenness of the plating and a pinhole may be caused.

Also in Japanese Patent Application Laid-open No. 2007-130982, in order to obtain the surface of the molded product having the highly advanced function property, the functional material is preferably unevenly distributed on the surface of the molded product.

The present teaching solves the first problem described above and provides a method for producing a molded product subjected to electroless plating without an etching step having heavy environmental burden by using a general-purpose molding machine. Further, there is provided a method for producing a molded product including a functional material such as metallic fine particles, wherein the functional material is efficiently arranged in the vicinity of the surface of the molded product to promote surface modification of the molded product.

In the foam injection molding method disclosed in Japanese Patent No. 3845191, a heat-insulating layer is formed by a film having low strength such as ceramic or resin to prevent occurrence of the poor appearance of the molded product. Thus, durability of the mold is decreased. Further, in the technique of Japanese Patent No. 3845191, although the growth of the skin layer can be suppressed, it is difficult to uniformly control growth speed and/or viscosity of the skin layer over a large area. Thus, there is problem such that the scope of application of the technique of Japanese Patent No. 3845191 is narrow. Furthermore, the technique in which the temperature of the surface of the mold is made to be high upon the injection and charging requires initial investment for facilities, and also there is problem such that cost per mold is expensive.

Hence, the improvement of the mold is not adopted actually, and the poor appearance of the molded product is often modified by application of coating. Development of a technique and apparatus for making the surface of the foam molded product smooth to prevent the occurrence of the poor appearance is strongly expected, but there is no essential solution, which prevents popularization of a physical-foam injection molding method.

An object of the present teaching is to solve the second problem described above and to provide a physical-foam injection molding method for making a surface of a foam molded product smooth to suppress occurrence of poor appearance, a nozzle unit using the same, and an injection molding apparatus including the nozzle unit.

SUMMARY OF THE INVENTION

According to the first aspect of the present teaching, there is provided a method for producing a molded product, comprising: mixing a block copolymer having a hydrophilic segment with a functional material; mixing the block copolymer, which has been mixed with the functional material, with a thermoplastic resin; and molding the thermoplastic resin in which the functional material and the block copolymer are mixed.

The mixing of the functional material with the block copolymer may be performed by making pressurized carbon dioxide in which the functional material is dissolved or dispersed come into contact with the block copolymer. The mixing of the functional material with the block copolymer may include: plasticizing and melting the block copolymer; mixing pressurized carbon dioxide in which the functional material is dissolved with the block copolymer plasticized and melted; molding the block copolymer mixed with the functional material by extrusion molding; and crushing the molded block copolymer mixed with the functional material to obtain a pellet.

The hydrophilic segment of the block copolymer may be polyether. Further, the hydrophilic segment of the block copolymer may be polyethylene oxide. The thermoplastic resin may have amide group. Further, the thermoplastic resin may be Nylon 6 or Nylon 6.6.

The molding of the thermoplastic resin may be molding by injection molding or extrusion molding. Further, the molding of the thermoplastic resin may include: plasticizing and melting the thermoplastic resin; mixing a physical foaming agent including at least one of pressurized carbon dioxide and pressurized nitrogen with the thermoplastic resin plasticized and melted; and foaming the thermoplastic resin including the physical foaming agent to mold a foam molded product.

The functional material may be metallic fine particles, palladium, or silver.

According to the second aspect of the present teaching, there is provided a method for producing a molded product having a plating film, including: producing the molded product by the method for producing the molded product as defined in the first aspect; and forming the plating film by making an electroless plating solution come into contact with a surface of the molded product.

The plating film may contain nickel.

According to the third aspect of the present teaching, there is provided a method for producing a resin pellet, including: plasticizing and melting a block copolymer having a hydrophilic segment; mixing pressurized carbon dioxide in which a functional material is dissolved with the block copolymer plasticized and melted; molding the block copolymer mixed with the functional material by extrusion molding; and crushing the molded the block copolymer mixed with the functional material.

The functional material may be metallic fine particles. Further, the functional material may contain silver or palladium.

The hydrophilic segment of the block copolymer may be polyether. Further, the hydrophilic segment of the block copolymer may be polyethylene oxide.

According to the fourth aspect of the present teaching, there is provided a method for producing a molded product having a plating film, including: preparing a resin pellet in which metallic fine particles are dispersed in a thermoplastic resin; plasticizing and melting the resin pellet to mold the molded product; and making an electroless plating solution come into contact with the molded product to form the plating film on a surface of the molded product.

The molding of the molded product may include: mixing a physical foaming agent including at least one of pressurized carbon dioxide and pressurized nitrogen with the resin pellet plasticized and melted; and foaming the resin pellet including the physical foaming agent to mold a foam molded product.

According to the fifth aspect of the present teaching, there is provided a method for producing a resin pellet, including: plasticizing and melting a thermoplastic resin; mixing pressurized carbon dioxide in which metallic fine particles are dissolved with the thermoplastic resin plasticized and melted; molding the thermoplastic resin mixed with the metallic fine particles by extrusion molding; and crushing the molded thermoplastic resin mixed with the metallic fine particles.

According to the sixth aspect of the present teaching, there is provided a foam molded product having a plating film produced by the method for producing the molded product having the plating film as defined in the fourth aspect.

The foam molded product having the plating film may include: a foam molded product including closed foam cells therein; and a plating film formed on a surface of the foam molded product including the closed foam cells therein. A metallic region, which is made of the same kind of metal as the plating film, may be formed in a depth area within 10 μm from the surface of the foam molded product on which the plating film is formed, and no closed foam cell may be substantially present in a range in which the metallic region is formed. A specific gravity may be not more than 1.2 g/cm$^3$. A weight change due to water absorption after immersion in water at 23 degrees Celsius for 24 hours may be not more than 0.5%. The foam molded product may be made of a thermoplastic resin having amide group. Further, the foam molded product may be made of Nylon 6 or Nylon 6.6. The plating film may contain nickel. The metallic fine particles may contain palladium. A thermal conductive material may be dispersed in an inside of the foam molded product.

According to the seventh aspect of the present teaching, there is provided a foam injection molding method, including: using an injection molding apparatus which includes a plasticizing cylinder, a mold, and a nozzle unit positioned between the plasticizing cylinder and the mold; plasticizing and melting a resin in the plasticizing cylinder; mixing a physical foaming agent with the resin plasticized and melted in the plasticizing cylinder; cooling the resin mixed with the physical foaming agent in the nozzle unit; discharging the physical foaming agent from the resin cooled in the nozzle unit; heating the resin from which the physical foaming agent has been discharged in the nozzle unit; and injecting and charging of the resin heated into the mold to obtain a foam molded product.

The discharge of the physical foaming agent from the resin may be discharge of the physical foaming agent from a flow front portion of the resin. A resin channel ranging from the plasticizing cylinder to the mold may be formed in the nozzle unit; and in a case that the physical foaming agent is discharged from the resin, a gap may be provided, in the resin channel, between the resin cooled and a wall surface foaming the resin channel. The physical foaming agent may be pressurized nitrogen or pressurized carbon dioxide. The mixing of the physical foaming agent with the resin may include: dissolving and dispersing metallic fine particles in the physical foaming agent; and mixing the metallic fine particles and the physical foaming agent with the resin.

According to the eighth aspect of the present teaching, there is provided a method for producing a molded product having a plating film, including: molding a foam molded product by the foam injection molding method as defined in the seventh aspect; and making an electroless plating solution come into contact with the foam molded product to form the plating film on a surface of the foam molded product.

The plating film may contain nickel.

BRIEF DESCRIPTION OF THE DRAWINGS

FIG. 3A shows a state in which the vent faces a discharge hole of a vent-up preventing cover and FIG. 3B shows a state in which the vent does not face the discharge hole of the vent-up preventing cover.

FIG. 12A schematically shows a nozzle unit used in the fifth embodiment; and FIG. 12B is a cross-sectional view taken along a line A-A' in FIG. 12A.

FIGS. 13A and 13B are partially enlarged views of the nozzle unit shown in FIG. 12; FIG. 13A shows a state in which a resin channel is disconnected from the exterior of the nozzle unit and FIG. 13B shows a state in which the resin channel and the exterior of the nozzle unit are communicated with each other.

DESCRIPTION OF THE EMBODIMENTS

[First Embodiment]

Figure 1:
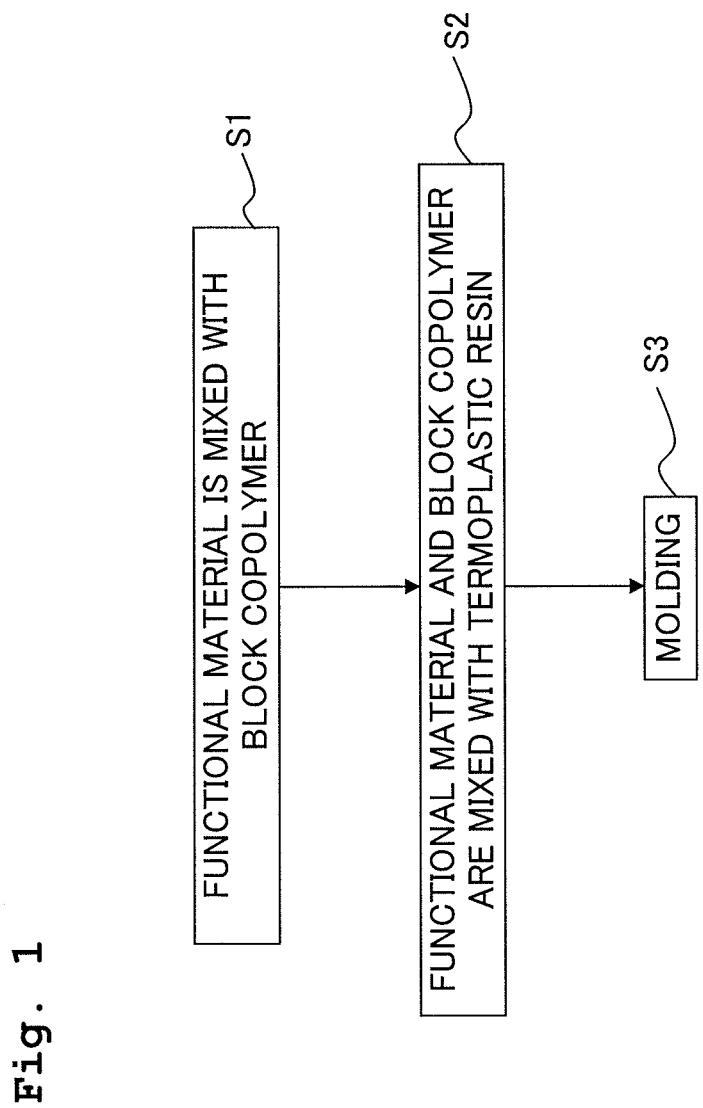
FIG. 1 is a flowchart for explaining a method for producing a molded product of the first embodiment.

As an embodiment of the present teaching, an explanation will be made about a method for producing a molded product as shown in FIG. 1. In this embodiment, there are included: mixing a functional material with a block copolymer having a hydrophilic segment (hereinafter referred to as "block copolymer" as appropriate) (step S1); mixing the block copolymer mixed with the functional material with a thermoplastic resin (step S2); and molding the thermoplastic resin mixed with the block copolymer (step S3). An explanation will be made below about each of the steps sequentially.

At first, the functional material is mixed with the block copolymer having the hydrophilic segment (step S1). The block copolymer used in this embodiment has the hydrophilic segment and another segment different from the hydrophilic segment (hereinafter referred to as "another segment" as appropriate). The block copolymer has a tendency as follows. That is, the block copolymer moves toward the surface of the molded product together with the functional material during or after the molding process of the thermoplastic resin in step S3 to be segregated in the vicinity of the surface of the molded product together with the functional material.

An arbitrary block copolymer may be adopted in this embodiment, provided that the block copolymer is a polymer segregated in the vicinity of the surface of the molded product. It is possible to use, as the hydrophilic segment, anionic segment, cationic segment, and non-ionic segment. The anionic segment is exemplified by polystyrene sulfonic acid system; the cationic segment is exemplified by quaternary ammonium base-containing acrylate polymer system; and the non-ionic segment is exemplified by polyetheresteramide system, polyethylene oxide-epichlorohydrin system, and polyetherester system.

The block copolymer of this embodiment is preferably the non-ionic segment in which the hydrophilic segment has a polyether structure, because heat resistance of the molded product is more likely to be ensured. The polyether structure includes, for example, oxyalkylene group in which the carbon number of the alkylene is in the range of 2 to 4 such as ethylene group, propylene group, trimethylene group, and tetramethylene group; polyetherdiol; polyetherdiamine; modified materials thereof; and hydrophilic polymer containing polyether. The polyethylene oxide is especially preferable. Another segment of the block copolymer in this embodiment is arbitrary, provided that the another segment has a hydrophobic property higher than the hydrophilic segment, and a suitable type of segment can be selected. For example, in a case that a material which is compatibly dissolved with the thermoplastic resin mixed in step S2 is used as another segment, there is an advantage such that phase separation at the inside of the molded product during the mixing with the thermoplastic resin and after the molding can be suppressed. On the other hand, in a case that a material which is not compatibly dissolved with the thermoplastic resin is used as another segment, there is an advantage such that action of the block copolymer to try to bleed out on the surface of the molded product gets stronger, and the block copolymer is more likely to be segregated in the vicinity of the surface of the molded product. The material compatibly dissolved with the thermoplastic resin is preferably a resin which has the same structure as the thermoplastic resin or a resin having a structure similar to that of the thermoplastic resin. For example, in a case that polyamide resin such as nylon is used as the thermoplastic resin, another segment is preferably the nylon or the like having polyamide component. In a case that polyolefin resin such as polypropylene is used as the thermoplastic resin, another segment preferably has polyolefin component. On the contrary, the material, which is not compatibly dissolved with the thermoplastic resin, is preferably a resin having a structure different from that of the thermoplastic resin or a resin having a property different from that of the thermoplastic resin. For example, in a case that polyolefin having the hydrophobic property such as polypropylene is used as the thermoplastic resin, it is possible to use, as another segment, the nylon or the like having a relatively high hydrophilic property.

Any commercially available product may be used for the block copolymer in this embodiment. In some cases, the block copolymer in this embodiment is commercially available as a resin-kneaded high-molecular antistatic agent because of the property of segregation (orientation) in the vicinity of the surface of the molded product. It is possible to use, for example, "PELESTAT (trade name)" and "PELECTRON (trade name)" produced by Sanyo Chemical Industries, Ltd. as the block copolymer of this embodiment. "PELESTAT NC6321" produced by Sanyo Chemical Industries, Ltd. is a block copolymer in which polyether as the hydrophilic segment is copolymerized by ester bond with nylon as another segment.

An arbitrary functional material may be adopted in this embodiment, provided that the surface of the molded product is modified by the functional material, and various materials can be selected depending on a purpose. For example, in a case that the metallic fine particles are used as the functional material, a plating film can be formed on the surface of the molded product by allowing the metallic fine particles to function as the catalyst of the electroless plating. In this case, metallic fine particles such as Pd, Ni, Pt, and Cu; metal complexes; or metal-oxide precursors such as metal alkoxide are preferably used as the metallic fine particles. Although the type of the metal complex is arbitrary, in particular, it is preferable to use hexafluoroacetyl-acetonato palladium (II), platinum dimethyl (cyclooctadiene), bis(cyclopentadienyl) nickel, bis(acetylacetonate) palladium, and the like. Further, as will be described later on, in a case that the metallic fine particles are dissolved in pressurized carbon dioxide, it is preferable to use a metal complex having high solubility in pressurized carbon dioxide.

In a case that the metallic fine particles containing Ag are used as the functional material, the surface of the molded product can have bactericidal effect and it is possible to improve electrical conductivity and antistatic effect. Especially, the metallic fine particles containing Ag are exemplified, for example, by silver salt (I) of heptafluorobutyric acid. Further, in a case that dye is used as the functional material, dyeing can be performed on the surface of the thermoplastic resin or at the inside of the thermoplastic resin. In a case that polyalkyl glycol is used as the functional material, the thermoplastic resin can be subjected to a hydrophilic treatment. In a case that silicon oil or fluorine-based compound is used as the functional material, the thermoplastic resin can be subjected to a hydrophobic treatment.

A method for mixing the block copolymer with the functional material is arbitrary. For example, the following method is allowable. That is, the functional material is dissolved in a solvent such as ethanol to prepare a solution; the block copolymer is immersed in the prepared solution to impregnate the block copolymer with the functional material. As the solvent for dissolving the block copolymer, water, a water-based solvent, or an organic solvent such as isopropyl alcohol, hexane, or acetone may be used.

The mixing of the functional material with the block copolymer is preferably performed by making pressurized carbon dioxide in which the functional material is dissolved or dispersed (hereinafter referred to as a "mixture pressurized fluid" as needed) come into contact with the block copolymer. In this situation, pressurized carbon dioxide is the solvent of the functional material and also functions as a plasticizing agent of the block copolymer. Thus, uniform dispersion of the functional material in the block copolymer is facilitated. For example, in a case that the metallic fine particles are used as the functional material, it is possible to reduce particle size of each metallic fine particle remarkably. It is considered that the functional material is more likely to move to the surface of the molded product together with the block copolymer by dispersing the functional material uniformly without causing aggregation.

The mixing of the functional material with the block copolymer may be performed, for example, as follows. That is, the block copolymer is plasticized and melted in a plasticizing cylinder of an extrusion molding machine; pressurized carbon dioxide (mixture pressurized fluid) in which the functional material is dissolved is introduced into the plasticizing cylinder; and the block copolymer is brought into contact with pressurized carbon dioxide in which the functional material is dissolved in the plasticizing cylinder. Then, after performing the extrusion molding of the block copolymer mixed with the functional material, crushing is performed to obtain a resin pellet made of the block copolymer mixed with the functional material. Unlike general low-molecular surfactants, the block copolymer of this embodiment is a polymer. Thus, the block copolymer of this embodiment has high viscosity such that the molding can be performed after the plasticizing and melting, and it is possible to perform the extrusion molding to form the block copolymer as the pellet. Another method for using pressurized carbon dioxide is exemplified by a batch process. For example, the block copolymer may be brought into contact with pressurized carbon dioxide (mixture pressurized fluid) in which the functional material is dissolved in a high pressure container to impregnate the block copolymer with the functional material.

Here, the "resin pellet" indicates an object in which the resin is made to be a small pellet so as to be processed easily, and size and shape thereof varies depending on a use of the pellet. For example, the resin pellet is a small piece of the resin having a particle form or cylindrical or columnar form of about 3 to 5 mm.

In a case that a step for manufacturing the pellet is included in the method for producing the molded product, the molded product is molded as follows. That is, at first, the functional material is dispersed in the block copolymer during heating to produce the resin pellet; and the thermoplastic resin is mixed with the resin pellet, followed by heated and melted in step S2. In general, such a long thermal history causes the aggregation of the functional material, thus there is fear that the modification of the surface of the molded product is adversely affected. However, in this embodiment, the aggregation of the functional material is suppressed by using pressurized carbon dioxide during the manufacture of the pellet, and further, the modification of the surface of the molded product by the functional material is promoted by the action of the block copolymer as described above. Therefore, even when the step for manufacturing the resin pellet is included in the method for producing the molded product in this embodiment, the function of the molded product is not adversely affected.

As pressurized carbon dioxide used in the mixing of the functional material with the block copolymer, it is possible to use pressurized carbon dioxide in a liquid state, a gaseous state, or a supercritical state. Because pressurized carbon dioxide in each of the states is safe to the human body; has superior diffusion property to the melted block copolymer; can be removed from the melted block copolymer readily; and functions also as the plasticizing agent of the block copolymer. Although pressure and temperature of pressurized carbon dioxide introduced into the plasticizing cylinder are arbitrary, liquid carbon dioxide or supercritical carbon dioxide is preferably used, because density thereof is high and stable. The temperature of pressurized carbon dioxide is preferably within a range of 5 degrees Celsius to 50 degrees Celsius. Pressurized carbon dioxide having a lower temperature has a higher density to improve the solvent effect, and thus preferable. The temperature of pressurized carbon dioxide is preferably not less than 5 degrees Celsius from the viewpoint of easy cooling control. Further, pressurized carbon dioxide having a higher temperature has a lower density, and thus there is fear that liquid feeding is unstable. From the viewpoint of stable liquid feeding, temperature of pressurized carbon dioxide is preferably not more than 50 degrees Celsius. The pressure of pressurized carbon dioxide is desirably within a range of 4 to 25 MPa. In a case that the pressure of pressurized carbon dioxide is lower than the above range, the solvent effect is less likely to be obtained. Thus, the pressure is preferably not less than 4 MPa from the viewpoint of obtaining a moderate solvent effect. In a case that the pressure of pressurized carbon dioxide is higher than the above range, a higher cost is needed for maintaining a high-pressure equipment. Thus, the pressure is preferably not more than 25 MPa from the viewpoint of control of the cost. Pressurized carbon dioxide in which the functional material is dissolved or dispersed rises to a high temperature instantly in the plasticizing cylinder and the pressure of pressurized carbon dioxide also changes or fluctuates. Therefore, the states, the values of temperature, and the values of pressure of pressurized carbon dioxide as described above indicate the states, the values of temperature, and the values of pressure of pressurized carbon dioxide in a stable state before pressurized carbon dioxide is introduced into the plasticizing cylinder.

In a case that the metallic fine particles are used as the functional material, pressurized carbon dioxide may include a solvent for dissolving the metallic fine particles. For example, in a case that the metal complex is used as the metallic fine particles, a fluorine-based organic solvent such as perfluoropentylamine may be used in order to raise the concentration of the metal complex in pressurized carbon dioxide.

The concentration of the functional material in pressurized carbon dioxide can be selected as appropriate in consideration of the type of functional material, and is not especially limited. In view of permeability to the molten resin and aggregation of the functional material in pressurized carbon dioxide, the concentration of the functional material in pressurized carbon dioxide is preferably not more than saturated solubility. Especially, since the density of carbon dioxide is lowered rapidly in the plasticizing cylinder of the molding machine subjected to a high temperature, the concentration of the functional material in pressurized carbon dioxide is preferably about 1 to 50% of the saturated solubility.

A method for preparing pressurized carbon dioxide is not especially limited, and any known method can be used as the method for preparing pressurized carbon dioxide. For example, it is allowable to use a pressurized fluid supply apparatus 1000 provided with a syringe pump, such as a syringe or injector shown in FIG. 2, for sucking pressurized carbon dioxide and performing liquid feeding. An arbitrary method for supplying the mixture pressurized fluid into the plasticizing cylinder may be adopted. For example, the mixture pressurized fluid may be introduced into the plasticizing cylinder intermittently or continuously. Further, the mixture pressurized fluid may be introduced, for example, by using the syringe pump shown in FIG. 2 which is capable of performing stable liquid feeding, so as to control the amount of introduction.

In this embodiment, a ratio of the functional material to the mixture of the block copolymer and the functional material is arbitrary, and the ratio can be determined appropriately in consideration of the type of block copolymer, the type of functional material, the type of thermoplastic resin, the using purpose of the molded product, and the like. For example, in a case that the metallic fine particles functioning as the catalyst of the electroless plating are used as the functional material, the ratio of the functional material to the mixture of the block copolymer and the functional material is preferably 10 ppm to 10% by weight concentration. In a case that the ratio of the functional material is within this range, increase in viscosity of the block copolymer can be suppressed and further the bleeding property can be maintained. Thus, the ratio of the functional material is desirably within this range in view of the cost.

Subsequently, the obtained block copolymer mixed with the functional material (hereinafter, referred to as a "block copolymer containing the functional material" as appropriate) is mixed with the thermoplastic resin (step S2 in FIG. 1) and then subjected to the molding (step S3).

As the thermoplastic resin, it is possible to use, for example, polypropylene, polymethyl methacrylate, polyamide, polycarbonate, amorphous polyolefin, polyether imide, polyethylene terephthalate, polyether ether ketone, ABS-based resin, polyphenylene sulfide, polyamide imide, polylactic acid, and polycaprolactone. Further, the thermoplastic resin can be kneaded with various inorganic fillers such as glass fiber, talc, and carbon fiber. As will be described later on, in a case that the plating film is formed on the surface of the molded product by the electroless plating method, the thermoplastic resin is preferably a resin containing amide group having high water-absorbing property and high degree of plating reactivity, in particular, nylon such as Nylon 6 or Nylon 6.6 is preferable. For the thermoplastic resin, it is allowable to use one material or a mixture of two or more materials. In a case that the mixture of two or more materials is used, the main component is preferably nylon.

A ratio of the block copolymer containing the functional material to the mixture of the thermoplastic resin and the block copolymer containing the functional material is arbitrary, and the ratio can be determined appropriately in consideration of the type of thermoplastic resin, the type of functional material, the type of block copolymer, the using purpose of the molded product, and the like. For example, in the case that the metallic fine particles functioning as the catalyst of the electroless plating are used as the functional material, the ratio of the block copolymer containing the functional material to the mixture of the thermoplastic resin and the block copolymer containing the functional material is preferably 1 to 30 wt %, and the ratio of the functional material in the molded product is preferably 10 ppm to 10 wt % by weight concentration. In a case that the ratio of a high-molecular surfactant and the ratio of the functional material are within the above ranges, physical properties of the thermoplastic resin such as the heat resistance and mechanical strength are not damaged seriously, and further increase in viscosity of the block copolymer can be suppressed and the bleeding property can be maintained. Thus, the ratio of a high-molecular surfactant and the ratio of the functional material are desirably within the above ranges in view of the cost.

A method for mixing the block copolymer containing the functional material with the thermoplastic resin and a method for molding the thermoplastic resin are arbitrary. For example, the molded product may be obtained as follows. That is, the thermoplastic resin and the pellet of the block copolymer containing the functional material are plasticized and melted and then mixed in the plasticizing cylinder of a general-purpose injection molding machine or extrusion molding machine; and the molding is performed by a general-purpose injection molding method or extrusion molding method. Further, it is allowable to mold a foam molded product by a foam injection molding method using a physical foaming agent such as pressurized carbon dioxide or pressurized nitrogen. As described above, in the production method in this embodiment, by using the block copolymer containing the functional material, the molding and the surface modification of the molded product can be carried out simultaneously using a general-purpose molding machine. Thus, the investment for facilities such as purchase of a new molding machine is not required.

In this embodiment, a "resin pellet containing the block copolymer mixed with the functional material" in a method for mixing the "resin pellet containing the block copolymer mixed with the functional material" with the thermoplastic resin and then performing the molding, corresponds to a master batch. The thermoplastic resin corresponds to a base resin mixed with the master batch. The master batch is a resin pellet in which the functional material such as dye, pigment, or other additives is contained in high concentration. The master batch is mixed with the base resin containing no functional material, and then is molded together with the base resin. In a case that the master batch is used, handling of the material is easy and weighing accuracy is improved, as compared with a case in which the functional material is directly added to the base resin and then the molding is performed. Further, the usage of the master batch also has an advantage such that the molded product containing the functional material can be produced by a general-purpose molding machine.

In the method for producing the molded product according to this embodiment as described above, there is such a tendency that the block copolymer moves toward the surface of the molded product together with the functional material to be segregated in the vicinity of the surface of the molded product together with the functional material. This is caused by movement of the hydrophilic segment of the block copolymer to try to bleed out from the molded product. The inventors of the present invention have found out that in the case that the functional material is mixed with the block copolymer as described above, the functional material also moves to the vicinity of the surface of the molded product together with the block copolymer. By using this phenomenon, the functional material can be unevenly distributed in the vicinity of the surface of the molded product, and thereby making it possible to efficiently perform the surface modification of the molded product from the inside thereof.

In the present description, "the vicinity of the surface of the molded product" indicates an area inside the molded product and near the surface. The area indicated by "the vicinity of the surface of the molded product" (how much depth from the surface of the molded product is included in the area) varies depending on the types of the thermoplastic resin, the block copolymer, and the functional material, used in the molded product. For example, "the vicinity of the surface of the molded product" indicates an area having a depth in a range of 0.1 to 10 μm from the surface of the molded product.

Unlike general low-molecular surfactants, the block copolymer of this embodiment is a polymer. It is considered that although the low-molecular surfactant also has the property to be segregated on the surface of the molded product, since the block copolymer in this embodiment has a high molecular weight, the block copolymer of this embodiment can move to the vicinity of the surface of the molded product with the functional material mixed. Further, since the block copolymer of this embodiment is the polymer, even when the block copolymer is unevenly distributed on the surface of the molded product in high concentration, the heat resistance and mechanical strength of the molded product are not decreased. Furthermore, since the block copolymer of this embodiment has sufficient viscosity in a state of being plasticized and melted, the block copolymer can be subjected to the extrusion molding, and can be formed as the pellet.

By mixing the functional material of this embodiment with the block copolymer, the functional material moves to the vicinity of the surface of the molded product with the block copolymer, and concentration of the functional material in the vicinity of the surface of the molded product is increased to modify the surface of the molded product efficiently. In addition, concentration of the functional material in (inside) the molded product which does not contribute to the surface modification is decreased and waste of the material is reduced, and thereby making it possible to suppress material cost. For example, in a case that the functional material is a plating catalyst, since the catalyst is unevenly distributed in the vicinity of the surface of the molded product, decrease of tight contact force of the plating film is suppressed and the poor appearance such as unevenness of plating reaction and a pinhole can be reduced. Further, since the concentration of the plating catalyst in (inside) the molded product which does not contribute to the plating reaction is decreased, it is possible to suppress the material cost.

In this embodiment, a part of the block copolymer included in the molded product may be dissolved and removed by making the surface of the obtained molded product come into contact with a solution for dissolving the block copolymer such as acid or basic solution. A portion of the hydrophilic segment of the block copolymer in this embodiment is dissolved in the acid solution, the basic solution, or alcohol, and thereby making it possible to form fine pores on the surface of the molded product. It is considered that, although a part of the functional material which is unevenly distributed in the vicinity of the surface of the molded product is exposed on the surface of the molded product, by removing the block copolymer to provide many fine pores, a larger part of the functional material can be exposed on the surface of the molded product and the surface of the molded product can be further activated. For example, in the case that the metallic fine particles functioning as the plating catalyst are used as the functional material, formation of the plating film is easier by exposing more metallic fine particles on the surface of the molded product. In a case that the metallic fine particles including sliver are used as the functional material, bactericidal effect on the surface of the molded product can be strengthened by exposing more metallic fine particles including the silver on the surface of the molded product. Further, unlike general low-molecular surfactants, the block copolymer of this embodiment is a polymer. Thus, the fine pores each having a sufficient size can be formed after removing the block copolymer from the surface of the molded product.

As a conventional plating pretreatment or preprocessing for roughening the surface of the molded product, there has been known a method in which the ABS resin, the elastomer, mineral, or the like is included in the resin and then removed from the surface of the molded product by the etching solution. Since the block copolymer in this embodiment is unevenly distributed on the surface of the molded product as described above, the fine pores on the surface of the molded product can be formed by a smaller content of the mineral or the like as compared with the conventional method. In the conventional method, it is necessary to use a reagent having heavy environmental burden, such as hexavalent chromic acid or permanganic acid, as the etching solution. However, in this embodiment, it is possible to use, for example, the acid solution such as hydrochloric acid, acetic acid, or hypophosphorous acid; the basic solution such as sodium hydroxide; or the alcohol such as 1,3-butanediol, propanol, methoxy ethanol, or ethylene glycol, as a solution for dissolving the block copolymer. These solutions are environmentally-friendly and also handling thereof is easy. Further, contact of the acid solution, the basic solution, or the alcohol with the molded product may be performed one time, or may be performed a plurality of times by changing the type of solution if necessary.

In this embodiment, in the case that the metallic fine particles functioning as the catalyst of the electroless plating are used as the functional material, an electroless plating solution may be brought into contact with the surface of the obtained molded product to form the plating film on the surface of the molded product. Any known solution can be used as the electroless plating solution. In terms of the fact that catalytic activity is high and the solution is stable, an electroless nickel-phosphorus plating solution is preferable.

There is no need to perform a plating catalyst application process on the molded product including the metallic fine particles in this embodiment. Further, in this embodiment, the electroless plating solution permeates from the surface of the molded product to make contact with the metallic fine particles included in the molded product, and the plating film grows by using the metallic fine particles as the catalyst. Therefore, the plating film is formed on the molded product in a state that the plating film bites into the molded product (in a state that a part of the plating film is permeated into the molded product).

The contact of the plating solution with the molded product may be performed without removing the block copolymer from the surface of the molded product, or may be performed after removing the block copolymer from the surface of the molded product. In a case that the plating solution is brought into contact with the surface of the molded product after removing the block copolymer to form the plating film, anchor effect brought about by the fine pores formed on the surface of the molded product occurs and tight contact strength of the plating film is improved. Thus, it is preferable.

Further, since the block copolymer of the molded product in this embodiment is unevenly distributed in the vicinity of the surface, the surface of the molded product is made to be hydrophilic by the hydrophilic segment of the block copolymer. As described above, in the case that the molded product is brought into contact with the electroless plating solution, the plating solution is permeated into the molded product from the surface thereof to make contact with the metallic fine particles, and the plating film grows while pushing out the molded product from the inside of the molded product. It is considered that, in this situation, since the vicinity of the surface of the molded product in this embodiment is made to be hydrophilic, permeation of the plating film and growth of the plating film are promoted. Accordingly, the molded product of this embodiment has the plating film having sufficient coatability and the plating film is formed in a short time. By shortening a time for forming the plating film, the defect of the plating film such as the pinhole is less likely to occur.

Meanwhile, since the block copolymer is unevenly distributed in the vicinity of the surface of the molded product, only the vicinity of the surface of the molded product is made to be hydrophilic. Thus, effect on the water-absorbing property (macroscopic water-absorbing property) of the entire molded product is small. Therefore, brittle failure of the molded product in the plating solution can be suppressed and the mechanical strength of the molded product is not decreased. As a result, the molded product has sufficient heat resistance-impact resistance performance even after formation of the plating film.

Further, unlike general low-molecular surfactants, the block copolymer of this embodiment is a polymer. Thus, the block copolymer of this embodiment stays in the vicinity of the surface without shedding from the surface of the molded product, and thereby making it possible to make the vicinity of the surface of the molded product hydrophilic as described above. The general low-molecular surfactants are more likely to shed from the surface of the molded product, and the effect equivalent to that of the block copolymer of the present teaching can not be expected.

In the case that the solution for dissolving the block copolymer is brought into contact with the surface of the molded product to remove the block copolymer, there is fear that the effect obtained by making the vicinity of the surface of the molded product hydrophilic is decreased. However, by keeping or saving a part of the block copolymer included in the molded product, it is possible to form the fine pores on the surface in a state that the surface of the molded product is hydrophilic. Further, by making the surface hydrophilic and providing the fine pores, it is possible to enhance tight contact property of the plating film to the surface of the molded product.

[Second Embodiment]

Figure 6:
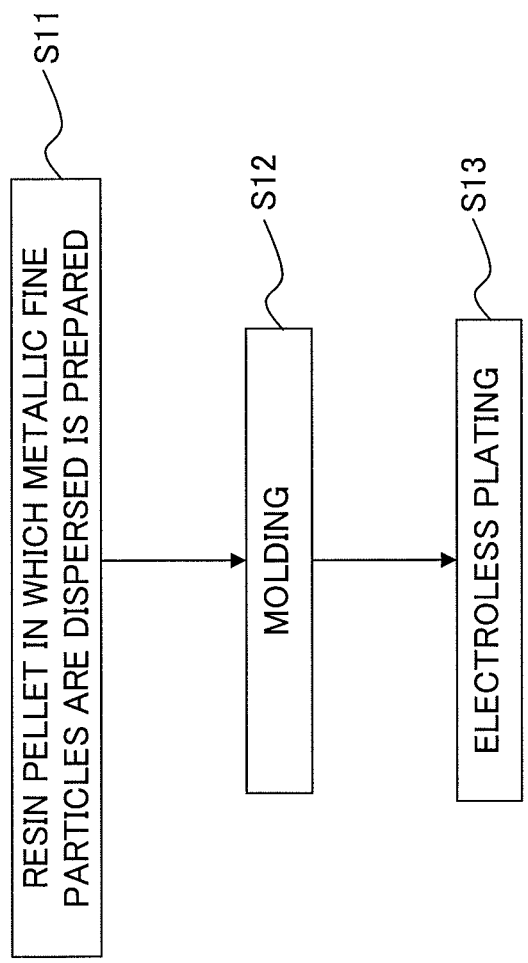
FIG. 6 is a flowchart for explaining a production method of the second embodiment.

As the second embodiment, an explanation will be made about a method for producing a molded product having a plating film as shown in FIG. 6. At first, it is prepared a resin pellet in which metallic fine particles are dispersed in a thermoplastic resin (step S11).

As the thermoplastic resin, it is possible to use, for example, a thermoplastic resin which is similar to that used in the first embodiment. It is preferable that the thermoplastic resin in this embodiment is mixed with a thermal conductive material, including, for example, carbon materials such as carbon fiber and nanocarbon; metallic fine particles such as aluminum, copper, and iron; fine particles of low-melting-point alloy such as copper-tin and aluminum-tin; and ceramic materials such as boron nitride, aluminum nitride, and alumina. By mixing the thermal conductive material with the thermoplastic resin as a raw material, the molded product having the plating film includes the thermal conductive material, and thereby making it possible to improve heat radiating performance of the molded product.

The metallic fine particles function as the plating catalyst in an electroless plating step (step S13) as will be described later on. For example, it is possible to use metallic fine particles similar to those used in the first embodiment as the functional material.

The resin pellet may be produced by a method for producing the resin pellet, including: plasticizing and melting the thermoplastic resin; mixing the thermoplastic resin plasticized and melted with pressurized carbon dioxide in which the metallic fine particles are dissolved; and performing crushing after the thermoplastic resin including the metallic fine particles is subjected to an extrusion molding to obtain the resin pellet. For example, the thermoplastic resin is plasticized and melted in the plasticizing cylinder of the extrusion molding machine; pressurized carbon dioxide in which the metallic fine particles are dissolved is introduced into the plasticizing cylinder; and the molten resin is brought into contact with pressurized carbon dioxide in the plasticizing cylinder. Pressurized carbon dioxide is the solvent of the metallic fine particles, functions also as the plasticizing agent of the thermoplastic resin, and promotes that the metallic fine particles are dispersed in the thermoplastic resin uniformly. Thus, in a case that the molded product having the plating film is produced by using the resin pellet produced by using pressurized carbon dioxide, the plating film which is uniform and has a high quality can be obtained. Although it is possible to produce the resin pellet by mixing the thermoplastic resin only with the metallic fine particles without using pressurized carbon dioxide, pressurized carbon dioxide is preferably used for the above reasons.

In the method for producing the resin pellet as described above, it is possible to use pressurized carbon dioxide which is similar to pressurized carbon dioxide used in the mixing of the functional material with the block copolymer in the first embodiment.

Further, pressurized carbon dioxide may include a solvent for dissolving the metallic fine particles similar to the first embodiment.

The concentration of the metallic fine particles in pressurized carbon dioxide can be selected as appropriate in consideration of the type of metallic fine particles, and is not limited especially. In view of permeability to the molten resin and aggregation of the metallic fine particles in pressurized carbon dioxide, the concentration is preferably not more than the saturated solubility. Especially, since the density of carbon dioxide is decreased rapidly in the plasticizing cylinder of the molding machine subjected to the high temperature, the concentration of the metallic fine particles in pressurized carbon dioxide is preferably about 1 to 50% of the saturated solubility.

A method preparing pressurized carbon dioxide is not especially limited, and it is possible to use any known method similar to that of the first embodiment. For example, it is allowable to use a pressurized fluid supply apparatus 300 provided with a syringe pump, such as a syringe or injector, for sucking pressurized carbon dioxide and performing liquid feeding shown in FIG. 7. In this embodiment, pressurized carbon dioxide (hereinafter referred to as "mixture pressurized fluid" as needed) mixed with the metallic fine particles in a predetermined proportion is produced by the pressurized fluid supply apparatus 300 and the mixture pressurized fluid is supplied to the plasticizing cylinder.

Figure 7:
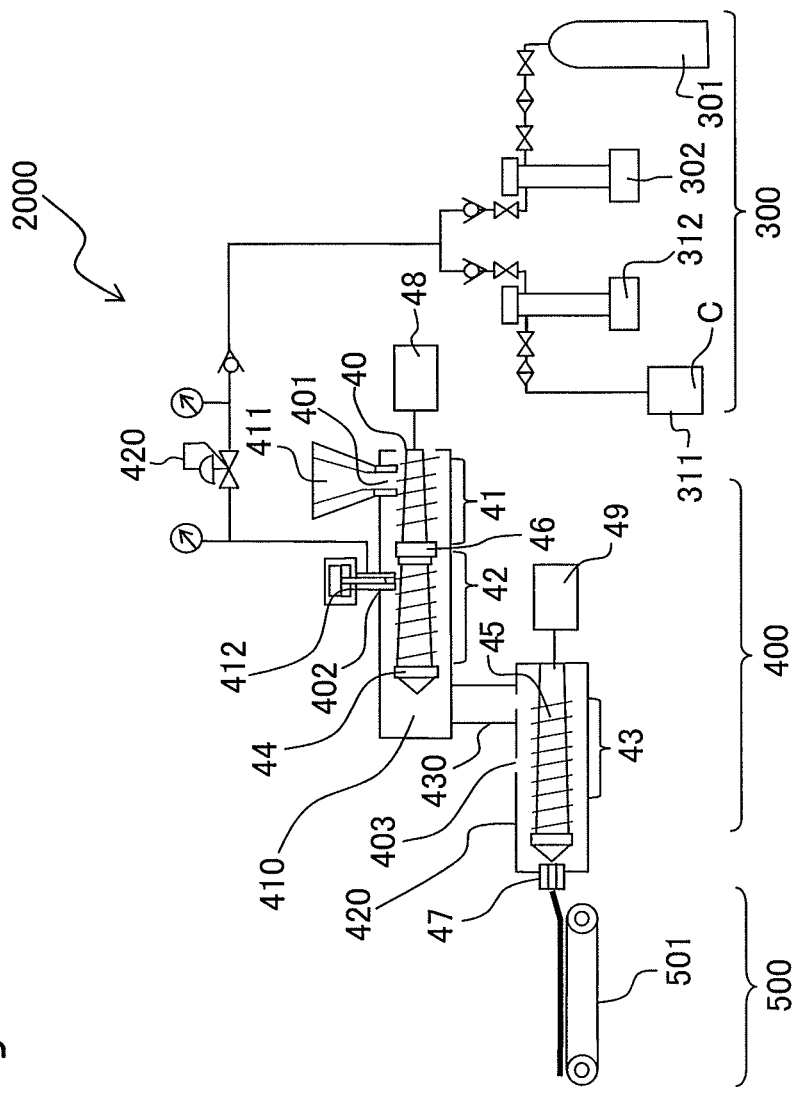
FIG. 7 schematically shows a resin pellet production apparatus used in Example 4.

The method for supplying the mixture pressurized fluid to the plasticizing cylinder is arbitrary. For example, the mixture pressurized fluid may be introduced into the plasticizing cylinder intermittently or continuously. Further, the mixture pressurized fluid may be introduced, for example, by using the syringe pump which is capable of performing stable liquid feeding as shown in FIG. 7 to control the amount of introduction.

After the mixing of the mixture pressurized fluid with the thermoplastic resin, the thermoplastic resin including the metallic fine particles is subjected to the extrusion molding, and then the crushing is performed. Accordingly, the resin pellet can be obtained.

Next, the obtained resin pellet including the metallic fine particles is plasticized and melted to mold the molded product (step S12 of FIG. 6). The molded product of this embodiment can be molded by a general-purpose molding method, using the resin pellet in which the metallic fine particles are dispersed and a molding machine such as a general-purpose injection molding machine or extrusion molding machine. Thus, the molded product including the metallic fine particles as the plating catalyst can be produced by the production method of this embodiment without the investment for facilities such as purchase of a new molding machine. For the molded product including the metallic fine particles, there is no need to apply the catalyst to the surface of the molded product, and further there is no need to perform a surface treatment using a chemical having heavy environmental burden in order to apply the catalyst.

In the production method of this embodiment, the metallic fine particles included in the molded product are preferably unevenly distributed in the vicinity of the surface of the molded product. In a case that the metallic fine particles as the plating catalyst are unevenly distributed in the vicinity of the surface of the molded product, the plating film is more likely to be formed on the surface of the molded product to uniformize the plating reaction on the surface of the molded product. Accordingly, tight contact force of the plating film is improved, the poor appearance of the plating such as the pinhole is reduced, and the plating film having a high quality can be formed. Further, only the metallic fine particles positioned in the vicinity of the surface of the molded product contribute to the plating reaction. Therefore, by unevenly distributing the metallic fine particles in the vicinity of the surface of the molded product, the metallic fine particles positioned at the central portion of the molded product which do not contribute to the plating reaction are reduced, and thereby making it possible to reduce the cost.

In the present description, "the vicinity of the surface of the molded product" indicates an area inside the molded product and near the surface. An area, in which the plating solution is penetrated from the surface at the time of making the molded product come contact with the plating solution to cause the plating reaction, is the "the vicinity of the surface of the molded product". The area indicated by "the vicinity of the surface of the molded product" (how much depth from the surface of the molded product is included in the area) varies depending on the type of the thermoplastic resin used in the molded product. "The vicinity of the surface of the molded product" is preferably the area having the depth in a range of 0.1 to 10 µm from the surface of the molded product.

A method for unevenly distributing the metallic fine particles included in the molded product in the vicinity of the surface of the molded product is preferably performed, for example, as follows. That is, the resin pellet including the metallic fine particles is plasticized and melted; the resin pellet plasticized and melted is mixed with the physical foaming agent including at least any one of pressurized carbon dioxide and pressurized nitrogen; and a foam molded product is molded by using the molten resin including the physical foaming agent.

According to investigation by the inventors of the present invention, the metallic fine particles are more likely to be unevenly distributed in the vicinity of the surface by using pressurized carbon dioxide or pressurized nitrogen as the physical foaming agent. The reason for this is estimated as follows. That is, when the physical foaming agent included in the inside of the molded product passes through the inside of the molded product to come to a surface layer portion of the molded product, the physical foaming agent functions as driving force to unevenly distribute the metallic fine particles present at the inside of the molded product in the vicinity of the surface. In the method of this embodiment, an electroless plating film grows in an area within a range of 10 µm from the surface of the molded product. The existence of the metallic fine particles in this area makes formation of the plating film on the surface of the molded product easier, suppresses a decline in the tight contact force of the plating film. Thus, the poor appearance such as the unevenness of the plating reaction and the pinhole is reduced.

Pressurized carbon dioxide and pressurized nitrogen used as the physical foaming agent function as the physical foaming agent, and further function as the plasticizing agent of thermoplastic resin, thereby facilitating the uniform dispersion of the metallic fine particles in the thermoplastic resin. Accordingly, the particle size of each metallic fine particle to be the catalyst core can be reduced remarkably and the molded product having high degree of plating reactivity can be produced.

In the production method of this embodiment, at first, the metallic fine particles are dispersed in the thermoplastic resin in a state of being heated to produce the resin pellet, and further the resin pellet is heated to melt the resin so as to mold the molded product. In general, such a long thermal history causes the aggregation of the metallic fine particles, thus there is fear that the formation of the plating film is adversely affected. However, by performing foam molding using pressurized carbon dioxide or pressurized nitrogen as the physical foaming agent as described above, the metallic fine particles can be unevenly distributed in the vicinity of the surface of the molded product and dispersion of the metallic fine particles can be facilitated. Therefore, even in the production method using the resin pellet including the metallic fine particles, it is possible to form the plating film having a high tight contact force, less poor appearance such as the pinhole, and a high quality.

Next, the electroless plating solution makes contact with the obtained molded product including the metallic fine particles to form the plating film (step S13 of FIG. 6). Any known solution can be used as the electroless plating solution. In terms of the fact that the catalytic activity is high and the solution is stable, the electroless nickel-phosphorus plating solution is preferable.

Since the metallic fine particles functioning as the plating catalyst are dispersed at the inside of the molded product of this embodiment, there is no need to perform a process for applying the plating catalyst. Further, in this embodiment, the electroless plating solution is permeated from the surface of the molded product to contact with the metallic fine particles included in the molded product, and the plating film grows using the metallic fine particles as the catalyst. Therefore, the plating film is formed on the molded product in a state that the plating film bites into the molded product (in a state that a part of the plating film is permeated into the molded product). Thus, unlike conventional electroless plating methods, the surface of the molded product is not required to be roughened by the etching, and it is possible to easily form the plating film having superior tight contact property to various kinds of molded products in this embodiment. Further, unlike conventional electroless plating methods, the surface of the molded product is not roughened in this embodiment. Thus, it is possible to form a plating film of which surface roughness is extremely small (nano-order) in this embodiment.

[Third Embodiment]

As the third embodiment, an explanation will be made about a method for producing a molded product having a plating film. The production method of this embodiment is similar to that of the second embodiment except for preparing a resin pellet which includes metallic fine particles and a block copolymer having a hydrophilic segment.

At first, it is prepared a resin pellet in which the block copolymer having the hydrophilic segment and the metallic fine particles are dispersed in a thermoplastic resin (step S11 of FIG. 6). A method for preparing the resin pellet which includes the block copolymer having the hydrophilic segment is arbitrary, and the resin pellet may be produced by mixing the block copolymer and the thermoplastic resin in the manufacturing process of the resin pellet explained in the second embodiment. For example, the block copolymer and the thermoplastic resin are plasticized and melted in a plasticizing cylinder of an extrusion molding machine; pressurized carbon dioxide in which the metallic fine particles are dissolved is introduced into the plasticizing cylinder; and the molten resin and the block copolymer are brought into contact with pressurized carbon dioxide in the plasticizing cylinder.

As the block copolymer of this embodiment, it is possible to use a block copolymer which is the same as that used in the first embodiment. In this embodiment, the block copolymer and the thermoplastic resin are preferably mixed so that a mixing ratio of the block copolymer to the resin pellet is 1 to 30 wt %. The mixing ratio of the block copolymer to the resin pellet is preferably not less than 1 wt % in order to enhance permeability of the plating solution to the molded product sufficiently, and is preferably not more than 30 wt % in order to maintain mechanical strength of the molded product and heat resistance-impact resistance performance after formation of the plating film. Further, the mixing ratio of the block copolymer to the resin pellet is more preferably 5 to 15 wt %.

Next, the obtained resin pellet containing the metallic fine particles and the block copolymer is plasticized and melted to mold the molded product (step S12 of FIG. 6), and then an electroless plating solution is brought into contact with the molded product to form the plating film (step S13). A method for molding the molded product and a method for forming the plating film are similar to those explained in the first embodiment.

The inventors of the present invention have found out that in a case that the molded product is produced using the resin pellet including the block copolymer and the metallic fine particles, the block copolymer facilitates the growth of the plating film and further improves the quality of the plating film. Although the reason thereof is not clear, it can be inferred as follows.

During or after the molding process of the molded product using the resin pellet, the hydrophilic segment of the block copolymer included in the molded product moves and tries to bleed out on the surface of the molded product. Thus, the block copolymer is unevenly distributed in the vicinity of the surface of the molded product, and only the vicinity of the surface of the molded product is made to be hydrophilic by the hydrophilic segment of the block copolymer.

In this embodiment, in a case that the electroless plating solution is brought into contact with the molded product, the plating solution permeates into the molded product from the surface thereof to make contact with the metallic fine particles, and the plating film grows while pushing out the molded product from the inside of the molded product. It is considered that, since the vicinity of the surface of the molded product of this embodiment is made to be hydrophilic by the block copolymer in the above situation, permeation of the plating film and growth of the plating film are promoted. The molded product of this embodiment has the plating film having sufficient coatability, and the plating film is formed in a short time. By shortening a time for forming the plating film, the defect of the plating film such as the pinhole is less likely to occur.

Meanwhile, since the block copolymer is segregated in the vicinity of the surface of the molded product, only the vicinity of the surface of the molded product is made to be hydrophilic by the block copolymer. Although the block copolymer partially improves hydrophilic property of the molded product, the effect on the water-absorbing property (microscopic water-absorbing property) of the entire molded product is small. Therefore, brittle failure of the molded product in the plating solution can be suppressed and the mechanical strength of the molded product is not decreased. As a result, the molded product has sufficient heat resistance-impact resistance performance even after formation of the plating film.

Further, in this embodiment, it is inferred that the metallic fine particles move to the vicinity of the surface of the molded product in association with the movement of the block copolymer to the vicinity of the surface of the molded product, and thereby the metallic fine particles are more likely to be unevenly distributed in the vicinity of the surface. Although the reason of the phenomenon is not clear, by unevenly distributing the metallic fine particles in the vicinity of the surface, the plating film is easily to be formed on the surface of the resin, a decline in the tight contact force of the plating film is suppressed, and the poor appearance such as the unevenness of the plating reaction and the pinhole is reduced.

In this embodiment, only the vicinity of the surface of the molded product as an object to be subjected to the plating is made to be hydrophilic by using the block copolymer, and thereby making it possible to obtain the effect as described above. Regarding a random copolymer made of the same constituent elements, a polymer formed only of the hydrophilic segment, and the like, it is difficult that only the vicinity of the surface of the molded product is made to be hydrophilic, and thus the effect equivalent to that of the present teaching can not be obtained.

As described above, in the production method of this embodiment, at first, the metallic fine particles are dispersed in the thermoplastic resin in a state of being heated to produce the resin pellet, and further the resin pellet is heated to melt the resin so as to mold the molded product. In general, such a long thermal history causes the aggregation of the metallic fine particles, thus there is fear that the formation of the plating film is adversely affected. However, by including the block copolymer having the hydrophilic segment in the resin pellet, the growth of the plating film can be facilitated and the quality of the plating film can be improved. Therefore, even in the production method using the resin pellet including the metallic fine particles, it is possible to form the plating film having a high tight contact force, less poor appearance such as the pinhole, and a high quality.

In this embodiment, similar to the second embodiment, it is allowable to mold a foam molded product by using the physical foaming agent such as pressurized nitrogen. By using the physical foaming agent, the growth of the plating film on the molded product can be further facilitated.

[Fourth Embodiment]

Subsequently, an explanation will be made about a molded product having a plating film which is produced by the method for producing the molded product having the plating film in the second embodiment. The molded product of this embodiment is a foam molded product, and can be produced by the production method using the physical foaming agent in the second embodiment.

The molded product having the plating film of this embodiment includes, for example, a foam molded product having closed foam cells therein and a plating film formed on the surface of the foam molded product having the closed foam cells therein. A metallic region made of the same kind of metal as the plating film is formed in a depth area within 10 μm from the surface of the foam molded product on which the plating film is formed, and there is no foamed cell in a range in which the metallic region is formed, the range including the surface of the foam molded product on which the plating film is formed.

In a case that the electroless plating solution is brought into contact with the molded product including the metallic fine particles therein which function as the catalyst of the electroless plating, the plating solution is permeated into the molded product from the surface thereof to make contact with the metallic fine particles, and the plating film grows while pushing out the molded product from the inside of the molded product. Accordingly, the metallic region made of the same kind of metal as the plating film, such as nickel-phosphorus, is formed in the molded product. As described above, the metallic fine particles are unevenly distributed in the vicinity of the surface of the molded product. The range in which the metallic fine particles are unevenly distributed is, for example, the depth area within 10 μm from the surface of the molded product on which the plating film is formed. Therefore, the metallic region is formed in this range.

The range, including the surface of the molded product, in which the metallic region is formed is a range in which the plating reaction occurs. In a case that the foamed cells are present in this range, there is fear that an acidic nickel-phosphorus plating solution is mixed into the foamed cells at the time of the plating and remained in the foamed cells. The remained plating solution becomes the cause of corrosion of the plating film. Thus, it is preferable that no foamed cell is present in the range in which the metallic region is formed. The molded product having the plating film of this embodiment has no foamed cell in the range, including the surface of the molded product, in which the metallic region is formed, and thus it is possible to suppress the corrosion of the plating film.

In order to form no foamed cell in the range, including the surface of the molded product, in which the metallic region is formed, the molded product of this embodiment is molded, for example, by the following method. That is, the molded product molded by injection molding is separated or divided into a layer forming the inside of the resin referred to as a core layer and a layer forming the outermost surface portion of the molded product referred to as a skin layer. The core layer is covered with the skin layer. In a case that a molten resin is charged into a mold cavity upon the injection molding, the resin at the forefront of resin flow, referred to as a flow front, is cooled on a wall surface of the mold to form the skin layer. Then, the resin at the central portion of the resin flow forms the core layer. In the foam injection molding using the physical foaming agent, the molten resin including the high pressure physical foaming agent is subjected to the pressure reduction at the time of being charged into the cavity, and the foamed cells are formed in the resin.

In this embodiment, the resin forming the skin layer is pressed against the wall surface of the mold by charging pressure of the resin, which flows after the resin forming the skin layer to form the core layer, to be prevented from being subjected to the pressure reduction, and thereby the foaming of the skin layer is suppressed. Acoordingly, it is possible to mold the molded product in which the foamed cells are formed in the core layer, but no foamed cell is formed in the skin layer. In this embodiment, the temperature of the mold, the injection speed, the resin temperature, and the like are adjusted so that the thickness of the skin layer in the foam molded product is in a range of approximately 10 to 100 μm. Thus, in the molded product of this embodiment, no foamed cell is formed in a range in which the metallic region formed by the electroless plating is present, that is, in a region within 10 μm from the surface of the resin of the molded product.

"The range in which the metallic region is present (formed)" in this embodiment indicates a region in which the metallic region made of the same kind of metal as the plating film occupies the volume of not less than 20 vol %. Further, "the foamed cells" in this embodiment do not include any minimal failure of the molded product. Therefore, "no foamed cell is substantially present in the range in which the metallic region is present (formed)" indicates that, for example, a closed foam having the foamed cell size of not less than 5 μm is not present in the region in which the metallic region occupies the volume of not less than 20 vol %.

Figure 8:
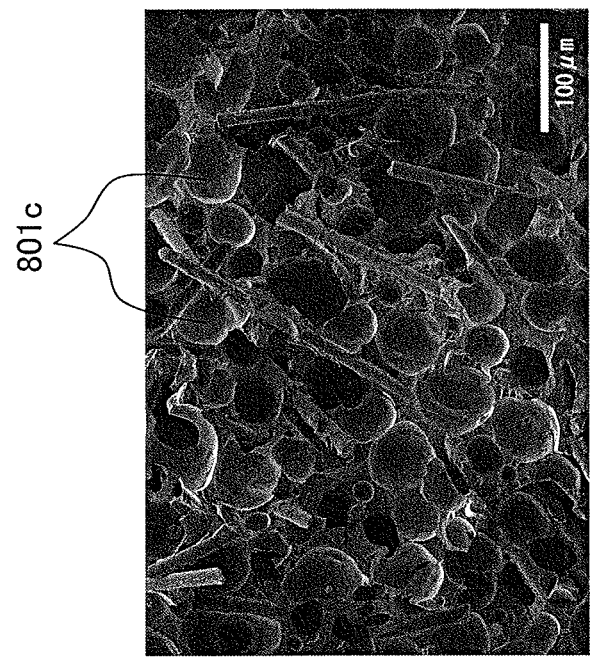
FIG. 8 is a SEM micrograph showing a cross-section in the vicinity of a surface of a foam molded product in the fourth embodiment.
Figure 9:
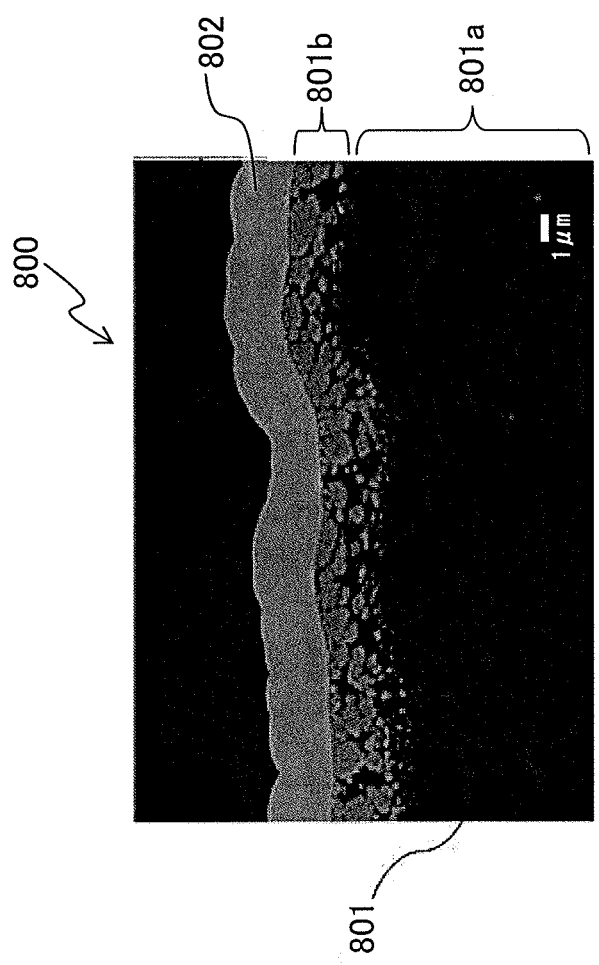
FIG. 9 is a SEM micrograph showing a cross-section of the interior of a resin of the foam molded product in the fourth embodiment.

As shown in FIG. 8, a molded product 800 of this embodiment includes a foam molded product 801 having closed foam cells therein and a plating film 802 formed on the surface of the foam molded product 801. The metallic region made of the same kind of metal as the plating film 802 is formed in an area 801b having a depth within 10 μm from the surface of the foam molded product 801 on which the plating film 802 is formed, and no foamed cell is present in a range, including the surface on which the plating film 802 is formed, in which the metallic region is formed. The thickness of the skin layer of the molded product in this embodiment shown in FIG. 8 is about 100 μm. Further, as shown in FIG. 9, many foamed cells 801c each having about 50 μm in diameter are present in an area 801a positioned inside the area 801b, and the metallic region formed by the plating reaction is not present in the area 801a.

The specific gravity of the molded product having the plating film of this embodiment is preferably not more than 1.2 g/cm$^3$. By making the specific gravity be not more than 1.2 g/cm$^3$, the molded product of this embodiment can be used as a lightweight heat radiating member. For example, in a case that thermal conductivity of a conventional heat-radiating resin material is not less than 5 W/mK, the specific gravity thereof is not less than 1.4 g/cm$^3$. Thus, there is such a problem that the specific gravity is high. On the other hand, regarding the foam molded product, although it is possible to reduce the weight thereof by reducing and foaming the heat-radiating resin material, there is such a problem that the heat radiating efficiency is decreased. The molded product of this embodiment includes the plating film having high tight contact property and high quality on the surface thereof, and thus it is possible to complement the decline of the heat radiating efficiency of the foam molded product by the plating film. Accordingly, the specific gravity of the molded product of this embodiment can be not more than 1.2 g/cm$^3$ without decreasing the heat radiating efficiency.

For the molded product having the plating film of this embodiment, weight change due to water absorption after immersion in water at 23 degrees Celsius for 24 hours is preferably not more than 0.5%. According to investigation by the inventors of the present invention, the foam molded product in which the plating film is not formed has high water absorption as compared with general non-foam molded products, and thus the linear expansion coefficient also becomes high. Therefore, there is such a problem that reliability of use under the environment having high temperature and high humidity is low.

However, the molded product having the plating film of this embodiment includes the plating film having high tight contact property and high quality on the surface thereof, and thus water absorption into the molded product can be suppressed. By making the weight change due to the water absorption after the immersion in water at 23 degrees Celsius for 24 hours be not more than 0.5%, the molded product having the plating film of this embodiment has a low linear expansion coefficient and can withstand the use under the environment having high temperature and high humidity.

As described above, the molded product having the plating film of this embodiment includes the plating film having high tight contact property and high quality on the surface thereof, and thus the molded product having the plating film of this embodiment is lightweight and has reliability under the environment having high temperature and high humidity, while maintaining performance of the metallic part (metallic element or component) such as heat radiating performance. The molded product having the plating film of this embodiment can be used, for example, as a lightweight heat-radiating member. Further, since the contraction of the molded product having the plating film of this embodiment is suppressed by inner foaming, size precision is also improved.

[Fifth Embodiment]

Figure 10:
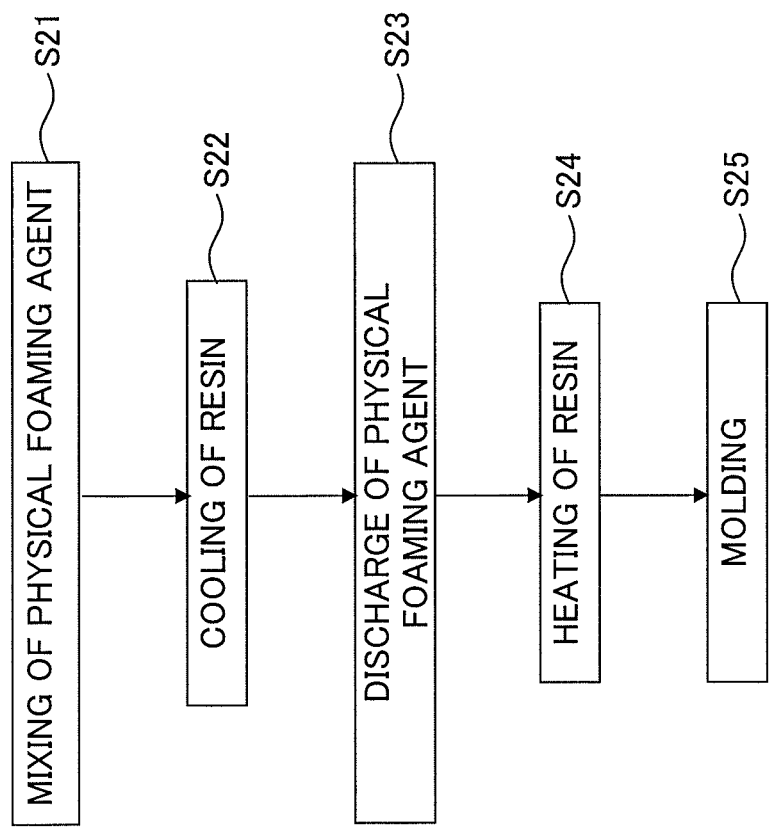
FIG. 10 is a flowchart showing a foam injection molding method in the fifth embodiment.
Figure 11:
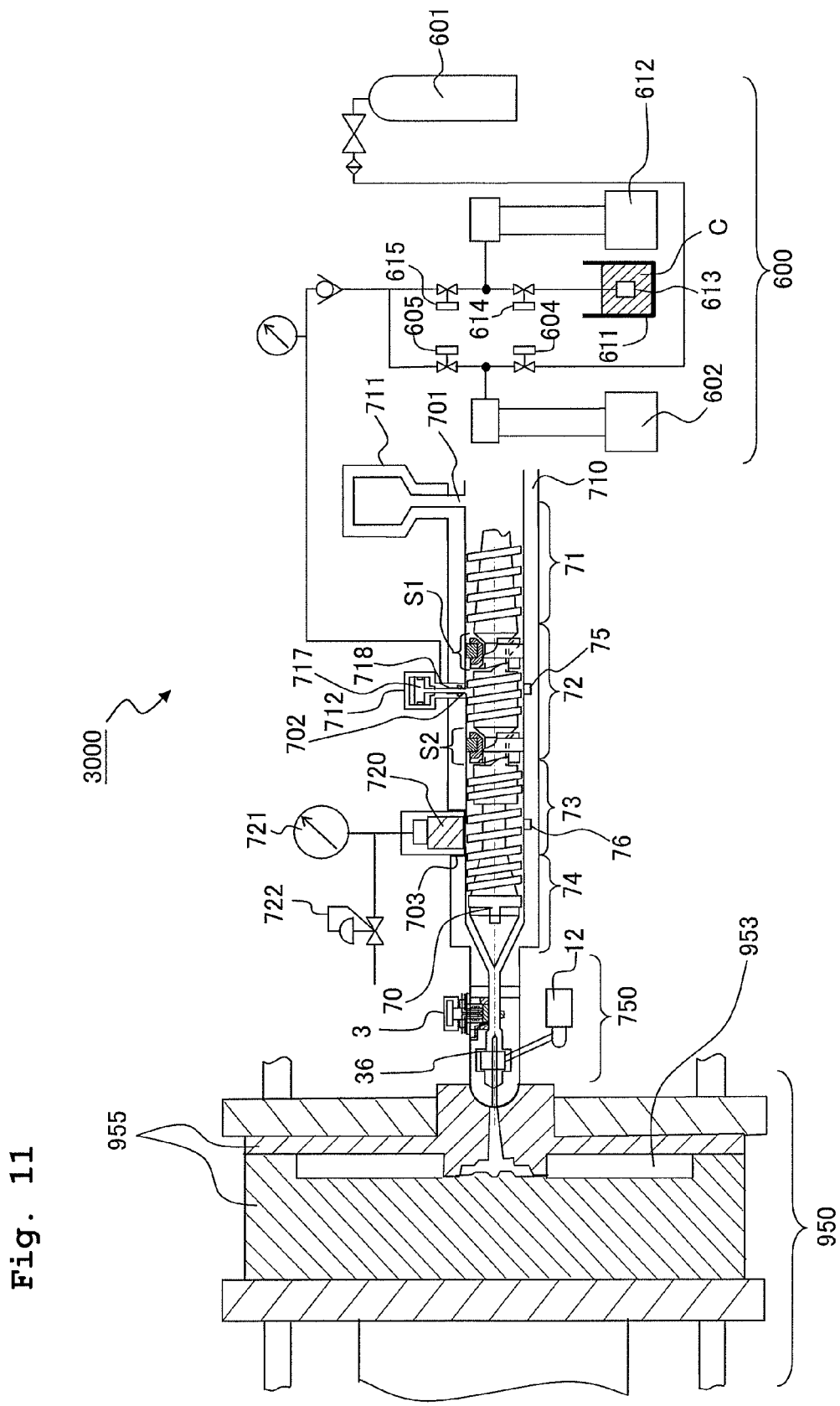
FIG. 11 schematically shows an injection molding apparatus used in the fifth embodiment.

As the fifth embodiment, an explanation will be made about a foam injection molding method as shown in FIG. 10 (a method for producing a foam molded product). The foam injection molding method of this embodiment is performed by using an injection molding apparatus 3000 including, for example, a plasticizing cylinder 710, a mold 955, and a nozzle unit 750 positioned between the plasticizing cylinder 710 and the mold 955, as shown in FIG. 11. At first, resin is plasticized and melted in the plasticizing cylinder 710 of the injection molding apparatus, and a physical foaming agent is mixed with the resin plasticized and melted (step S21).

As the resin, various kinds of resins can be used depending on the type of foam molded product as an objective. For example, a resin which is the same as the thermoplastic resin used in the first embodiment can be used. Further, as the resin of this embodiment, it is also possible to use the resin pellet of the block copolymer containing the functional material or the resin pellet in which the metallic fine particles are dispersed in the thermoplastic resin, explained in the first to third embodiments.

In this embodiment, the physical foaming agent is preferably pressurized fluid such as pressurized carbon dioxide or pressurized nitrogen. The pressurized fluid is inexpensive and clean, and residue thereof is less likely to remain. Further, the pressurized fluid is more likely to be compatibly dissolved in the thermoplastic resin. Accordingly, the pressurized fluid is suitable for the physical foaming agent.

Regarding the temperature and the introduction pressure into the plasticizing cylinder of the physical foaming agent, appropriate conditions vary depending on the type of physical foaming agent and the like, and any appropriate conditions may be employed. Using the high pressure physical foaming agent, such as the physical foaming agent in a supercritical state, is not necessarily indispensable. However, since the density is high and the state is stable, the physical foaming agent in a liquid state or supercritical state is preferable. In a case that pressurized carbon dioxide or pressurized nitrogen is used, the pressure is preferably 3 to 25 MPa, and the temperature is preferably 10 degrees Celsius to 100 degrees Celsius. In a case that the pressure is not less than 3 MPa, pressurized carbon dioxide or pressurized nitrogen can be introduced in the plasticizing cylinder 210 stably; and in a case that the pressure is not more than 25 MPa, the load on the apparatus is reduced. Further, in a case that the temperature is within a range of 10 degrees Celsius to 100 degrees Celsius, the physical foaming agent is easily controlled in the system. As for pressurized nitrogen and pressurized carbon dioxide used as the physical foaming agent in this embodiment, the temperature instantaneously becomes high in the plasticizing cylinder and the pressure varies or fluctuates as well. Therefore, the states, the values of temperature, and the values of pressure of the physical foaming agent as described above indicate the states, the values of temperature, and the values of pressure of the physical foaming agent in a stable state before the physical foaming agent is introduced into the plasticizing cylinder.

A method for preparing the physical foaming agent and supplying the physical foaming agent in the plasticizing cylinder is not especially limited, and any known method can be used. The physical foaming agent may be introduced in the plasticizing cylinder intermittently or continuously. For example, as will be described later on, it is possible to prepare the physical foaming agent and supply the physical foaming agent in the plasticizing cylinder by using a physical foaming agent supply apparatus 600 provided with a syringe pump, such as a syringe or injector, for sucking the physical foaming agent and performing liquid feeding shown in FIG. 11. In a case that the syringe pump provided for the physical foaming agent supply apparatus 600 is used, the amount of introduction of the physical foaming agent is easily controlled and stable liquid feeding can be performed. The preparation and supply of the physical foaming agent may be performed by a commercially available supercritical fluid supply apparatus for a MuCell (trade name) molding machine.

Further, in this embodiment, the metallic fine particles may be dissolved or dispersed in the physical foaming agent, and the metallic fine particles and the physical foaming agent may be mixed with the resin plasticized and melted. In this case, the metallic fine particles are included in the foam molded product molded in this embodiment. Since the metallic fine particles function as the catalyst of the electroless plating, the electroless plating solution may be brought into contact with the foam molded product molded in this embodiment to form the plating film on the surface of the foam molded product as will be described later on. It is possible to use, for example, metallic fine particles which are the same as the metallic fine particles used in the first embodiment as the functional material.

In particular, for example, the thermoplastic resin is plasticized and melted in the plasticizing cylinder of the injection molding apparatus; the physical foaming agent in which the metallic fine particles are dissolved is introduced into the plasticizing cylinder; and the molten resin and the physical foaming agent are mixed in the plasticizing cylinder. In a case that the metallic fine particles are dispersed in the thermoplastic resin by using the physical foaming agent, the metallic fine particles can be unevenly distributed in a depth area in a range of approximately 1 to 5 μm from the outermost surface of the resin molded product. The metallic fine particles, which are present in a deep area below the surface of the resin molded product, can not be involved in the electroless plating reaction. Thus, by unevenly distributing the metallic fine particles in the vicinity of the surface of the resin molded product, use efficiency of expensive metallic fine particles can be improved and the cost can be reduced. Further, in a case that the physical foaming agent is used, the particle size of each metallic fine particle to be the catalyst core can be reduced remarkably and the molded product, as an object to be subjected to the plating, having high degree of plating reactivity can be produced.

Further, the physical foaming agent may include a solvent in which the metallic fine particles are dissolved. For example, in a case that a metal complex is used as the metallic fine particles, a fluorine-based organic solvent such as perfluoropentylamine may be used in order to raise the concentration of the metal complex in the physical foaming agent.

The concentration of the metallic fine particles in the physical foaming agent can be selected appropriately in consideration of the type of metallic fine particles, and is not especially limited. In view of the permeability into the molten resin and the aggregation of the metallic fine particles in the physical foaming agent, the concentration of the metallic fine particles in the physical foaming agent is preferably not more than the saturated solubility. Especially, since the density of the physical foaming agent is rapidly decreased in the plasticizing cylinder of the injection molding apparatus subjected to a high temperature, the concentration of the metallic fine particles in the physical foaming agent is preferably about 1 to 50% of the saturated solubility.

Next, the resin in which the physical foaming agent is dissolved is fed to the nozzle unit 750 positioned between the plasticizing cylinder 710 and the mold 955; the resin is cooled in the nozzle unit 750 (step S22 of FIG. 10); and the physical foaming agent is discharged from the cooled resin (step S23). As shown in FIGS. 12A and 12B, a resin channel 6 ranging from the plasticizing cylinder 710 to the mold 955 is formed in the nozzle unit 750.

In this embodiment, discharge of the physical foaming agent is performed by the nozzle unit 750 positioned between the plasticizing cylinder 710 and the mold 955 to discharge the physical foaming agent from the flow front portion of the resin just before being injected into the mold 955, and thereby decreasing the concentration of the physical foaming agent included in the flow front portion. Accordingly, it is possible to prevent that the physical foaming agent is gasified from the flow front portion to be discharged into the mold 955 prior to the molten resin. Further, the flow front portion of the flowing resin in the mold 955 forms the surface layer (skin layer) of the molded product while being pulled by the surface of the mold 955 due to fountain flow phenomenon (fountain effect). Thus, it is possible to prevent that the concentration of the physical foaming agent at the flow front portion is decreased and that the physical foaming agent is gasified from the skin layer of the molded product to be discharged into the mold. As described above, in this embodiment, the discharge of the gasified physical foaming agent into the mold, which causes a swirl mark on the surface of the molded product, is suppressed, and thereby making it possible to prevent occurrence of the poor appearance of the molded product.

In this embodiment, although the physical foaming agent is discharged from the flow front portion of the resin in the nozzle unit 750 to reduce the concentration of the physical foaming agent, the concentration of the physical foaming agent at other portions of the molten resin is less likely to be influenced. The portion(s), of the molten resin, other than the flow front portion forms the core layer as the inside of the foam molded product. In this embodiment, since the physical foaming agent can sufficiently remain in the resin at the portion(s) forming the core layer, it is possible to form the foam molded product having a smooth surface, no poor appearance, and sufficient foamed cells therein.

In this embodiment, by using the nozzle unit 750, a general-purpose mold can be used as the mold 955, thereby making it possible to reduce mold cost. Further, the nozzle unit 750 of this embodiment may be configured integrally with the plasticizing cylinder 710 or may be used by being attached to a plasticizing cylinder of a general-purpose injection molding apparatus.

In this embodiment, since the physical foaming agent is discharged after the resin is cooled in the nozzle unit 750, phenomenon called vent up of the resin can be suppressed. The vent up means the phenomenon in which the molten resin is discharged simultaneously with the physical foaming agent from a discharge port from which the physical foaming agent is discharged. The main cause of the vent up is considered as follows. That is, the viscosity of the resin is decreased by kneading the physical foaming agent, and further, pressure is rapidly reduced due to the discharge of the physical foaming agent, thereby expanding the volume of the resin. In a case that the physical foaming agent is tried to be discharged from the resin which is plasticized and melted and has low viscosity, it is difficult to suppress the rapid volume expansion of the resin, which causes the vent up. In this embodiment, the resin in which the physical foaming agent is dissolved is cooled and solidified or made to have high viscosity. Thus, only the physical foaming agent can be discharged from the discharge port and occurrence of the vent up can be suppressed.

In the plasticizing cylinder 710, a screw 70 having a function for plasticizing and melting the resin to inject and charge the resin into the mold is provided rotatably and movably back and forth. In a case that a part of the resin being brought into contact with the screw 70 is cooled and the viscosity thereof is increased, the screw 70 has a large load at the time of being rotationally driven. In this embodiment, the resin is cooled in the nozzle unit 750 positioned outside a mobile region of the screw 70, and thus it is not a burden for the drive of the screw 70. The cross-section area of the resin channel 6 of the nozzle unit 750 is preferably smaller than the cross-section area of the screw 70 in order that the screw 70 is prevented from entering into the resin channel 6 of the nozzle unit 750 in which the cooling is performed.

A method for cooling the plasticized and molten resin is arbitrary. In this embodiment, as shown in FIGS. 12A, 12B, 13A, and 13B, the resin is cooled by circulating water through a temperature adjustment channel 2 in the nozzle unit 750. The temperature of the resin after the cooling varies according to the type of resin, but is preferably 50 degrees Celsius to 150 degrees Celsius. An object of the cooling of the resin is to increase the viscosity of the resin including the physical foaming agent (gas) and having low viscosity. By cooling the resin within this temperature range, it is suppressed that the molten resin is discharged simultaneously with the physical foaming agent at the time of the discharge of the physical foaming agent.

A method for discharging the physical foaming agent mixed with the resin is arbitrary. In this embodiment, the physical foaming agent is discharged by a physical foaming agent discharge mechanism 3 provided for the nozzle unit 750. As shown in FIGS. 12A, 12B, 13A, and 13B, the physical foaming agent discharge mechanism 3 includes a resin holding section 10 forming a part of the wall surface of the resin channel 6, a piston 4 connected to the resin holding section 10 and moving the resin holding section 10 backward to widen the resin channel 6, and a discharge channel 5 configured to connect the resin channel 6 and the outside of the nozzle unit 750 by the backward movement of the piston 4. As shown in FIG. 12B, a surface, of the resin holding section 10, forming a part of the wall surface of the resin channel 6 is a curved surface so as to make the resin channel 6 have a cylindrical shape.

The discharge of the physical foaming agent is performed, for example, as follows. A resin 9, which is positioned at a channel L at which the cooling and heating of the resin channel 6 are performed as shown in FIGS. 13A and 13B, is cooled and solidified or made to have high viscosity. Then, the piston 4 is driven to move the resin holding section 10 backward in a state that the resin channel 6 and the outside of the nozzle unit 300 are disconnected from each other as shown in FIG. 13A, thereby the resin channel 6 is communicated with the outside of the nozzle unit 750 via the discharge channel 5 as shown in FIG. 13B. By communicating the resin channel 6 with the outside of the nozzle unit 750 as atmospheric pressure as shown in FIG. 13B, the pressure in the resin channel 6 is decreased and the physical foaming agent in the resin 9 is gasified and discharged.

As shown in FIG. 13B, it is preferable that a gap D is provided between the resin 9 cooled and solidified and the wall surface of the resin channel 6 contacting with the resin 9 at the time of discharging the physical foaming agent. By providing a sufficient gap between the resin 9 cooled and solidified and the wall surface of the resin channel 6, the area of a part of the resin, at which the gasified physical foaming agent is discharged, is expanded, thereby making it possible to efficiently discharge the physical foaming agent in a short time. Although the size of the gap D is arbitrary, it is preferably in a range of about 0.01 to 10 mm. In a case that the size of the gap D is too small, the discharge efficiency of the foaming agent is decreased; and in a case that the size of the gap D is too large, burden on a driving section for providing the gap D is increased and sealing performance is decreased. A method for moving a part of the wall surface of the resin channel 6 backward is arbitrary, and it is possible to use, for example, an approach or technique for moving the piston or cam in an up-down direction by a driving source such as air, oil pressure, or electroactuation.

Figure 14:
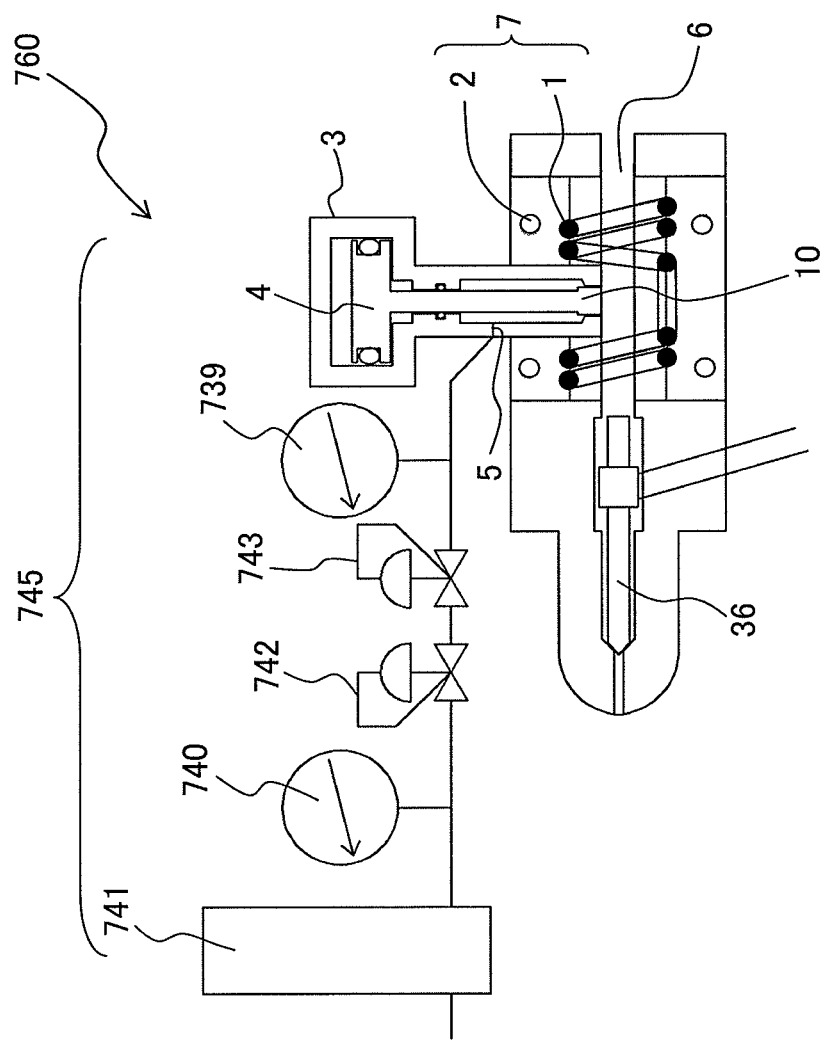
FIG. 14 schematically shows a nozzle unit used in Example 9.
Figure 15:
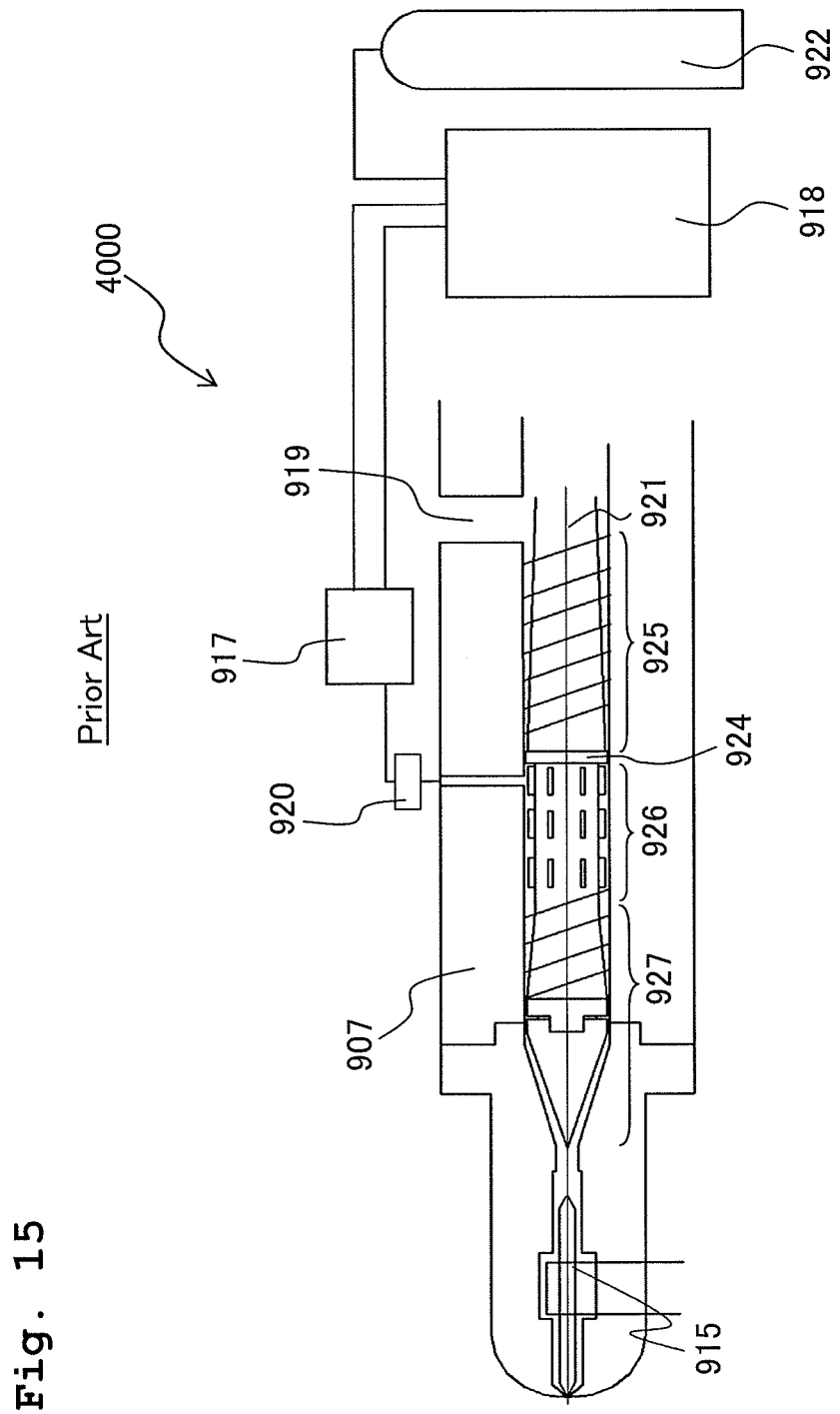
FIG. 15 schematically shows a conventional injection molding apparatus.

As described above, in this embodiment, by communicating the resin channel 6 with the outside of the nozzle unit 750 as atmospheric pressure via the discharge channel 5 as shown in FIG. 13B, the physical foaming agent is naturally discharged. However, an arbitrary method for discharging the physical foaming agent may be adopted, for example, the physical foaming agent may be discharged, by using a physical foaming agent discharge mechanism 745 of a nozzle unit 760 as shown in FIG. 14, while controlling the pressure and/or flow rate of the physical foaming agent discharged. The physical foaming agent discharge mechanism 745 shown in FIG. 14 is provided with a back pressure valve 743, a pressure-reducing valve 742, a flow rate control device 741, and the like on the discharge channel 5, and thus it is possible to discharge the physical foaming agent while controlling the pressure and/or flow rate. As described above, in a case that the physical foaming agent is discharged by the physical foaming agent discharge mechanism while controlling the pressure and/or flow rate of the physical foaming agent, the amount of discharge of the physical foaming agent from the forward end of the nozzle unit 760 is less likely to change. Further, the method for discharging the physical foaming agent may be a method in which a vacuum pump or the like is provided on the discharge channel 5 of the nozzle unit to discharge the physical foaming agent compulsory. The discharge amount of the physical foaming agent can be controlled depending on the discharge time of the physical foaming agent, the pressure and/or flow rate of the physical foaming agent discharged, and the like.

Next, the resin, from which a predetermined amount of physical foaming agent was discharged, is heated in the nozzle unit 750 (step S24 in FIG. 10). As described above, the discharge of the physical foaming agent is performed in a state that the molten resin is cooled and solidified. In a case that the resin is injected and charged into the mold in a state that a part of the resin is solidified, the injection molding apparatus has a large load. Thus, the resin solidified in the nozzle unit is heated and remelted before the injection and charging. The resin is preferably heated to 150 degrees Celsius to 400 degrees Celsius. By heating the resin to this temperature range, the viscosity of the resin, of which viscosity is increased at the time of discharging the physical foaming agent (gas), and flow resistance of the nozzles are decreased. Accordingly, it is possible to perform the injection and charging of the molten resin into the mold smoothly.

A method for heating the resin is arbitrary. Although a heater or hot-air heating can be employed, it is preferable to use an electromagnetic induction heating method by which heating and temperature rising can be performed in a short time. In the electromagnetic induction heating method, the temperature rising can be performed in a short time by passing electrical current through a coil, and the heating can be stopped easily by stopping the electrical current. Usually, high output is needed in a power source of the electromagnetic induction heating method. In this embodiment, however, it is only necessary to heat the resin channel 6, of the nozzle unit 750, having a small cross-section area and small volume. Thus, the power source can be downsized and the cost can be reduced. In this embodiment, the heating of the resin is performed by the electromagnetic induction heating as follows. That is, a copper pipe 1 is provided to coil around the piston 4, and the electrical current is allowed to pass through the copper pipe 1.

As described above, in this embodiment, the resin is cooled in the resin channel 6 of the nozzle unit 750 (step S22 of FIG. 10), and subsequently the resin is heated (step S24). In a case that a plurality of shots of foam injection molding are performed continuously, the cooling and heating of the resin are repeated alternately. Therefore, the volume of the resin cooled and solidified is preferably small in the resin channel 6 of the nozzle unit 750. In a case that the volume of the resin cooled and solidified is small, a heating-cooling cycle time can be shortened and energy required therefor can be saved. Therefore, it is preferable that the cross-section area of the resin channel 6 is small as much as possible and the length of resin solidified in a flow direction is a minimum. At least the cross-section area of the resin channel 6 is preferably smaller than the cross-section area of the plasticizing cylinder 710. However, in a case that the volume of the resin solidified is too small, there is fear that the resin solidified is extruded by surrounding molten resin to cause the vent up. In view of the above, for example, in a case that the resin channel 6 has a cylindrical shape, it is preferable that the circular cross-section of the resin channel 6 is $\phi$ 2 to 100 mm, and the length of the resin solidified in the flow direction is 1 to 100 mm.

Next, the heated resin is injected and charged into the mold 955 to form the foam molded product (step S25). For example, the resin is injected into the mold, and then the mold is slightly opened without applying the pressure keeping (core back), thereby completing the molded product. Accordingly, the pressure of the resin including the physical foaming agent is reduced rapidly in the mold, and the molded product (foam molded product) formed with the foamed cells is molded.

In this embodiment, as described above, the metallic fine particles may be dissolved or dispersed in the physical foaming agent, and the metallic fine particles and the physical foaming agent may be mixed with the resin plasticized and melted. In this case, the metallic fine particles are included in the foam molded product. Since the metallic fine particles function as the catalyst of the electroless plating, the electroless plating solution may be brought into contact with the foam molded product molded in this embodiment to form the plating film on the surface of the foam molded product.

[Sixth Embodiment]

As the sixth embodiment, an explanation will be made about the nozzle unit used in the foam injection molding method of the fifth embodiment. As shown in FIGS. 11 to 13, the nozzle unit 750 in this embodiment is provided for the injection molding apparatus 3000 and positioned between the plasticizing cylinder 710 and the mold 955. In the plasticizing cylinder 710, the resin is plasticized and melted and the physical foaming agent is introduced into the resin. The resin which is plasticized and melted and into which the physical foaming agent is introduced is injected and charged into the mold 955 via the nozzle unit 750. In the nozzle unit 750, the resin channel 6 ranging from the plasticizing cylinder 710 to the mold 955 is formed, and further a temperature control mechanism 7 performing temperature control of the resin in the resin channel 6 and the physical foaming agent discharge mechanism 3 discharging the physical foaming agent from the resin in the resin channel 6 are provided.

The physical foaming agent discharge mechanism 3 is the same as that explained in the fifth embodiment. A part of the wall surface forming the resin channel 6 is preferably provided drivably to expand the cross-section area of the resin channel 6, that is, to increase the volume of the resin channel 6. In the nozzle unit 750 of this embodiment, the resin holding section 10 forming a part of the wall surface of the resin channel 6 is provided to movable backward to expand the cross-section area of the resin channel 6. Accordingly, in a case that the physical foaming agent dissolved in the resin is discharged, a gap is provided between the resin cooled and solidified and the wall surface (resin holding section 10) of the resin channel 6, and thus it is possible to efficiently discharge the physical foaming agent in a short time.

Further, the cross-section area of the resin channel 6 of the nozzle unit 750 is preferably smaller than the cross-section area of the screw 70. This is because, there no fear that the screw 70 enters into the resin channel 6 of the nozzle unit 750. Further, it is preferable that the cross-section area of the resin channel 6 is small as much as possible and that the length in the flow direction is made to be a minimum. The reason there of is as follows. That is, by making the volume of the resin channel 6 small, the heating-cooling cycle time is shortened and the energy required therefor is saved. For example, in a case that the resin channel 6 has the cylindrical shape, the circular cross-section of the resin channel 6 is preferably $\phi$ 2 to 100 mm, and the length of the channel L at which the cooling and heating are performed is preferably 1 to 100 mm. In this embodiment, as shown in FIGS. 13A and 13B, the channel L at which the cooling and the heating are performed corresponds with a portion, of the resin holding section 10, forming the wall surface of the channel.

An arbitrary mechanism may be employed as the temperature control mechanism 7 of this embodiment, provided that the mechanism controls the temperature of the resin in the resin channel 6. The temperature control mechanism 7 of this embodiment is constructed of the temperature adjustment channel 2 circulating water and provided in the nozzle unit 750; and the copper pipe 1 provided to coil around the piston 4 and through which the electrical current is allowed to pass. The temperature adjustment channel 2 is a mechanism for cooling the resin, and the copper pipe 1 is an electromagnetic induction heating mechanism in which the resin is heated by the electromagnetic induction heating method. As the mechanism for heating the resin, the electromagnetic induction heating mechanism in which the heating and temperature rising can be performed in a short time is preferable.

The nozzle unit 750 of this embodiment may be configured integrally with the plasticizing cylinder 710 to form a part of the plasticizing cylinder. Alternatively, the nozzle unit of this embodiment may be a removable unit provided separately from the plasticizing cylinder 710. In a case that the nozzle unit is provided separately from the plasticizing cylinder, it is possible to use the nozzle unit of this embodiment in a state of being attached to the forward end portion of the plasticizing cylinder of a general-purpose injection molding apparatus.

[Seventh Embodiment]

As the seventh embodiment, an explanation will be made about the injection molding apparatus using the nozzle unit of the sixth embodiment. As shown in FIG. 11, the foam injection molding apparatus 3000 of this embodiment includes the plasticizing cylinder 710 in which the resin is plasticized and melted and the physical foaming agent is introduced in the resin; the mold 955 into which the resin, which is plasticized and melted and into which the physical foaming agent is introduced, is injected and charged; and the nozzle unit 750 in which the resin channel 6 ranging from the plasticizing cylinder 710 to the mold 955 is formed. The nozzle unit 750 is the same as that explained in the sixth embodiment. As described above, the nozzle unit 750 may be configured integrally with the plasticizing cylinder 710 to form a part of the plasticizing cylinder. Alternatively, the nozzle unit of this embodiment may be a removable unit provided separately from the plasticizing cylinder 710. The foam injection molding method of the fifth embodiment can be performed by using the injection molding apparatus of this embodiment to obtain the foam molded product which has the smooth surface and is less likely to have the poor appearance.

As described above, the method for producing the molded product of the present teaching can produce the molded product of which surface is modified by the functional material by using the molding machine such as a general-purpose injection molding machine or extrusion molding machine. Therefore, the investment for facilities such as introduction of a new molding machine is not required. Further, since the functional material can be unevenly distributed in the vicinity of the surface of the molded product, the content of the functional material used to modify the surface of the molded product can be reduced, and thereby making it possible to suppress material cost. Further, the method for producing the molded product of the present teaching can produce the molded product containing the metallic fine particles by using the molding machine such as a general-purpose injection molding machine or extrusion molding machine. For the molded product containing the metallic fine particles, there is no need to apply the catalyst on the surface of the molded product in order to perform the electroless plating. Thus, there is no need to perform a surface treatment using any chemical having heavy environmental burden in order to apply the catalyst.

In a case that the foam molded product is produced by using the molding machine provided with the nozzle unit of the present teaching, the foam molded product has the smooth surface and it is possible to suppress occurrence of poor appearance such as a swirl mark. By solving the problem of the poor appearance, the foam molded product can be easily applied to a decorative plating and the like, and added-value thereof can be increased.

EXAMPLES

Hereinafter, the present teaching will be described in detail by Examples and Comparative Examples. However, the present teaching is not limited to Examples and Comparative Examples described below.

Example 1

Figure 2:
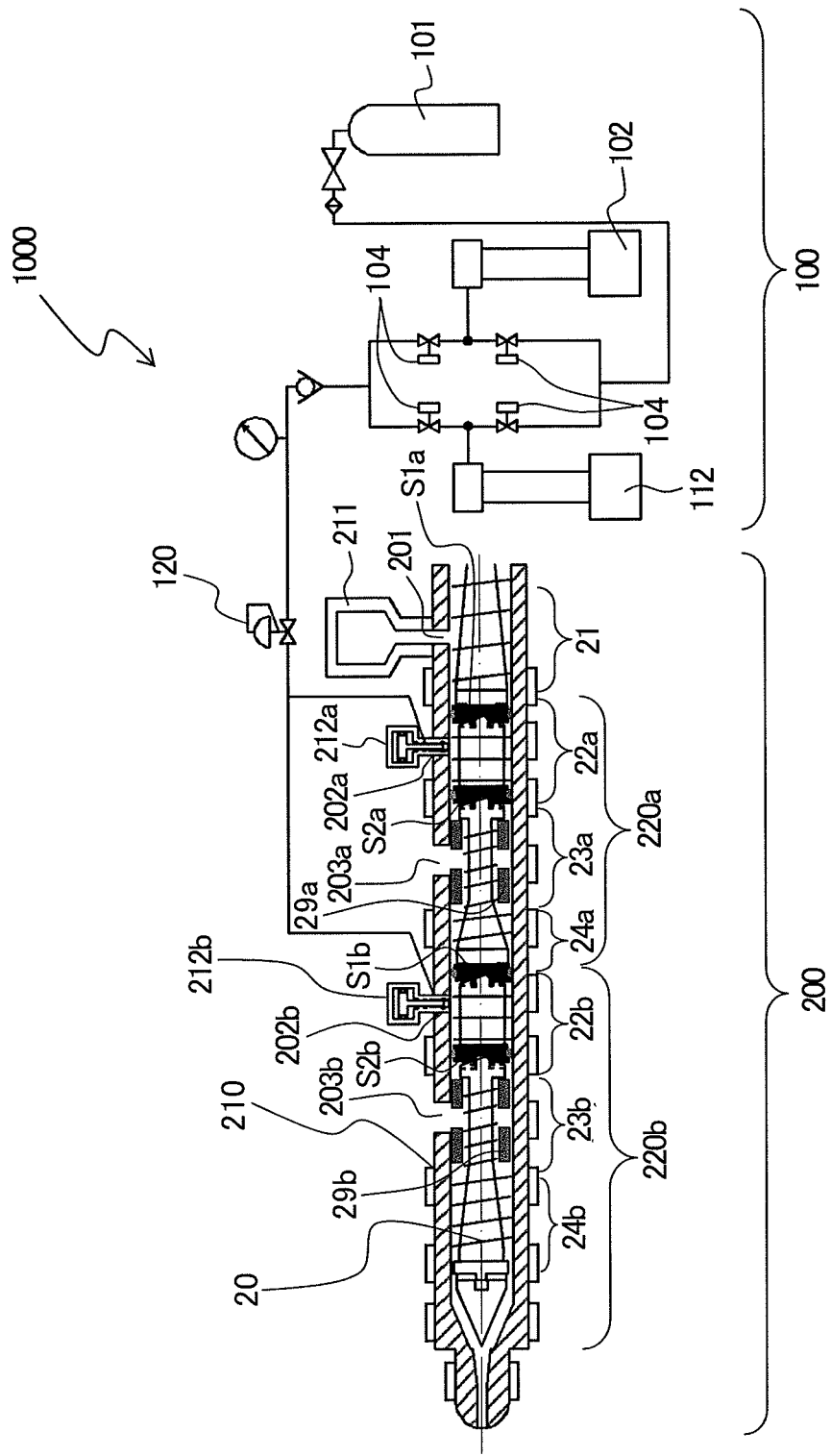
FIG. 2 schematically shows a resin pellet production apparatus used in Example 1.

In Example 1, a pellet was produced by mixing a block copolymer with a functional material using a pellet production apparatus shown in FIG. 2, and the pellet produced was mixed with a thermoplastic resin to obtain a molded product. A polyether-ester amide block copolymer (produced by Sanyo Chemical Industries, Ltd., PELESTAT NC6321) was used as the block copolymer; a palladium complex (hexafluoroacetyl-acetonato palladium (II)) as the metallic fine particles was used as the functional material; a glass-fiber reinforced polyamide resin (Nylon 6) (produced by Toray, Amilan CM1011G30) was used as the thermoplastic resin. Further, in this example, a plating film was formed on the obtained molded product.

<Pellet Production Apparatus>

At first, an explanation will be made about an apparatus used for producing a resin pellet in this example. As shown in FIG. 2, a pellet production apparatus 1000 includes an extrusion molding device 200 performing extrusion molding of the block copolymer; a pressurized fluid supply device 100 supplying pressurized carbon dioxide (mixture pressurized fluid) containing the metallic fine particles to the extrusion molding device 200; and a controller (not shown). The controller controls operations of the pressurized fluid supply device 100 and the extrusion molding device 200.

The pressurized fluid supply device 100 is constructed of a pressurized carbon dioxide bomb 101 of the siphon type, two syringe pumps 102, 112, and four air operate valves 104. A liquid phase portion of the pressurized carbon dioxide bomb 101 is a mixture pressurized fluid in which the palladium complex as the functional material is dissolved at solubility lower than the saturated solubility, and the temperature is adjusted from the outside of the bomb by an unillustrated temperature adjustment mechanism in order to keep pressure and density constant. Suction of the mixture pressurized fluid from the bomb 101, pressurization of the mixture pressurized fluid, and supply of the mixture pressurized fluid to the extrusion molding device 200 are repeated by the two syringe pumps 102, 112 alternately, thereby supplying the mixture pressurized fluid to the extrusion molding device 200 continuously. The syringe pumps 102, 112 can take the mixture pressurized fluid therein while keeping the concentration of the palladium complex in the mixture pressurized fluid constant, and can supply the mixture pressurized fluid to the extrusion molding device 200 while performing flow rate control of the mixture pressurized fluid. The mixture pressurized fluid is supplied via a back pressure valve 120. The suction and supply by the syringe pumps 102, 112 are automatically controlled by the four air operate valves 104.

Figure 4:
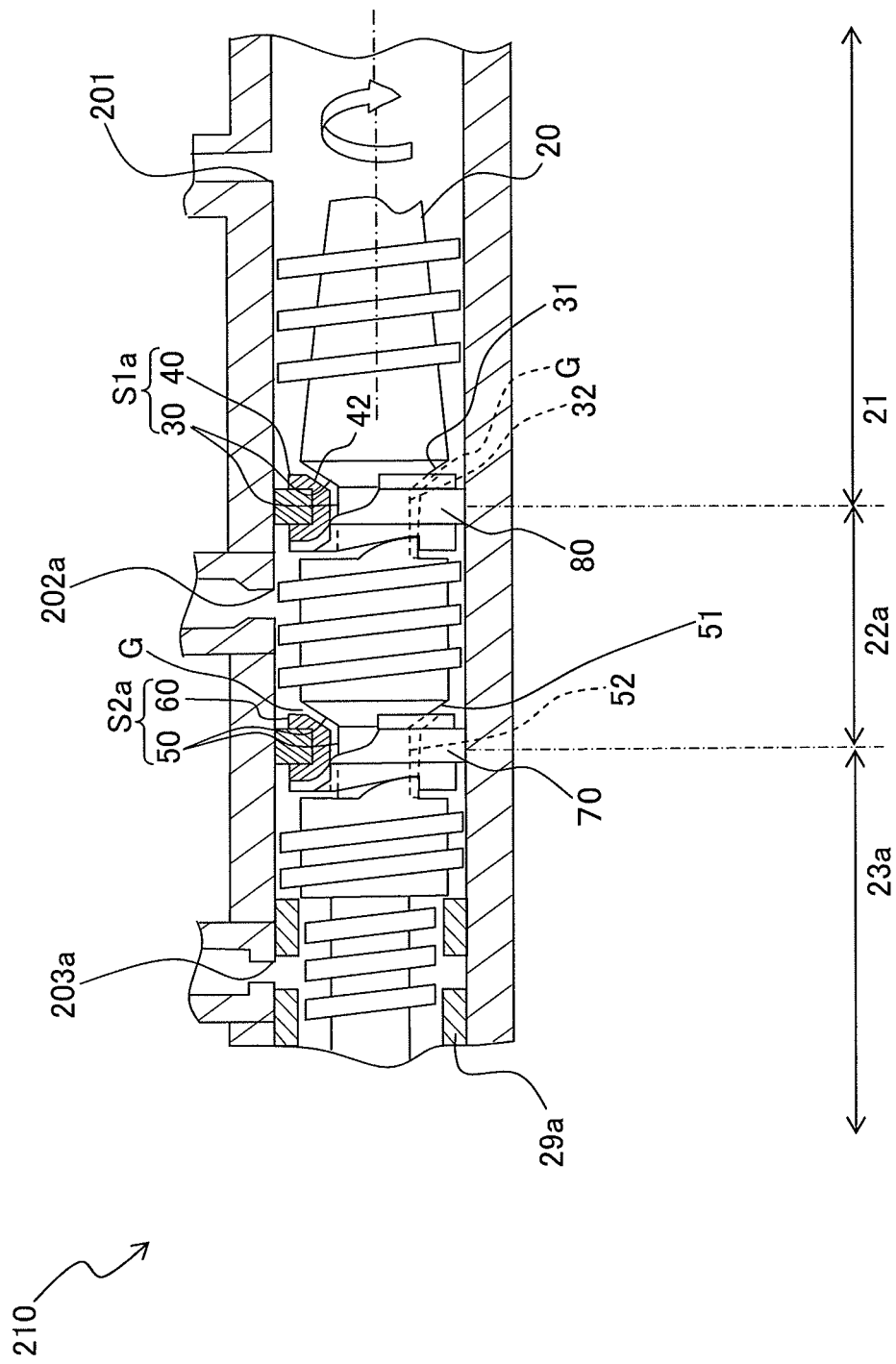
FIG. 4 is a schematic cross-sectional view of the plasticizing cylinder of the resin pellet production apparatus shown in FIG. 2, depicting a state in which a plasticizing zone, a high pressure kneading zone, and a pressure reduction zone are communicated with one another.
Figure 5:
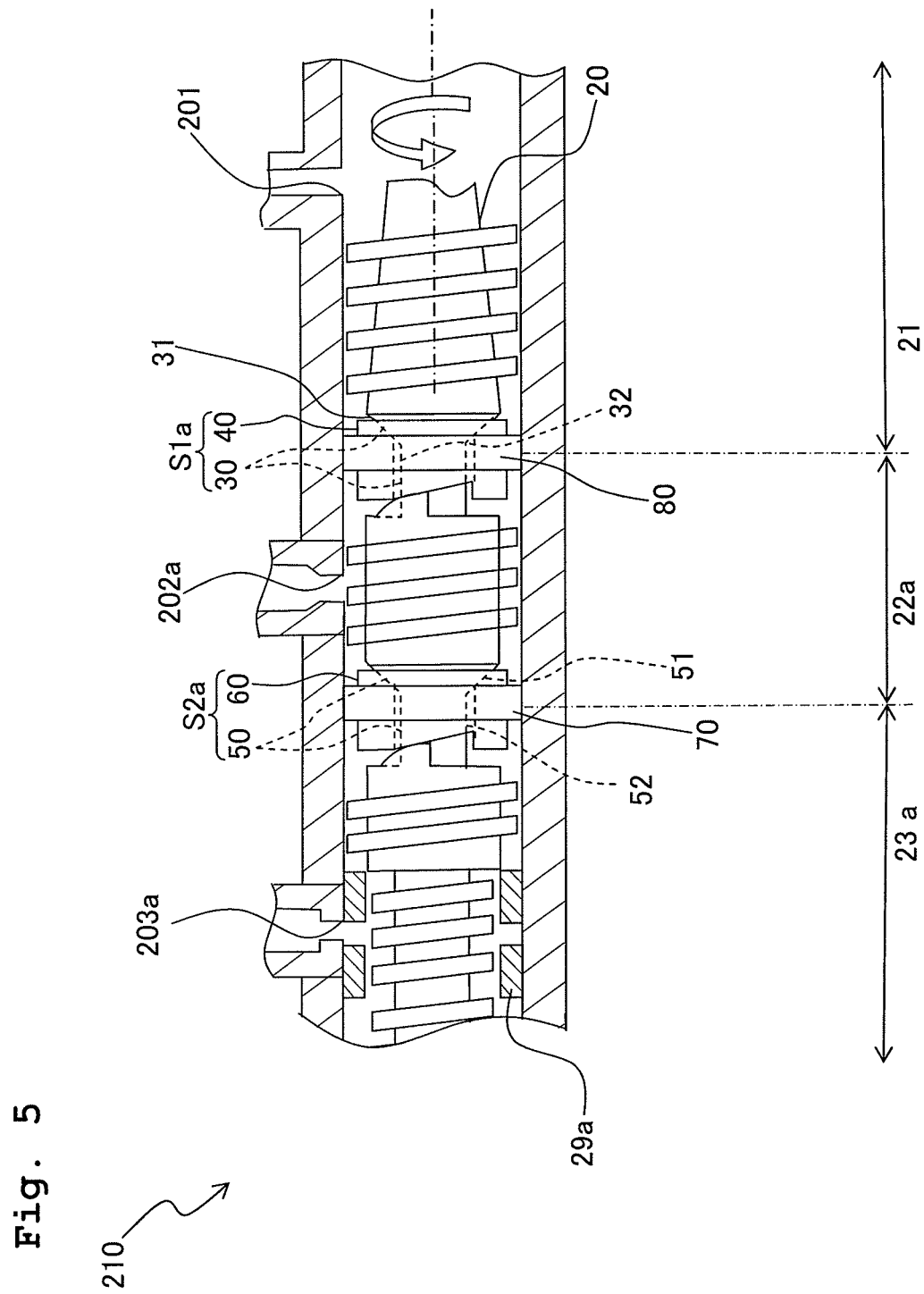
FIG. 5 is a schematic cross-sectional view of the plasticizing cylinder of the resin pellet production apparatus shown in FIG. 2, depicting a state in which the plasticizing zone, the high pressure kneading zone, and the pressure reduction zone are disconnected from one another.

The extrusion molding device 200 includes a plasticizing cylinder 210; a screw 20 rotatably provided in the plasticizing cylinder 210; upstream side seal mechanisms S1a, S1b and downstream side seal mechanisms S2a, S2b disposed in the plasticizing cylinder 210; and ring-shaped vent-up preventing covers 29a, 29b through which the screw 20 penetrates. In this Example, the block copolymer plasticized and melted is allowed to flow from the right to the left in the plasticizing cylinder 210 as viewed in FIGS. 2, 4 and 5. Therefore, the right as viewed in FIGS. 2, 4 and 5 is defined as "upstream" or "backward", and the left is defined as "downstream" or "frontward" at the inside of the plasticizing cylinder 210 in this Example.

Further, although not shown in the drawings, a rotary driving means such as a rotation motor or the like for rotating the screw 20 is connected to a back end portion of the plasticizing cylinder 210 disposed on the upstream side. As shown in FIGS. 4 and 5, the extrusion molding device 200 of this Example is constructed so that the forward rotation is performed to feed the melted block copolymer frontward (toward the nozzle portion) when the screw 20 rotates counterclockwise, while the reverse rotation is performed when the screw 20 rotates clockwise, as viewed from the backward side of the plasticizing cylinder 210.

Those formed on the upper side surface of the plasticizing cylinder 210 are, as referred to in the following order from the upstream side, a resin supply port 201 for supplying the block copolymer to the plasticizing cylinder 210, an introducing port 202a for introducing the mixture pressurized fluid into the plasticizing cylinder 210, and a vent 203a for discharging the gasified carbon dioxide from the inside of the plasticizing cylinder 210. Further, an introducing port 202b and a vent 203b are provided on the downstream from the vent 203a. For the plasticizing cylinder 210 of this Example, the mixture pressurized fluid is introduced into the plasticizing cylinder 210 through the two introducing ports 202a, 202b, and the gasified carbon dioxide is discharged through the two vents 203a, 203b. A resin supplying hopper 211 and introducing valves 212a, 212b are arranged for the resin supply port 201 and the introducing ports 202a, 202b, respectively. Further, the introducing valves 212a, 212b are connected to the pressurized fluid supply apparatus 100.

In the extrusion molding device 200, the block copolymer is supplied from the resin supply port 201 into the plasticizing cylinder 210, and the block copolymer is plasticized by a band heater (not shown) provided for the outer wall surface of the plasticizing cylinder 210 to provide the molten resin which is fed to the downstream in accordance with the forward rotation of the screw 20. The molten resin, which is fed to the vicinity of the introducing port 202a, is brought in contact and kneaded with the introduced mixture pressurized fluid at a high pressure. Subsequently, the gasified carbon dioxide is separated from the molten resin by lowering the resin internal pressure of the molten resin brought in contact and kneaded with the mixture pressurized fluid, thereby discharging the gasified carbon dioxide from the vent 203a. Accordingly, a plasticizing zone 21 in which the block copolymer is plasticized to provide the molten resin, a high pressure kneading zone 22a in which the molten resin and the mixture pressurized fluid introduced from the introducing port 202a are brought in contact and kneaded with each other at the high pressure, and a pressure reduction zone 23a in which carbon dioxide which is separated from the molten resin by lowering the resin internal pressure of the molten resin brought in contact and kneaded with the mixture pressurized fluid is discharged from the vent 203a are formed in the plasticizing cylinder 210, as referred to in this order from the upstream side. Further, a zone for again raising pressure 24a is provided on the downstream from the pressure reduction zone 23a. In the zone for again raising pressure 24a, by making the depth of the screw flight shallow, the pressure of the thermoplastic resin is physically raised and the density is improved.

The high pressure kneading zone 22a, the pressure reduction zone 23a, and the zone for again raising pressure 24a form a first kneading section 220a. Further, the plasticizing cylinder 210 of this embodiment includes a second kneading section 220b formed of a high pressure kneading zone 22b, a pressure reduction zone 23b, and a zone for again raising pressure 24b on the downstream from the first kneading section 220a. Since the mechanism of the first kneading section 220a is similar to that of the second kneading section 220b, the first kneading section 220a will be described below.

As shown in FIGS. 2, 4, and 5, the upstream side seal mechanism S1a is arranged between the plasticizing zone 21 and the high pressure kneading zone 22a in the first kneading section 220a, and the downstream side seal mechanism S2a is arranged between the high pressure kneading zone 22a and the pressure reduction zone 23a in the first kneading section 220a. The seal mechanisms S1a and S2a temporally shut off the communication state between the zones 21, 22a, 23a. Accordingly, for example, when the mixture pressurized fluid is introduced into the high pressure kneading zone 22a, the upstream side and the downstream side of the high pressure kneading zone 22a are mechanically sealed, and the high pressure kneading zone 22a can be reliably disconnected (shut off) from the adjoining zones 21, 23*a*. As a result, the pressure of the high pressure kneading zone 22*a* is maintained at a high pressure. Therefore, the palladium complex can be effectively permeated into the molten resin. Various mechanisms are available for the upstream side seal mechanism S1*a* and the downstream side seal mechanism S2*a*, provided that the communication between the zones 21, 22*a*, 23*a* is shut off. However, in this Example, it was used a mechanism which shut off the communication between the zones depending on rotation state of the screw 20 as described later on.

The upstream side seal mechanism S1*a* and the downstream side seal mechanism S2*a* of the first kneading section 220*a* will be explained. As shown in FIGS. 4 and 5, the screw 20 has a reduced diameter portion 50 which is disposed at a boundary area between the high pressure kneading zone 22*a* and the pressure reduction zone 23*a* and which has a reduced diameter as compared with areas adjacent to the boundary area. A downstream side seal ring 60 is externally fitted to the reduced diameter portion 50 in such a loosely fitted state that the downstream side seal ring 60 is movable in the axial direction (front-back direction) within a range of the reduced diameter portion 50. The downstream side seal mechanism S2*a* is constructed by the reduced diameter portion 50 and the downstream side seal ring 60. The upstream side seal mechanism S1*a* is also constructed by a reduced diameter portion 30 and an upstream side seal ring 40 at a boundary area between the plasticizing zone 21 and the high pressure kneading zone 22*a* in the same manner as described above. In this Example, the upstream side seal mechanism S1*a* and the downstream side seal mechanism S2*a* have basically the same structure. An outer seal member 70 made of metal is fitted to the outer circumferential surface of the downstream side seal ring 60 so that the outer seal member 70 protrudes from the outer circumferential surface of the downstream side seal ring 60. Accordingly, the sealing performance is secured between the downstream side seal ring 60 and the plasticizing cylinder 210. Similarly, an outer seal member 80 is fitted to the outer circumferential surface of the upstream side seal ring 40.

The reduced diameter portion 50 of the plasticizing screw 20 is constructed by a truncated cone portion (seal portion) 51 which has a tapered surface inclined frontwardly (downwardly), and a cylindrical portion 52 which is interconnected from the truncated cone portion 51 and which has a horizontal surface extending horizontally in the axial direction. The reduced diameter portion 30 is also constructed by a truncated cone portion (seal portion) 31 and a cylindrical portion 32 in the same manner as described above.

As shown in FIG. 4, when the screw 20 is rotated forwardly (counterclockwise), the upstream side and downstream side seal rings 40, 60 are moved to the downstream side within the ranges of the reduced diameter portions 30, 50 respectively. When the downstream side seal ring 60 is moved to the downstream side with respect to the screw 20, the seal portion 51 of the reduced diameter portion 50 and the downstream side seal ring 60 are separated from each other; a gap G which serves as the passage (path) for the molten resin and pressurized carbon dioxide is formed; and the high pressure kneading zone 22*a* and the pressure reduction zone 23*a* are communicated with each other. Similarly, when the screw 20 is rotated forwardly (counterclockwise), the gap G is formed in the upstream side seal mechanism S1*a* and the plasticizing zone 21 and the high pressure kneading zone 22*a* are communicated with each other.

On the other hand, as shown in FIG. 5, when the screw 20 is reversely rotated (clockwise) at a number of revolutions not less than a predetermined number of revolutions, the downstream side seal ring 60 is moved to the upstream side with respect to the screw 20. When the downstream side seal ring 60 is moved to the upstream side with respect to the screw 20, the seal portion 51 of the reduced diameter portion 50 abuts against the downstream side seal ring 60 and the gap G is disappeared. Accordingly, the communication between the high pressure kneading zone 22*a* and the pressure reduction zone 23*a* is shut off. Similarly, when the screw 20 is reversely rotated (clockwise), the gap G of the upstream side seal mechanism S1*a* is disappeared and the communication between the plasticizing zone 21 and the high pressure kneading zone 22*a* is shut off. The upstream side seal mechanism S1*b* and the downstream side seal mechanism S2*b* of the second kneading section 220*b* have the similar mechanisms as the upstream side seal mechanism S1*a* and the downstream side seal mechanism S2*a* of the first kneading section 220*a* as described above.

Next, the vent-up preventing covers 29*a*, 29*b* will be explained. The vent-up preventing covers 29*a*, 29*b* suppress the vent up of the resin.

Figure 3A:
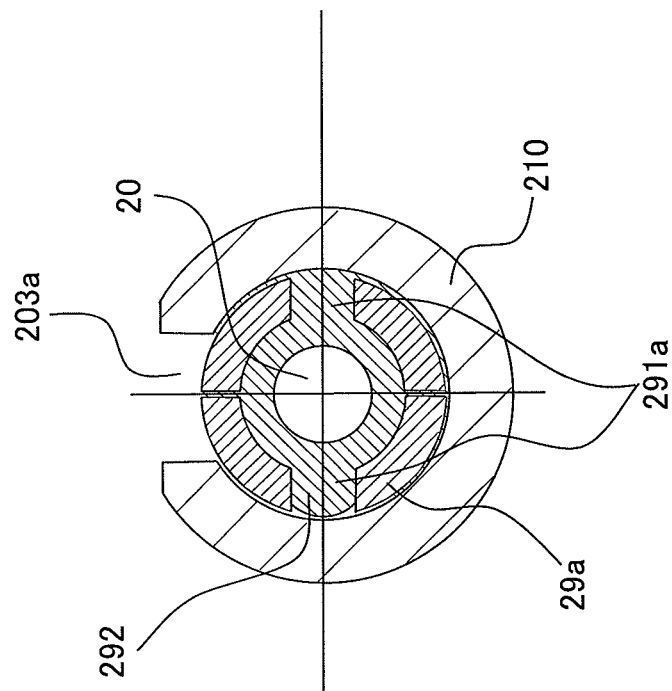
FIGS. 3A and 3B are cross-sectional views each showing the vicinity of a vent of a plasticizing cylinder of the resin pellet production apparatus shown in FIG. 2.
Figure 3B:
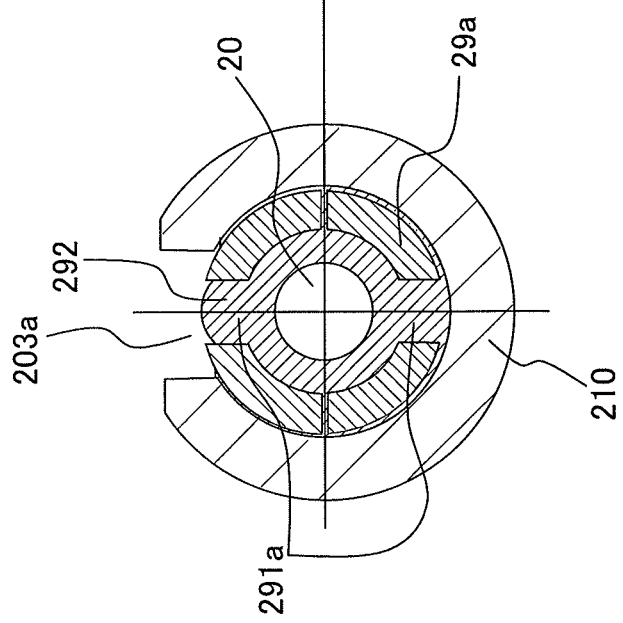

As shown in FIGS. 2 and 3, the vent-up preventing covers 29*a*, 29*b* are ring-shaped members, which are provided in the pressure reduction zone 23*a* of the first kneading section 220*a* and the pressure reduction zone 23*b* of the second kneading section 220*b*, respectively and through which the screw 20 penetrates. The vent-up preventing covers 29*a*, 29*b* are connected to the screw 20 by unillustrated pins and rotate in synchronization with rotation of the screw 20. As shown in FIGS. 3A and 3B, a melted block copolymer 292 passes through the inside of the vent-up preventing cover 29*a*, 29*b* through which the screw 20 penetrates. The vent-up preventing covers 29*a* and 29*b* are constructed in the same manner, thus an explanation will be made only about the vent-up preventing cover 29*a*. In the vent-up preventing cover 29*a*, two discharge holes 291*a* are provided at positions facing each other with the screw 20 intervening therebetween. The vent-up preventing cover 29*a* rotates together with the screw 20. Only when any one of the two discharge holes 291*a* faces the vent 203*a*, the melted block copolymer 292 is opposed to the vent 203*a* through the discharge hole 291*a* to discharge pressurized carbon dioxide. In this Example, by repeating normal rotation and reverse rotation of the screw 20, carbon dioxide is discharged intermittently by the vent-up preventing cover 29*a* while retaining the melted block copolymer in the vicinity of the vent 203*a* for a predetermined time. By discharging pressurized carbon dioxide intermittently as described above, it is possible to suppress the vent up of the melted block copolymer.

<Manufacture of Resin Pellet>

A resin pellet made of the block copolymer was manufactured by a method described below using the pellet production apparatus 1000 as shown in FIG. 2.

At first, the mixture pressurized fluid was sucked from the pressurized carbon dioxide bomb 101 and was pressurized to arrive at a predetermined pressure by a syringe pump 102 or 112. Subsequently, the syringe pump 102 or 112 was switched from the pressure control to the flow rate control, and the interior of the system, which ranged to the introducing valves 212*a*, 212*b* for introducing the mixture pressurized fluid in the plasticizing cylinder 210, was pressurized. In this Example, the interior of the system ranging from the syringe pumps 102, 112 to the introducing valves 212*a*, 212*b* was cooled to 10 degrees Celsius, and the pressure thereof was allowed to be 10 MPa. Further, the preset pressure of the back pressure valve 120 was allowed to be 10 MPa.

In the extrusion molding device 200, the block copolymer was supplied from the resin supplying hopper 211, the plasticizing zone 21 was heated by the band heater (not shown) provided on the outer wall surface of the plasticizing zone 21, and the screw 20 was rotated. Accordingly, the block copolymer was plasticized and melted, and was allowed to flow to the high pressure kneading zone 22a of the first kneading section 220a on the downstream. Then, the rotation of the screw 20 was once stopped in order to disconnect the high pressure kneading zone 22a from the pressure reduction zone 23a and the plasticizing zone 21, and then the screw 20 was reversely rotated. Accordingly, the upstream side and downstream side seal rings 40, 60 were moved to the upstream side, and the upstream side and downstream side seal rings 40, 60 were brought in tight contact with the reduced diameter portions 30, 50 of the screw 20, and the high pressure kneading zone 22a was disconnected from the pressure reduction zone 23a and the plasticizing zone 21. After disconnecting the high pressure kneading zone 22a from the pressure reduction zone 23a and the plasticizing zone 21, the mixture pressured fluid was continuously supplied at the constant flow rate into the plasticizing cylinder 210 by the introducing valve 212a via the introducing port 202a in the high pressure kneading zone 22a, and then the mixture pressurized fluid was dispersed in and kneaded with the molten resin (melted block copolymer) by rotating the screw 20.

The mixture pressurized fluid was dispersed in a high pressure state in the molten resin in the high pressure kneading zone 22a. After that, the screw 20 was rotated frontwardly (in the direction of rotation of the screw to perform the plasticization), or the number of revolutions of the reverse rotation of the screw 20 was reduced, and thus the high pressure kneading zone 22a and the pressure reduction zone 23a were communicated with each other. In a case that the high pressure kneading zone 22a and the pressure reduction zone 23a are communicated with each other, the molten resin (block copolymer) and the mixture pressurized fluid flow to the pressure reduction zone 23a. However, since the transfer rate of pressurized carbon dioxide is faster than the flow rate of the molten resin, any surplus pressurized carbon dioxide moves to the pressure reduction zone 23a first. Therefore, the screw 20 is reversely rotated again before the pressure reduction in the high pressure kneading zone 22a progresses, and thereby the communication between the high pressure kneading zone 22a and the pressure reduction zone 23a is shut off. Accordingly, any surplus pressurized carbon dioxide can move to the pressure reduction zone 23a and can be discharged in a state that much of the molten resin is stayed in the high pressure kneading zone 22a. In this Example, by repeating normal rotation and reverse rotation of the screw 20, pressurized carbon dioxide was discharged in the state that the molten resin (block copolymer) was stayed in the high pressure kneading zone 22a, and at the same time, the mixture pressurized fluid was continuously introduced. Accordingly, it was possible to mix much more functional material (palladium complex) with the molten resin (block copolymer).

Subsequently, a period of time of the forward rotation of the screw 20 was lengthened to flow the molten resin mixed with the mixture pressurized fluid to the pressure reduction zone 23a. The pressure of the molten resin and the mixture pressurized fluid which flowed to the pressure reduction zone 23a was lowered and any surplus pressurized carbon dioxide was gasified and separated from the molten resin. The separated carbon dioxide was discharged from the vent 203a of the plasticizing cylinder 210. According to analysis of gas component discharged from the vent 203a, no palladium complex was detected. The main reason thereof is considered as follows. That is, by reducing the pressure of the molten resin and the mixture pressurized fluid, solubility of the palladium complex with respect to pressurized carbon dioxide was remarkably decreased, and the palladium complex was reduced to be insoluble in pressurized carbon dioxide. Further, in this Example, by repeating normal rotation and reverse rotation of the screw 20, carbon dioxide was discharged intermittently from the vent 203a via the discharge hole 291a of the vent-up preventing cover 29a while retaining the melted block copolymer in the pressure reduction zone 23a. By discharging carbon dioxide intermittently as described above, it was possible to suppress the vent up of the melted block copolymer.

Subsequently, the period of time of the forward rotation of the screw 20 was lengthened to flow the molten resin from which pressurized carbon dioxide was discharged to the zone for again raising pressure 24a. In the zone for again raising pressure 24a, the pressure of the thermoplastic resin was raised and the density was improved.

As described above, in this Example, by repeating normal rotation and reverse rotation of the screw 20, the communication and the disconnection between the high pressure kneading zone 22a and the pressure reduction zone 23a were repeated by using the upstream side seal mechanism S1a and the downstream side seal mechanism S2a in the first kneading section 220a. Then, carbon dioxide was discharged intermittently in the pressure reduction zone 23a while introducing the mixture pressurized fluid into the high pressure kneading zone 22a.

Subsequently, the period of time of the forward rotation of the screw 20 was lengthened to flow the molten resin from the first kneading section 220a to the second kneading section 220b. In the second kneading section 220b, carbon dioxide was discharged intermittently in the pressure reduction zone 23b while introducing the mixture pressurized fluid into the high pressure kneading zone 22b in a similar manner as the first kneading section 220a. In this Example, the mixture pressurized fluid was introduced from two portions of the first kneading section 220a and the second kneading section 220b so that palladium complex concentration in the mixture of the block copolymer and the palladium complex, that is, the palladium complex concentration in the resin pellet was made to be 500 ppm by weight concentration.

Subsequently, the period of time of the forward rotation of the screw 20 was lengthened to extrude, from the forward end of the plasticizing cylinder 210, the block copolymer mixed with the palladium complex to have a string shape. The extruded mixture was cooled and solidified, and then was cut to have any size by using a general-purpose cutting machine (pelletizer), and thereby obtaining a resin pellet made of the block copolymer containing the palladium complex.

<Molding of Molded Product>

The obtained resin pellet was mixed with the thermoplastic resin and then subjected to injection molding by using a general-purpose injection molding machine (produced by The Japan Steel Works, LTD., J180AD-2M-300H), thereby obtaining the molded product. The resin pellet was mixed so that the ratio of the resin pellet to the mixture of the thermoplastic resin and the resin pellet was 10 wt %. Therefore, the concentration of the palladium in the obtained molded product was about 50 ppm, which was a small or minute amount.

<Formation of Plating Film>

(1) Sample (I)

The plating film was formed to the molded product obtained in this Example by the following method to prepare a sample (I). At first, the molded product was exposed to 0.5 N aqueous sodium hydroxide solution as an alkaline solution at 60 degrees Celsius for 5 minutes, followed by washed with water and then immersed in 3N hydrochloric acid aqueous solution at 40 degrees Celsius for 5 minutes. Thereafter, the molded product was immersed in an electroless nickel-phosphorus plating solution (produced by OKUNO CHEMICAL INDUSTRIES CO., LTD, Top Nicoron RCH) at 85 degrees Celsius. When the molded product was immersed in the electroless nickel-phosphorus plating solution, plating reaction was started promptly and the entire surface of the molded product was covered with a nickel-phosphorus plating film in 5 minutes. Subsequently, after performing annealing at 80 degrees Celsius for 12 hours, 20 µm of electroplating copper film, 20 µm of electroplating nickel film, and 0.5 µm of electroplating chromium film were formed on the nickel-phosphorus plating film in this order by a general-purpose method, thereby obtaining the sample (1) of this Example.

(2) Sample (II)

The nickel-phosphorus plating film was formed on the molded product obtained in this Example by the same method as the sample (I). Then, 40 µm of the electroplating copper film was formed on the nickel-phosphorus plating film by a general-purpose method, thereby obtaining the sample (II).

<Evaluation of Sample>

The sample (I) was subjected to a heat shock test. In the heat shock test, a cycle test in which the sample (I) was exposed to the environments at −40 degrees Celsius and 120 degrees Celsius alternately was repeated for 10 cycles. As a result, it was found out that the film blister, exfoliation, and the like were not caused in the plating film of the sample (I) and the plating film had a high reliability.

The plating film of the sample (II) was subjected to evaluation of tight contact performance (peal test). As a result, it was found out that the tight contact force of the plating film was 25 N/cm and the plating film having a high tight contact performance, which significantly exceeded 10N/cm as the target value, was formed.

Subsequently, the cross-section in the vicinity of the surface of the molded product of each of the samples (I) and (H) was observed by the SEM. As a result, for both of the samples (I) and (II), it was observed that fine pores having a depth of about 500 nm to 2 µm were formed on the surface of the molded product and further a part of the plating film was penetrated or entered into the fine pores. This is considered as follows. That is, the molded product was brought into contact with the alkaline solution and acid solution before an electroless plating process to remove a part of the block copolymer from the surface of the molded product, thereby forming the fine pores; and further, the plating reaction occurred in the fine pores and the plating film grew. It is estimated that the plating film of this Example has a high tight contact performance due to anchoring effect of the fine pores formed on the surface of the molded product.

Further, it was observed that the plating film grew from the inside of the molded product and was formed on the molded product in a state that the plating film bit into the molded product (in a state that a part of the plating film was permeated into the molded product). This is considered that the electroless plating solution was permeated from the surface of the molded product to be brought into contact with the palladium contained in the molded product, thereby growing the plating film.

Subsequently, the cross-section in the vicinity of the surface of the molded product of each of the samples (I) and (II) was observed by the TEM. As a result, for both of the samples (I) and (II), it was confirmed that the palladium having a maximum particle size of about 3 nm was unevenly distributed in the vicinity of the surface of the molded product. According to investigation by the inventors of the present invention, it was confirmed that, in a case that the metallic fine particles were dispersed in the resin using pressurized carbon dioxide or supercritical carbon dioxide, the metallic fine particles could be dispersed as ultrafine particles of which diameters or sizes were sabnano to nano and further the metallic file particles, of which particle sizes were not more than 1 nm, which could not be observed by the TEM, were also present. It is supposed that pressurized carbon dioxide as the solvent of the metallic fine particles served as a compatibility-providing agent to the resin to prevent the metal complex from aggregating, and the metal complex was subjected to heat reduction in the molten resin, thereby nanoparticles were subjected to in-situ synthesis. It is supposed that, by unevenly distributing the metallic fine particles converting into the ultrafine particles in the vicinity of the surface of the molded product as described above, even when the concentration of the metallic fine particles in the molded product was about 50 ppm, which was a small or minute amount, the plating reaction was caused sufficiently.

As described above, in this Example, by using the resin pellet made of the block copolymer mixed with the metallic fine particles, the molded product containing the metallic fine particles could be produced by using a general-purpose molding machine, thereby making it possible to form the plating film on the molded product without performing the surface treatment having heavy environmental burden. Further, in this Example, by using the block copolymer, the metallic fine particles could be unevenly distributed in the vicinity of the surface of the molded product, and by using pressurized carbon dioxide for dispersing the metallic fine particles in the block copolymer, the metallic fine particles could be dispersed as the ultrafine particles. Accordingly, it was possible to reduce the content of the metallic fine particles as the catalyst of electroless plating. Further, the molded product was brought into contact with the acid solution and basic solution before the formation of the plating film to dissolve and remove a part of the block copolymer, thereby forming the fine pores on the surface of the molded product. Accordingly, it was possible to improve the tight contact performance of the plating film formed on the surface of the molded product by the anchoring effect due to the fine pores.

Example 2

In Example 2, unlike Example 1, the resin pellet made of the block copolymer was not produced. It was used the poly-ether-ester amide block copolymer (produced by Sanyo Chemical Industries, Ltd., PELESTAT NC6321) used in Example 1 as the block copolymer; it was used a silver complex (silver salt (I) of heptafluorobutyric acid) which was metallic fine particles as the functional material; and it was used ABS resin (acrylonitrile-butadiene-styrene copolymer synthetic resin) as the thermoplastic resin.

At first, the silver complex was dissolved in ethanol at ordinary temperature to prepare an ethanol solution. Then, the block copolymer was immersed in the prepared ethanol solution for 1 hour to impregnate the block copolymer with the silver complex. The block copolymer in which the silver complex was impregnated was dried, and concentration of the silver complex in the block copolymer in which the silver complex was impregnated was calculated depending on the weight change. The concentration of the silver complex was 1000 ppm by weight concentration.

By using the same injection molding machine as Example 1, the obtained block copolymer in which the silver complex was impregnated was mixed with the thermoplastic resin and then subjected to injection molding, thereby obtaining a molded product. The block copolymer in which the silver complex was impregnated was mixed such that the ratio of the block copolymer to the mixture of the thermoplastic resin and the block copolymer in which the silver complex was impregnated was 10 wt %.

The cross-section in the vicinity of the surface of the obtained molded product was observed by the SEM. As a result, it was confirmed that silver particles each having the particle size of about 100 nm were dispersed in the vicinity of the surface of the molded product. Further, the obtained molded product was used to evaluate the antibacterial performance in accordance with a standardized test method (JIS Z 2911) by using *Staphylococcus aureus* and *Escherichia coli*. As a result, it was confirmed that the molded product had a high antibacterial function and the silver particles were present in the vicinity of the surface of the molded product at the concentration at which the antibacterial performance of the silver particles was sufficiently expressed.

Example 3

In Example 3, unlike Example 1, although the resin pellet made of the block copolymer was not produced, the same block copolymer, the same functional material, and the same thermoplastic resin as those in Example 1 were used in Example 3.

At first, the palladium complex as the functional material was dissolved in ethanol at ordinary temperature to prepare an ethanol solution. Then, the block copolymer was immersed in the prepared ethanol solution for 1 hour to impregnate the block copolymer with the palladium complex. The block copolymer in which the palladium complex was impregnated was dried, and concentration of the palladium complex in the block copolymer in which the palladium complex was impregnated was calculated depending on the weight change. The concentration of the palladium complex was about 0.1 wt %. Thereafter, the block copolymer in which the palladium complex was impregnated was subjected to annealing at 150 degrees Celsius, so that the palladium complex was subjected to heat reduction.

Subsequently, by using the same injection molding machine as Example 1, the block copolymer in which the palladium complex was impregnated was mixed with the thermoplastic resin and then subjected to injection molding, thereby obtaining a molded product. The block copolymer in which the palladium complex was impregnated was mixed such that the ratio of the block copolymer to the mixture of the thermoplastic resin and the block copolymer in which the palladium complex was impregnated was 10 wt %.

The same plating film as the sample (I) of Example 1 was formed on the obtained molded product by using the same method as the sample (I) of Example 1 to obtain a sample (III). Further, the same plating film as the sample (II) of Example 1 was formed by using the same method as the sample (II) of Example 1 to obtain a sample (IV).

For both of the samples (III) and (IV), after each of the molded products was immersed in the electroless plating solution, the entire surface of the each of the molded products was covered with the nickel-phosphorus plating film in 10 minutes. Compared to Example 1, a period of time for forming the plating film was slightly long.

The sample (III) was subjected to the heat shock test in the same method as Example 1; and the plating film of the sample (IV) was subjected to the evaluation of tight contact performance (peal test) in the same method as Example 1. As for the result of the peal test, the tight contact force of the plating film was 8N/cm, which was slightly lower than 10N/cm as the target value. As for the result of the heat shock test, it was found out that the film blister, exfoliation, and the like were not caused in the plating film of the sample (III) and the plating film had a high reliability.

Subsequently, the cross-section in the vicinity of the surface of the molded product of each of the samples (III) and (IV) was observed by the TEM. As a result, for both of the samples (III) and (IV), it was confirmed that the palladium having the particle size of about 50 to 100 nm was unevenly distributed in the vicinity of the surface of the molded product. The particle size of the palladium was enlarged as compared with Example 1.

As described above, in this Example, by dispersing the metallic fine particles in the block copolymer in a similar manner as Example 1, the molded product containing the metallic fine particles could be produced by using a general-purpose molding machine, and the plating film could be formed on the molded product without performing the surface treatment having heavy environmental burden. Further, in this Example, the metallic fine particles were unevenly distributed in the vicinity of the surface of the molded product by using the block copolymer, thereby making it possible to form the plating film efficiently. In this Example, unlike Example 1, pressurized carbon dioxide was not used in dispersion of the metallic fine particles in the block copolymer. Thus, it is considered that dispersion performance of the metallic fine particles was lower than Example 1 and tight contact strength of the plating film was decreased.

Comparative Example 1

In this Comparative Example, the functional material and the thermoplastic resin which were the same as those of Example 1 were used, but the block copolymer was not used. Mixing of the functional material (palladium complex) with the block copolymer was not performed. Instead, the palladium complex was directly mixed with the thermoplastic resin. Other than that, a molded product was molded in the same method as Example 1.

Although the nickel-phosphorus plating film was tried to be formed on the molded product of this Comparative Example by the same method as Example 1, no plating reaction was caused. The reason thereof is considered as follows. That is, in this Comparative Example, the content of the palladium complex in the molded product was (very) small. Further, since the block copolymer was not used, no palladium was unevenly distributed in the vicinity of the surface of the molded product. Therefore, it is considered that the catalyst was not present in an amount sufficient for causing the plating reaction in the vicinity of the surface of the molded product, and no plating reaction was caused.

As described above, the method for producing the molded product according to the present teaching has been specifically explained with reference to Examples. The present teaching, however, is not limited to these Examples. For example, although the molded product was molded by the injection molding in Examples 1 to 3, the molded product may be molded by extrusion molding. Further, a foam molded product may be molded by a foam injection molding method using the physical foaming agent such as pressurized carbon dioxide or pressurized nitrogen.

Example 4

In Example 4, a resin pellet was produced by using a resin pellet production apparatus 2000 shown in FIG. 7. As the thermoplastic resin, it was used a material (produced by UNITIKA LTD., TNEG-5C) which contained a carbon material as the thermally-conductive material and in which Nylon 6 and unreinforced nylon 6 were dry-blended at a weight ratio of 1:2. As the metallic fine particles, it was used a metal complex of hexafluoroacetyl-acetonato palladium (II). The coefficient of thermal conductivity of the nylon containing the carbon material used in this Example was 5 W/mK by measurement using a laser flash method. Further, in this Example, after the pellet was plasticized and melted, the pellet was mixed with the physical foaming agent to mold a foam molded product, and then a plating film was formed on the foam molded product.

<Resin Pellet Production Apparatus>

At first, an explanation will be made about an apparatus used for producing the resin pellet in this Example. As shown in FIG. 7, the resin pellet production apparatus 2000 includes an extrusion molding device 400 performing extrusion molding of the thermoplastic resin in which the metallic fine particles are mixed; a pressurized fluid supply device 300 supplying pressurized carbon dioxide (mixture pressurized fluid) containing the metallic fine particles to the extrusion molding device 400; a resin cooling device 500 cooling the thermoplastic resin subjected to the extrusion molding by the extrusion molding device 400; and a controller (not shown). The controller controls operations of the pressurized fluid supply device 300, the extrusion molding device 400, and the resin cooling device 500.

The pressurized fluid supply device 300 mixes pressurized carbon dioxide with a solution C obtained by dissolving the metallic fine particles in a solvent to prepare a mixture pressurized fluid, and the prepared mixture pressurized fluid is supplied to the extrusion molding device 400. The pressurized fluid supply device 300 is constructed by a carbon dioxide bomb 301 of the siphon type; a syringe pump 302 for carbon dioxide which sucks liquid carbon dioxide from the carbon dioxide bomb 301 and thereafter pressurizes and supplies liquid carbon dioxide; and a syringe pump 312 for the solution which pressurizes and supplies the liquid C containing the metallic fine particles in a solution tank 311. The respective syringe pumps 302, 312 can be subjected to the pressure control and the flow rate control. The prepared mixture pressurized fluid is supplied to the extrusion molding device 400 via a back pressure valve 420.

The extrusion molding device 400 is constructed by a first cylinder (plasticizing cylinder) 410 having a screw 40 arranged rotatably and movably back and forth therein; a second cylinder 420 having a screw 45 arranged rotatably and movably back and forth therein; servo motors 48, 49 which are connected to the screws 40, 45, respectively and rotate and move the screws 40, 45, respectively; and a connection portion 430 which connects the first cylinder 410 to the second cylinder 420. In this Example, the molten resin plasticized and melted is allowed to flow from the right to the left in the first and second cylinders 410, 420 as viewed in FIG. 7. Therefore, the right as viewed in FIG. 7 is defined as "upstream" or "backward", and the left is defined as "downstream" or "frontward" at the inside of the first and second cylinders 410, 420. In the first cylinder (plasticizing cylinder) 410, there are provided a ring-shaped seal member 46 through which the screw 40 penetrates and a ring-shaped member 44 which is disposed on the downstream of the seal member 46 and through which the screw 40 penetrates. Further, the second cylinder 420 includes a nozzle 47 at the forward end thereof.

Those formed on the upper side surface of the first cylinder 410 are, as referred to in the following order from the upstream side, a resin supply port 401 for supplying the thermoplastic resin to the plasticizing cylinder 410 and an introducing port 402 for introducing the mixture pressurized fluid into the first cylinder 410. Further, a vent 403 for discharging gasified carbon dioxide from the inside of the second cylinder 420 is formed on the upper side surface of the second cylinder 420. A resin supplying hopper 411 and an introducing valve 412 are arranged for the resin supply port 401 and the introducing port 402, respectively. The band heater (not shown) is provided on the outer wall surface of the first cylinder 410. The plasticizing cylinder 410 is heated by the band heater, and the thermoplastic resin is plasticized and melted.

In the extrusion molding device 400, the thermoplastic resin is supplied from the resin supply port 401 into the first cylinder 410, and the thermoplastic resin is plasticized by the band heater to provide the molten resin which is fed to the downstream in accordance with the forward rotation of the screw 40. The molten resin, which is fed to the vicinity of the introducing port 402, is brought in contact and kneaded with the introduced pressurized carbon dioxide (mixture pressurized fluid) containing the metallic fine particles at a high pressure. The molten resin containing the mixture pressurized fluid is fed from the first cylinder 410 to the connection portion 430 disposed on the downstream. Then, the resin in the connection portion 430 is extruded by the resin successively fed from the first cylinder 410, to be fed to the second cylinder 420 disposed on the further downstream. In the second cylinder 420, the gasified carbon dioxide is separated from the molten resin by lowering the resin internal pressure of the molten resin brought in contact and kneaded with the mixture pressurized fluid, thereby discharging the gasified carbon dioxide from the vent 403. After carbon dioxide is discharged, the molten resin is fed to the downstream by rotation of the screw 45 to be extruded from the nozzle 47 to the outside of the second cylinder 420.

As described above, a plasticizing zone 41 in which the thermoplastic resin is plasticized and melted to provide the molten resin and a kneading zone 42 in which the molten resin and the mixture pressurized fluid introduced from the introducing port 402 are brought in contact and kneaded with each other at the high pressure are formed in the first cylinder 410, as referred to in this order from the upstream side. Further, a pressure reduction zone 43 in which carbon dioxide which is separated from the molten resin by lowering the resin internal pressure of the molten resin brought in contact and kneaded with the mixture pressurized fluid is discharged from the vent 403 is formed in the second cylinder 420. In the first cylinder 410, the ring-shaped seal member 46 is positioned at the boundary between the plasticizing zone 41 and the kneading zone 42, and the ring-shaped member 44 is positioned at the kneading zone 42. The portion of the screw 40 positioned at the kneading zone 42 has a shape such that the diameter thereof increases toward the downstream.

The resin cooling device 500 is a device for cooling and solidifying the resin extruded from the nozzle 47 of the second cylinder 420. An arbitrary mechanism may be adopted as the resin cooling device 500, provided that the resin is sufficiently solidified by cooling water and the like. In this embodiment, a belt conveyer device 501 made of aluminum without the use of cooling water was used. By not using cooling water, even when a thermoplastic resin having high water absorbability, such as polyimide, is used as a raw material of the molded product, the resin can be prevented from absorbing water excessively and a difficult dehydration operation in a subsequent step is unnecessary. As shown in FIG. 7, the aluminum belt conveyer device 501 is a belt conveyer rotating an aluminum belt which is made to have a ring shape. The resin extruded from the extrusion molding device 400 is placed on the aluminum belt and conveyed from the upstream to the downstream (the right to the left) in FIG. 7. By placing the resin on the aluminum belt having high heat radiating performance, the extruded resin is cooled and solidified while being conveyed.

<Manufacture of Resin Pellet>

A resin pellet was manufactured by a method described below using the resin pellet production apparatus 2000 as shown in FIG. 7. At first, liquid carbon dioxide was sucked from the carbon dioxide bomb 301 and was pressurized to arrive at a predetermined pressure by pressure control of the syringe pump 302 for carbon dioxide. Further, the solution C obtained by dissolving the metallic fine particles in the solvent was sucked from the solution tank 311 by the syringe pump 312 for the solution, and the pressure of the solution C was raised to a predetermined pressure by pressure control of the syringe pump 312 for the solution. In this Example, a fluorine-based organic solvent such as perfluoropentylamine was used as the solvent of the solution C.

Subsequently, the syringe pump 302 for carbon dioxide and the syringe pump 312 for the solution were switched from the pressure control to the flow rate control, and liquid carbon dioxide and the solution C were allowed to flow so that the flow rate ratio between the syringe pump 302 for carbon dioxide and the syringe pump 312 for the solution was 10:1. Accordingly, pressurized carbon dioxide and the solution C were mixed in the piping. Further, the interior of the system, which ranged to the introducing valve 412 for introducing the mixture pressurized fluid into the first cylinder 410, was pressurized. In this Example, the interior of the system ranging from the syringe pumps 302, 312 to the introducing valve 412 was cooled to 10 degrees Celsius, and the pressure was allowed to be 10 MPa. Further, the preset pressure of the back pressure valve 420 was allowed to be 10 MPa. Further, in this Example, the concentration of the metallic fine particles in the mixture pressurized fluid was controlled to be about 10 to 20% of the saturated solubility.

In the extrusion molding device 400, the thermoplastic resin was supplied from the resin supplying hopper 411, the plasticizing zone 41 was heated by the band heater (not shown) provided for the outer wall surface of the plasticizing zone 41, and the screw 40 was rotated. Accordingly, the thermoplastic resin was plasticized and melted, and then was allowed to flow to the kneading zone 42 on the downstream.

In the kneading zone 42, the mixture pressured fluid was continuously supplied at the constant flow rate into the plasticizing cylinder 410 by the introducing valve 412 via the introducing port 402. Then, the mixture pressurized fluid was dispersed in and kneaded with the molten resin by rotating the screw 40. In this situation, the ring-shaped seal member 46 prevents carbon dioxide and the metallic fine particles introduced into the kneading zone 42 from leaking to the plasticizing zone 41 on the upstream side.

Next, by rotating the screw 40, the resin in the kneading zone 42 was allowed to flow to the connection portion 430 on the downstream. In a case that the resin is allowed to flow to the downstream in the kneading zone 42, the ring-shaped member 44 and the screw 40 having a shape such that the diameter thereof increases toward the downstream act as flow resistance of the molten resin to raise the internal pressure of the resin in the kneading zone 42, thereby increasing the pressure of the first cylinder 410.

In the kneading zone 42, an unillustrated pressure sensor is provided, and pressure of the cylinder in the kneading zone 42 can be monitored. In a case that the pressure in the cylinder in the kneading zone 42 is lowered due to change of the viscosity of the resin and the like, the number of revolutions of the servo motor 48 is increased to increase the supply amount of the molten resin to the kneading zone 42 and the pressure in the cylinder in the kneading zone 42 is raised. On the other hand, in a case that the pressure in the cylinder is raised, the number of revolutions of the servo motor 48 is decreased to reduce the supply amount of the resin and the pressure in the cylinder is lowered. As described above, the first cylinder of this Example includes a mechanism which is capable of keeping the internal pressure of the cylinder constant by adjusting the number of revolutions of the screw. In a case that fluctuation of the pressure in the cylinder in the kneading zone 42 is large, the introduction amount of the mixture pressurized fluid supplied from the syringe pumps 302, 312 is unstable, and fluctuation of the introduction amount occurs. In this Example, by keeping the pressure in the cylinder in the kneading zone 42 constant, the introduction amount is stable. In this Example, the number of revolutions of the screw 40 was set such that the internal pressure of the cylinder in the kneading zone 42 maintained 8 MPa.

By rotating the screw 40 continuously, the resin in the first cylinder 410 was continuously supplied to the connection portion 430 on the downstream. The molten resin in the connection portion 430 was extruded by the resin supplied from the first cylinder to be allowed to flow to the pressure reduction zone 43 of the second cylinder 420 on the downstream. In the pressure reduction zone 43, the molten resin was subjected to the pressure reduction, thereby only the carbon dioxide dissolved in the molten resin was separated and then discharged from the vent 403 provided for the second cylinder 420.

Subsequently, the molten resin from which carbon dioxide was discharged was extruded from the nozzle 47 provided at the forward end of the second cylinder by rotation of the screw 45. The extruded amount of the molten resin from the nozzle 47 was adjusted by the servo motor 49. The servo motor 49 can be controlled independently of the servo motor 48.

The resin extruded from the nozzle 47 was placed on the aluminum belt conveyer device 501 of the resin cooling device 500 to be conveyed from the upstream to the downstream in FIG. 7. The extruded molten resin was cooled and solidified during the conveyance. The solidified resin was cut to have any size by using a general-purpose cutting machine, and thereby obtaining a resin pellet containing the palladium metallic fine particles.

<Molding of Molded Product>

By using the resin pellet containing the palladium metallic fine particles obtained in this Example, 20 pieces of the foam molded products each having a flat plate shape were molded by a general-purpose foam molding method using a general-purpose foam injection molding machine (produced by The Japan Steel Works, LTD., J40EL3-DK MUCELL). In this Example, pressurized nitrogen gas was used as the physical foaming agent, and the resin filling rate of the molten resin into the mold was set to 65% with respect to the volume of a mold cavity. For each foam molded product, a desired shape was obtained by inner foaming of the resin.

<Formation and Evaluation of Plating Film>

Of 20 pieces of the foam molded products obtained in this Example, the plating film was formed on each of 10 pieces of the foam molded products by the following method, thereby preparing a sample (i). At first, each foam molded product was immersed in 2.5N hydrochloric acid aqueous solution at 40 degrees Celsius for 1 minute, followed by immersed in 1,3-butanediol aqueous solution (75 vol %) at 85 degrees Celsius for 10 minutes, and thereafter immersed in an electroless nickel plating solution at 85 degrees Celsius for 15 minutes, thereby forming a nickel-phosphorus plating film. Subsequently, 20 μm of Cu electroplating film and 20 μm of bright Ni electroplating film were formed on each nickel-phosphorus plating film in this order by a general-purpose method to obtain the sample (i) of this Example.

The formation process of the electroless nickel-phosphorus plating film was visually observed. It was confirmed that the plating film was formed on the entire surface of each of the molded products without film missing within 10 minutes after each of the foam molded products was immersed in the electroless nickel-phosphorus plating solution. Further, 3 pieces of the foam molded products were randomly sampled from the sample (i) in a state that only the nickel-phosphorus plating film was formed, that is, the sample (i) before performing the electroplating, and each of the nickel-phosphorus plating films was visually observed. As a result, the number of the pinholes per unit area (1 cm$^2$) was 0 to 3, which was extremely small.

Subsequently, the sample (i) in which the electroplating film was formed was subjected to evaluation of tight contact performance (peal test). As a result, it was found out that the tight contact force of the plating film was 10 N/cm and the plating film having high tight contact performance was formed. Further, the sample (i) was subjected to a heat shock test. In the heat shock test, a cycle test in which the sample (i) was exposed to the environments at −35 degrees Celsius and 90 degrees Celsius alternately was repeated for 3 cycles. As a result, it was found out that the film blister, exfoliation, and the like were not caused in the plating film of the sample.

(2) Sample (ii)

Subsequently, of 20 pieces of the foam molded products obtained in this Example, the nickel-phosphorus plating film was formed on each of 3 pieces of the foam molded products by the same method as the sample (i). Then, 20 μm of Cu electroplating film was formed by a general-purpose method on each nickel-phosphorus plating film to obtain a sample (ii). A LED light source was provided at the central portion of the sample (ii), and it was performed a heat radiating performance test in which the highest temperature of the LED light source after being turned on was observed by an infrared thermography (Produced by Apiste Corporation, FSV-1200-L8). As a result, the highest temperature of the LED light source was 84 degrees Celsius. On the other hand, in a case that the same heat radiating performance test was performed to the foam molded product obtained in this Example without forming the plating film, the highest temperature of the LED light source was 120 degrees Celsius, which was the high temperature. The reason thereof was that a heat radiating material was contained in the resin in a small amount and heat insulating effect of the foamed cells existing in the molded product was exerted. For the sample (ii) of this Example, it was found out that it was possible to complement the low heat radiating performance of the foam molded product by the plating film having a high quality.

Further, the sample (ii) was placed on an aluminum metallic plate heated to 80 degrees Celsius and heated uniformly to have the same temperature as the aluminum metallic plate. Then, dimension change of the sample caused by temperature change before and after the heating was measured by the toolmaker's microscope. According to the linear expansion coefficient of the base material depending on the amount of the dimension change, the linear expansion coefficient of the sample (ii) was $2.3 \times 10^{-5}$, which was small.

Further, the sample (ii) was subjected to a water absorption test in which the sample (ii) was immersed in water at 23 degrees Celsius for 24 hours, and the weight change before and after the immersion was measured. As a result, the weight change due to the water absorption after the immersion in water at 23 degrees Celsius for 24 hours was 0.1%. On the other hand, in a case that the foam molded product obtained in this Example was subjected to the same water absorption test without forming the plating film, the weight change before and after the immersion was 2.5%. From this result, it was found out that the water absorption of the foam molded product could be greatly suppressed by forming the plating film. It is inferred that the sample (ii) of this Example had the low linear expansion coefficient by suppressing the water absorption as described above. In this Example, by forming the compact plating film, the dimension change of the foam molded product caused by expansion due to the water absorption could be suppressed.

The specific gravity of the sample (ii) was 1.1 g/cm$^3$, which was lightweight.

Subsequently, the cross-section of the sample (ii) in this Example was observed by the SEM. A metallic region made of the same kind of metal as the plating film, that is, a metallic region made of nickel-phosphorus was formed in a depth area within 5 μm from the surface on which the nickel-phosphorus plating film was formed. The metallic region occupied 20 vol % or more of the molded product in the depth area within 5 μm from the surface. The foamed cell having the cell diameter or size of 0.5 μm or more was not observed and no foamed cell was substantially present in a range in which the metallic region was formed, the range including the surface on which the plating film of the molded product was formed, that is, in the depth area within 5 μm from the surface of the molded product. Further, the foamed cell having the cell diameter of 5 μm or more was not observed in a depth area within 100 μm from the surface of the molded product. The foamed cells each having the cell diameter in a range of 10 to 50 μm were formed in a depth area having a depth of 100 μm or more from the surface of the molded product.

As described above, in this Example, by using the resin pellet in which the metallic fine particles were dispersed in the thermoplastic resin, the molded product including the metallic fine particles could be produced by using a general-purpose molding machine, and the plating film could be formed on the molded product without performing the surface treatment having heavy environmental burden. Further, by using the physical foaming agent, it was possible to form the plating film having a high tight contact force, less poor appearance such as the pinhole, and a high quality. Furthermore, the molded product having the obtained plating film had the plating film having the high tight contact performance and high quality on the surface thereof, thus the molded product having the obtained plating film was lightweight and had a high reliability under the environment having high temperature and high humidity, while maintaining performance of the metallic component such as heat radiating performance.

Example 5

In this Example, a resin pellet including metallic fine particles and a block copolymer was prepared by the same method as Example 4 using the same resin pellet production apparatus as Example 4, except that it was produced a resin pellet which included, in addition to the metallic fine particles, the block copolymer having a hydrophilic segment. Further, in this Example, a non-foam molded product was molded using said resin pellet. As the block copolymer, it was used a polyether-ester amide block copolymer (produced by Sanyo Chemical Industries, Ltd., PELESTAT NC6321) in which polyethylene oxide and polyamide component formed an ester bond. The hydrophilic segment in the polyether-ester amide block copolymer was polyethylene oxide which was polyether.

<Manufacture of Resin Pellet>

The resin pellet was produced by the same method as Example 4, except that the pellet of the block copolymer was supplied, together with the thermoplastic resin, from the resin supplying hopper 411 and thermoplastic resin and the block copolymer were mixed with each other in the first cylinder 410 in the extrusion molding device 400 shown in FIG. 7. The block copolymer was mixed with the thermoplastic resin such that the concentration of the block copolymer in the resin pellet was 5 wt %.

<Molding of Molded Product>

20 pieces of the non-foam molded products each having a plate shape were molded by performing the molding under the same condition as Example 4, except that the resin pellet containing the metallic fine particles and the block copolymer obtained in this Example was used, that no physical foaming agent was used, and that the resin filling rate of the molten resin into the mold was set to 100% with respect to the volume of a mold cavity.

<Formation and Evaluation of Plating Film>

Of 20 pieces of the non-foam molded products obtained in this Example, an electroless nickel-phosphorus plating film, 20 μm of Cu electroplating film, and 20 μm of bright Ni electroplating film were sequentially formed on each of 10 pieces of the non-foam molded products by the same method as sample (i) of Example 4 to obtain a sample (iii) of this Example.

The formation process of the nickel-phosphorus plating film was visually observed. It was confirmed that the plating film was formed on the entire surface of each of the non-foam molded products without film missing within 10 minutes after each of the non-foam molded products was immersed in the electroless nickel plating solution. Further, 3 pieces of the non-foam molded products were randomly sampled from the sample (iii) in a state that only the nickel-phosphorus plating film was formed, that is, the sample (iii) before performing the electroplating, and each of the nickel-phosphorus plating films was visually observed. As a result, the number of the pinholes per unit area (1 cm$^2$) was 0 to 3, which was small.

The sample (iii) in which the electroplating film was formed was subjected to evaluation of tight contact performance (peal test). As a result, it was found out that the tight contact force of the plating film was 10 N/cm and it was formed the plating film having high tight contact performance. Further, the sample (iii) was subjected to a heat shock test in a similar manner as Example 4. As a result, the film blister, exfoliation, and the like were not caused in the plating film of sample (iii).

(2) Sample (iv)

Subsequently, of 20 pieces of the non-foam molded products obtained in this Example, the nickel-phosphorus plating film was formed on each of 3 pieces of the non-foam molded products by the same method as the sample (ii). Then, 20 μm of Cu electroplating film was formed on each nickel-phosphorus plating film by a general-purpose method to obtain a sample (iv). The sample (iv) was subjected to a heat radiating performance test by the same method as Example 4. As a result, the highest temperature of the LED light source was 84 degrees Celsius, and the sample (iv) had performance equivalent to that of the sample in Example 4.

Further, the sample (iv) was subjected to the measurement of the linear expansion coefficient and the water absorption test by the same method as Example 4. As a result, the linear expansion coefficient of the sample was $2.3 \times 10^{-5}$ and the weight change after the water absorption test was 0.1%. The sample (iv) had performance equivalent to that of the sample in Example 4.

The specific gravity of the sample (iv) which was the non-foam molded product of this Example was 1.4 g/cm$^3$, which was greater than that of the sample (ii) of Example 4.

As described above, in this Example, by using the resin pellet in which the metallic fine particles were dispersed in the thermoplastic resin, the molded product including the metallic fine particles could be produced using a general-purpose molding machine, and the plating film could be formed on the molded product without performing the surface treatment having heavy environmental burden. Further, by using the resin pellet in which the block copolymer and the metallic fine particles were included in the thermoplastic resin, the plating film having a high tight contact force, less poor appearance such as the pinhole, and a high quality could be formed. Further, since the molded product having the obtained plating film was the non-foam molded product, the specific gravity was greater than that of the sample of Example 4. However, the molded product in this Example included the plating film having the high tight contact performance and high quality on the surface thereof, and further had a high heat radiating performance and a high reliability under the environment having high temperature and high humidity.

Example 6

20 pieces of the non-foam molded products each having a plate shape were molded under the same condition as Example 5, except that the resin pellet prepared in Example 4 was used.

<Formation and Evaluation of Plating Film>

(1) Sample (v)

Of 20 pieces of the non-foam molded products obtained in this Example, an electroless nickel-phosphorus plating film, 20 μm of Cu electroplating film, and 20 pin of bright Ni electroplating film were sequentially formed on each of 10 pieces of the non-foam molded products by the same method as Example 4 to obtain a sample (v) of this Example. However, similar to Example 4, the plating film formed on the surface of each of the molded products had the unevenness at the point in time at which each of the molded products was immersed in the electroless nickel plating solution for 15 minutes. In view of this, in this Example, an immersion period of each of the molded products in the electroless plating solution was extended. By immersing each of the molded products in the electroless plating solution for 30 minutes, it was possible to form the electroless nickel-phosphorus plating film on the entire surface of each of the molded products.

3 pieces of the non-foam molded products were randomly sampled from the sample (v) in a state that the nickel-phosphorus plating film of this Example was formed, that is, the sample (v) before performing the electroplating, and each of the nickel-phosphorus plating films was visually observed. As a result, the number of the pinholes per unit area (1 cm$^2$) was 10 to 15, which was greater than that of the sample (i) of Example 4.

Subsequently, the sample (v) in which the electroplating film was formed was subjected to evaluation of tight contact performance (peal test). As a result, the tight contact force of the plating film was 6 N/cm, which was lower than that of the sample (i) of Example 4. Further, the sample (v) of this Example was subjected to a heat shock test in the same manner as Example 4. As a result, a problem such as the film blister was caused in some of the sample (v) of this Example.

(2) Sample (vi)

Subsequently, of 20 pieces of the non-foam molded products obtained in this Example, the nickel-phosphorus plating film was formed on each of 10 pieces of the non-foam molded products by the same method as the sample (v). Then, 20 μm of Cu electroplating film was formed by a general-purpose method on each nickel-phosphorus plating film to obtain a sample (vi). A heat radiating performance test was performed to the sample (vi) in a similar manner as the sample (ii) of Example 4. As a result, the highest temperature of the LED light source was 83 degrees Celsius. Further, the linear expansion coefficient was measured and the water absorption test was performed by the same method as Example 4. As a result, the thermal expansion coefficient was $2.5 \times 10^{-5}$ and the weight change after the water absorption test was 0.1%. It was confirmed that the sample (vi) had performance equivalent to that of the sample (ii) in Example 4. However, the sample of this Example as the non-foam molded product had the specific gravity of 1.4, which was greater than that of the sample (ii) of Example 4 as the foam molded product.

As described above, in this Example, by using the resin pellet in which the metallic fine particles were dispersed in the thermoplastic resin, the molded product containing the metallic fine particles could be produced using a general-purpose molding machine, and the plating film could be formed on the molded product without performing the surface treatment having heavy environmental burden. However, the quality of the plating film was slightly deteriorated when compared with Examples 4 and 5. The results of the heat radiating performance, the thermal expansion coefficient, and the weight change after the water absorption test of the molded product having the obtained plating film were equivalent to those of the sample of Example 4. However, since the molded product of this Example was the non-foam molded product, the specific gravity thereof was greater than that of the sample of Example 4.

Comparative Example 2

In this Comparative Example, a non-foam molded product having a plate shape was molded under the same condition as Example 5, except that the resin pellet containing metallic fine particles was not used and that Nylon 6, which contained a carbon material which was a thermally-conductive material as the thermoplastic resin, was used.

Although a nickel-phosphorus plating film was tried to be formed on the molded product of this Example by the same method as Example 4, no plating reaction was caused and no nickel-phosphorus plating film was formed. Since the molded product was not produced by using the resin pellet containing the metallic fine particles in this Comparative Example, the catalyst of electroless plating was not present inside the molded product, and no plating reaction was caused.

A heat radiating performance test was performed to the sample, of this Comparative Example, having no plating film in a similar manner as Example 4. As a result, the highest temperature of the LED light source was 82 degrees Celsius, and it was confirmed that the sample of this Comparative Example had performance equivalent to that of the sample in Example 4. However, the sample of this Comparative Example had the specific gravity of 1.5, which was greater than that of the sample (ii) of Example 4. Further, in this Comparative Example, charging pressure of the molded product at the time of injection molding was high, and moldability was also deteriorated.

Example 7

In this Example, metallic fine particles were introduced into a resin while performing foam molding using the injection molding apparatus 3000 shown in FIG. 11 to prepare a foam plating molded product in which nanosized metallic fine particles were dispersed in the vicinity of the surface and closed foam cells were included. Pressurized carbon dioxide was used as the physical foaming agent; Nylon 6 (produced by TORAY INDUSTRIES, CM1011G30) containing glass fiber by 30% was used as the resin; and a palladium complex (hexafluoroacetyl-acetonato palladium (II)) as an organic metal complex was used as the metallic fine particles.

<Injection Molding Apparatus>

At first, an explanation will be made about the injection molding apparatus 3000 used in this Example. As shown in FIG. 11, the injection molding apparatus 3000 includes a physical foaming agent supply apparatus 600 which supplies pressurized carbon dioxide (hereinafter referred to as a "mixture pressurized fluid" as appropriate), as the physical foaming agent, containing the metallic fine particles to a plasticizing cylinder 710; the plasticizing cylinder 710; a clamping unit 950 provided with the mold 955; the nozzle unit 750 positioned between the plasticizing cylinder 710 and the mold 955; and a controller (not shown). The controller controls operations of the physical foaming agent supply apparatus 600, the plasticizing cylinder 710, the clamping unit 950, and the nozzle unit 750. The physical foaming agent supply apparatus 600 mixes pressurized carbon dioxide with a solution C obtained by dissolving the metallic fine particles in a solvent to prepare a mixture pressurized fluid, and the prepared mixture pressurized fluid is supplied to the plasticizing cylinder 710. A shutoff valve 36, which is opened/closed in accordance with driving of an air cylinder 12, is provided at the forward end of the nozzle unit 750. The interiors of the nozzle unit 750 and the plasticizing cylinder 710 can be retained at a high pressure. The mold 955 is brought in tight contact with the forward end of the nozzle unit 750. The molten resin is injected and charged from the nozzle unit 750 into a cavity 953 formed by the mold 955.

The explanation of the nozzle unit 750 has been made above. Further, for the nozzle unit of this Example, a temperature sensor 8 is provided by embedding the temperature sensor 8 in the surface in which the resin channel 6 is formed, at a position facing the resin holding section 10. The circular cross-section of the resin channel 6 of the nozzle unit 750 used in this Example was φ 6 mm, and a length L of the resin holding section 10 in the flow direction of the resin was 20 mm. Hereinbelow, the structure of the injection molding apparatus 3000 except for the nozzle unit 750 will be explained.

An arbitrary mechanism may be adopted as the physical foaming agent supply apparatus 600, provided that the metallic fine particles are dissolved or dispersed in pressurized carbon dioxide to be introduced into the plasticizing cylinder 710. In this Example, a supply apparatus was used, which was provided with a syringe pump such as a syringe or injector for sucking pressurized carbon dioxide or the like and performing liquid feeding. The physical foaming agent supply apparatus 600 of this Example is an apparatus which mixes pressurized carbon dioxide and the metallic fine particles and supplies the mixture of pressurized carbon dioxide and the metallic fine particles. The physical foaming agent supply apparatus 600 is constructed by a syringe pump 602 for carbon dioxide which sucks liquid carbon dioxide from a carbon dioxide bomb 601 of the siphon type and which thereafter pressurizes and supplies liquid carbon dioxide, and a syringe pump 612 for the solution which pressurizes and supplies the metallic fine particles-containing liquid C. The respective syringe pumps 602, 612 can be subjected to the pressure control and the flow rate control. An air operate valve for suction 604 and an air operate valve for supply 605 are arranged for a piping for connecting the liquid carbon dioxide bomb 601 and the syringe pump 602 for carbon dioxide and a piping for connecting the syringe pump 602 for carbon dioxide and the plasticizing cylinder 710, respectively. Further, an air operate valve for suction 614 and an air operate valve for supply 615 are arranged for a piping for connecting a solution tank 611 and the syringe pump 612 for the solution and a piping for connecting the syringe pump 612 for the solution and the plasticizing cylinder 710, respectively.

The plasticizing cylinder 710 includes a screw 70 arranged rotatably and movably back and forth in the plasticizing cylinder 710, an upstream side seal mechanism S1 and a downstream side seal mechanism S2 which are arranged in the plasticizing cylinder 710. In this Example, the plasticized and molten resin is allowed to flow from the right to the left in the plasticizing cylinder 710 as viewed in FIGS. 11 to 13. Therefore, the right as viewed in FIGS. 11 to 13 is defined as "upstream" or "back ward", and the left is defined as "downstream" or "forward (frontward)" at the inside of the plasticizing cylinder 710 according to this Example.

Further, although not shown in the drawings, rotary driving means such as a rotation motor for rotating the screw 70 and moving means such as a ball screw and a motor or the like for driving the same to move the screw 70 back and forth are connected at a back end portion of the plasticizing cylinder 710 disposed on the upstream side. In this Example, it is constructed so that the forward rotation is performed to feed the molten resin frontwardly (toward the nozzle portion) when the screw 70 is rotated counterclockwise, while the reverse rotation is performed when the screw 70 is rotated clockwise, as viewed from the backward side of the plasticizing cylinder 710.

Those formed on the upper side surface of the plasticizing cylinder 710 are, as referred to in the following order from the upstream side, a resin supply port 701 for supplying the thermoplastic resin to the plasticizing cylinder 710, an introducing port 702 for introducing mixture pressurized fluid into the plasticizing cylinder 710, and a vent 703 for gasifying and discharging any surplus carbon dioxide from the inside of the plasticizing cylinder 710. A resin supplying hopper 711 and an introducing valve 712 are arranged for the resin supply port 701 and the introducing port 702, respectively. A sintered body 720, which is made of a minute linked-porous member having a pore size in a range of about 0.1 to 5 μm, is provided in the vent 703. Further, a pressure gauge 721 and a back pressure valve 722 are provided on the downstream of the sintered body 720. The introducing valve 712 is connected to the physical foaming agent supply apparatus 600.

A band heater (not shown) is arranged on an outer wall surface of the plasticizing cylinder 710. Accordingly, the plasticizing cylinder 710 is heated, and the thermoplastic resin is plasticized and melted. Further, sensors 75, 76, which monitor the pressure and the temperature, are provided at a position opposed to the introducing port 702 on the lower side surface of the plasticizing cylinder 710 and at a position opposed to the vent 703 on the lower side surface of the plasticizing cylinder 710, respectively.

The thermoplastic resin is supplied from the resin supply port 701 into the plasticizing cylinder 710, and the thermoplastic resin is plasticized by the band heater to provide the molten resin which is fed to the downstream in accordance with the forward rotation of the screw 70. The molten resin, which is fed to the vicinity of the introducing port 702, is brought in contact and kneaded with pressurized carbon dioxide containing the introduced metallic fine particles at a high pressure. Subsequently, the resin internal pressure of the molten resin brought in contact and kneaded with the mixture pressurized fluid is lowered, and thus the gasified carbon dioxide is separated from the molten resin. The gasified carbon dioxide is discharged from the vent 703. The molten resin, which is further fed frontwardly, is extruded by the forward end portion of the screw 70. The pressure of the molten resin acts as the reaction force with respect to the screw 70. The screw 70 moves backwardly by the reaction force, and the weighing of the molten resin is performed. In the plasticizing cylinder 710, the plasticizing zone 71 in which the thermoplastic resin is plasticized to provide the molten resin, the high pressure kneading zone 72 in which the molten resin and the mixture pressurized fluid introduced from the introducing port 702 are brought in contact and kneaded with each other at the high pressure, and the pressure reduction zone 73 in which carbon dioxide which is separated from the molten resin by lowering the resin internal pressure of the molten resin brought in contact and kneaded with the mixture pressurized fluid is discharged from the vent 703 are formed as referred to in this order from the upstream side. Further, the zone for again raising pressure 74 is provided on the downstream from the pressure reduction zone 73. In the zone for again raising pressure 74, the molten resin in which the physical foaming agent is dissolved is fed to the frontward portion of the screw 70 and the weighing is performed.

As shown in FIG. 11, the upstream side seal mechanism S1 is arranged between the plasticizing zone 71 and the high pressure kneading zone 72 and the downstream side seal mechanism S2 is arranged between the high pressure kneading zone 72 and the pressure reduction zone 73 to temporally shut off the communication state between the zones 71, 72, 73. Accordingly, for example, when the mixture pressurized fluid is introduced into the high pressure kneading zone 72, the upstream side and the downstream side of the high pressure kneading zone 72 are mechanically sealed, and the high pressure kneading zone 72 can be reliably disconnected (shut off) from the adjoining zones 71, 73. As a result, the pressure of the high pressure kneading zone 72 is maintained at a high pressure. Therefore, the metallic fine particles can be effectively permeated into the molten resin. It is possible to use various mechanisms as the upstream side seal mechanism S1 and the downstream side seal mechanism S2, provided that the communication between the zones 71, 72, 73 is shut off. In this Example, those which shut off the communication between the zones in accordance with the rotation state of the screw 70 as described later on were used. The upstream side seal mechanism S1 has the same structure as that of the upstream side seal mechanism S1a and the downstream side seal mechanism S2 has the same structure as that of the downstream side seal mechanism S2a, the upstream side seal mechanism S1a and the downstream side seal mechanism S2a being provided in the pellet production apparatus 1000 used in Example 1 shown in FIG. 2.

As shown in FIG. 11, a portion, of the screw 70, positioned at the pressure reduction zone 73 has a shape such that the shaft is narrow and the flight is deep. By the shape of the screw, pressure reduction of the resin is facilitated in the pressure reduction zone 73 and any surplus physical foaming agent is discharged from the vent 703. The sintered body 720 provided for the vent 703 functions as a filter, selectively discharges only the pressurized carbon dioxide, and prevents the vent up of the molten resin. Further, in this Example, by setting the back pressure valve 722 provided on the downstream of the vent 703 to have a predetermined pressure, the discharge amount of pressurized carbon dioxide from the vent 703 is controlled. Accordingly, any surplus physical foaming agent is discharged and the pressure of the pressure reduction zone 73 can be controlled to be constant. By retaining the pressure of the pressure reduction zone to be constant, it is possible to stably control the amount of pressurized carbon dioxide introduced into the plasticizing cylinder 710 for each shot. Further, it is possible to prevent the vent up caused when carbon dioxide is discharged, unnecessary foam in the resin molded product, and the like.

<Molding Method>

A foam molded product was molded by a method described below using the injection molding apparatus 3000 shown in FIG. 11 as described above. At first, the air operate valve for suction 604 was opened, and liquid carbon dioxide was sucked from the liquid carbon dioxide bomb 601. Subsequently, liquid carbon dioxide was pressurized to arrive at a predetermined pressure in accordance with the pressure control of the syringe pump 602 for carbon dioxide. In this Example, the head of the syringe pump 602 for carbon dioxide and the intermediate passage were cooled to 10 degrees Celsius, and pressurized carbon dioxide having a pressure of 13 MPa and a temperature of 10 degrees Celsius was prepared.

Further, the air operate valve for suction 614, which was disposed on the side of the syringe pump 612 for the solution, was opened to suck the solution C containing the metallic fine particles dissolved in the solvent from the solution tank 611 via a filter 613 at ordinary temperature, and the solution C was pressurized to arrive at a predetermined pressure in accordance with the pressure control of the syringe pump 612 for the solution. In this Example, perfluoropentylamine which was a fluorine-based organic solvent was used as the solvent of the solution C, and the solution C was pressurized to 10 MPa.

Subsequently, the air operate valves for supply 605, 615 were opened, and then the syringe pump 602 for carbon dioxide and the syringe pump 612 for the solution were switched from the pressure control to the flow rate control. Pressurized carbon dioxide and the pressurized solution C were allowed to flow to provide a predetermined flow rate ratio. Accordingly, pressurized carbon dioxide and the solution C were mixed in the piping, and the interior of the system, which ranged to the introducing valve 712 for introducing the mixture pressurized fluid into the plasticizing cylinder 710, was pressurized. In this Example, the concentration of the metallic fine particles in the mixture pressurized fluid was controlled to be about 10 to 20% of the saturated solubility.

The physical foaming agent supply apparatus 600 of this Example is a simple system and is capable of controlling the flow rate of pressurized carbon dioxide with high accuracy. In this Example, a certain amount of metal complex is required to be supplied for each shot, and thus high-accuracy control of the flow rate is required. Thus, the physical foaming agent supply apparatus 600 is useful in this Example. On the other hand, in a case that foam molding is performed by using only the physical foaming agent without the metal complex (for example, Example 8 as will be described later on), since any surplus physical foaming agent which is insoluble in the resin is discharged from the resin before injection, it is not indispensable to control the amounts of introduction and liquid feeding of the physical foaming agent.

Meanwhile, a resin pellet was supplied from the resin supplying hopper 711 to the plasticizing cylinder 710. The plasticizing zone 71 was heated by the band heater (not shown) provided on the outer wall surface of the plasticizing zone 71 and the screw 70 was rotated frontwardly, thereby plasticizing and melting the resin. In this Example, the plasticizing cylinder 710 was temperature-regulated by the unillustrated band heater. The preset temperature of the plasticizing zone 71 was in a range of 240 to 260 degrees Celsius; the preset temperature of the high pressure kneading zone 72 was 260 degrees Celsius; the preset temperature of the pressure reduction zone 73 was in a range of 220 to 230 degrees Celsius; and the preset temperature of the zone for again raising pressure 74 was in a range of 260 degrees Celsius.

The molten resin was allowed to flow from the plasticizing zone 71 to the high pressure kneading zone 72 by rotating the screw 70 forwardly. The rotation of the screw 70 was once stopped at a position before arrival at the plasticization and weighing completion position by 20 mm (position on the mold side) in order to disconnect the high pressure kneading zone 72 from the pressure reduction zone 73 and the plasticizing zone 71, and then the screw 70 was reversely rotated (number of revolutions: 50 rpm). Accordingly, the upstream side and downstream side seal rings 40, 60 were moved to the upstream side, and the upstream side and downstream side seal rings 40, 60 were brought in tight contact with the reduced diameter portions 30, 50 of the screw 70, and the high pressure kneading zone 72 was disconnected from the pressure reduction zone 73 and the plasticizing zone 71 (see FIGS. 4 and 5).

As shown in FIG. 11, the introducing valve 712 is provided at the introducing port 702 of the plasticizing cylinder 710 in order to introduce the pressurized fluid. The introducing valve 712 has a fluid supply port 718 which is disposed at the proximal end portion connected to the introducing port 702 of the plasticizing cylinder 710, and the introducing valve 712 has an introducing piston 717 which is disposed therein. Therefore, when the fluid supply port 718 is opened by the introducing piston 717, the mixture pressurized fluid is thereby introduced from the physical foaming agent supply apparatus 600 into the plasticizing cylinder 710 at an arbitrary timing. In this Example, the mixture pressurized fluid was introduced by opening the fluid supply port 718 in conformity with the driving of the syringe pumps 602, 612 after sealing the high pressure kneading zone 72 by means of the upstream side and downstream side seal mechanisms S1, S2. In this Example, the mixture pressurized fluid, which had a pressure of 10 MPa and a temperature of 10 degrees Celsius, was introduced by 3 wt % for 1 shot (weight: 75 g) of injection molding. Accordingly, the solution C of the metallic fine particles was introduced by 0.3 wt % with respect to the resin for 1 shot in the injection molding, so that the metal complex was dispersed in a set amount of 100 ppm.

The pressure in the plasticizing cylinder 710, which was monitored by a pressure sensor 75 provided just under the concerning introducing valve 712, was 4 MPa before the introduction of the mixture pressurized fluid. The pressure was raised to 8 MPa at the maximum after the introduction of the mixture pressurized fluid.

After introducing the high-pressure mixture fluid, the reverse rotation of the screw 70 was continued for 2 seconds, thereby dispersing the metal complex contained in the high-pressure mixture fluid in the molten resin at a high temperature. It is inferred that, in the above situation, the metal complex, which is contained in the high-pressure mixture fluid in a minute amount, is subjected to heat reduction and is metalized, thereby being made to be nano particles in the resin.

Meanwhile, the back pressure valve 722 was set to have a predetermined pressure and the discharge amount of carbon dioxide gas was restricted, and thereby controlling the pressure of the pressure reduction zone 73 to have a constant pressure. Although the preset pressure of the pressure reduction zone 73 is arbitrary, the metallic fine particles are discharged from the vent 703 together with pressurized carbon dioxide, when the metallic fine particles are in a state of being dissolved in pressurized carbon dioxide. Therefore, the preset pressure of the pressure reduction zone 73 is preferably a pressure of not more than the solubility of the metallic fine particles. In a case that the preset pressure of the pressure reduction zone 73 is too low, pressure change caused when the mixture pressurized fluid is introduced gets larger and fluctuation between shots gets larger. In a case that the metallic fine particles are not modified in the pressure reduction zone 73, in consideration of the above, a proper pressure of the pressure reduction zone 73 is preferably 0.5 to 6 MPa, and more preferably 1 to 4 MPa. In this Example, the back pressure valve 722 was set to 4 MPa and the pressure of the pressure reduction zone 73 was always controlled to 4 MPa.

The mixture pressurized fluid, which was introduced into the high pressure kneading zone 72, was dispersed in a high pressure state in the molten resin in the high pressure kneading zone 72. After that, the screw 70 was rotated frontwardly (in the direction of rotation of the screw to perform the plasticization), or the number of revolutions of the reverse rotation of the screw 70 was reduced, so that the high pressure kneading zone 72 and the pressure reduction zone 73 were communicated with each other. In this Example, the high pressure kneading zone 72 and the pressure reduction zone 73 were communicated with each other as follows (see FIGS. 4 and 5). That is, the number of revolutions of the reverse rotation of the screw 70 was lowered (number of revolutions: 30 rpm), and the upstream side and downstream side seal rings 40, 60 were returned to the original downstream side positions, so that the upstream side and downstream side seal rings 40, 60 were separated from the reduced diameter portions 30, 50 of the screw 70 to form the gaps G. As described above, by lowering the number of revolutions of the reverse rotation of the screw 70, the pressure of the high pressure kneading zone 72 was gradually reduced. Then, the screw 70 was returned to perform the forward rotation, and the molten resin was allowed to flow to the pressure reduction zone 73.

As for the molten resin and the mixture pressurized fluid allowed to flow to the pressure reduction zone 73, the pressure was lowered to 4 MPa as the preset pressure of the pressure reduction zone. Accordingly, any surplus physical foaming agent was gasified and separated from the molten resin, and then surplus physical foaming agent was discharged from the vent 703 of the plasticizing cylinder 710. It is noted that 4 MPa is not more than the critical pressure of pressurized carbon dioxide as the physical foaming agent.

According to analysis of gas component discharged from the vent 703, no metal complex was detected. From this result, it was confirmed that no metal complex was discharged from the vent 703. The main reason thereof is considered as follows. That is, by performing the pressure reduction in the pressure reduction zone 73, solubility of the metal complex with respect to the physical foaming agent was remarkably reduced, and the metal complex was reduced to be insoluble in the physical foaming agent.

In the foam injection molding using the physical foaming agent of pressurized fluid, the higher the concentration at which the foaming agent is dissolved in the resin, the more likely the concentration of the foaming agent arrives at the supersaturation in the mold after charging of the resin, and thereby making it possible to increase the core density at the time of generation of the foamed cells. Therefore, higher concentration of the foaming agent dissolved in the resin is more preferable for miniaturization of the foamed cells and/or improvement of density. In the method of this Example, since any surplus physical foaming agent is subjected to the phase separation in the pressure reduction zone 73 and discharged, the physical foaming agent can be introduced and dissolved in the plasticizing cylinder excessively. Further, since the pressure of the resin in which the physical foaming agent is dissolved is reduced, the physical foaming agent can be dissolved in the resin at the concentration close to the saturated solubility. Therefore, in the method of this Example, it is possible to obtain an excellent physical foaming molded product at a relatively low pressure.

Subsequently, the screw 70 was rotated forwardly, and the molten resin was fed to the zone for again raising pressure 74 and the nozzle unit 750 of the plasticizing cylinder 710 to start the plasticizing and weighing of the molten resin.

Meanwhile, in the nozzle unit 750, the physical foaming agent was discharged in a procedure described below in parallel with the plasticizing and weighing. The discharge of the physical foaming agent was performed in a state that the shutoff valve 36 of the nozzle unit 750 was closed. At first, an unillustrated temperature-regulated machine circulated water at 30 degrees Celsius through the temperature adjustment channel 2 positioned at the inside of the piston 4 at jetting pressure of 4 kg/cm$^2$, cooled the piston 4 and the resin holding section 10 rapidly, and performed water conduction until a sensed temperature of the temperature sensor 8 lowered from 260 degrees Celsius to 180 degrees Celsius. Accordingly, the resin 9 contacting with the surface of the resin holding section 10 was solidified in the resin channel 6. In a case that a plurality of shots are performed continuously during the injection molding, the cooling of the resin in the nozzle unit 750 is started immediately after the resin provided one shot before has been charged in the mold 955 and pressure keeping has been completed.

Subsequently, the piston 4 was driven to move the resin holding section 10 backward in a state that the resin channel 6 was disconnected from the exterior of the nozzle unit 750 shown in FIG. 13A, and thereby the resin channel 6 was communicated with the exterior of the nozzle unit 750 via the discharge channel 5 as shown in FIG. 13B. Accordingly, a gap D was provided between the resin holding section 10 and the solidified resin 9. In this Example, the gap D was made to have the size of 2 mm. By communicating the resin channel 6 with the exterior of the nozzle unit 750 as shown in FIG. 13B, the pressure in the resin channel 6 was lowered and the physical foaming agent in the resin was gasified and discharged. In this Example, about 30 seconds were required until the concentration of carbon dioxide at the flow front of the resin staying in the nozzle unit 750 was lowered.

Then, the piston 4 was driven to move the resin holding section 10 in a direction of the resin channel 6, thereby disconnecting the resin channel 6 from the exterior of the nozzle unit 750. The resin holding section 10 was brought into contact with the solidified resin and the gap D disappeared as shown in FIG. 13A. Immediately thereafter, the electrical current was allowed to pass through the copper pipe 1 provided to coil around the piston 4 by an AC source and the piston 4 and the resin holding section 10 were heated rapidly by high-frequency induction heating. The frequency of the AC source used was 200 kHz and output thereof was 100 kW. The sensed temperature of the resin temperature sensor 8 reached 260 degrees Celsius in about 10 seconds and the resin positioned in the resin channel 6 got into a molten state.

Then, the shutoff valve 36 was opened to inject and charge the resin into the mold 955. After applying the pressure keeping, the foamed cells were formed at the inside of the molded product by a core-back molding method in which the mold cavity was opened by a thickness of 2 to 3 mm, thereby obtaining the foam molded product.

The surface of the foam molded product in this Example was bright and no swirl mark was confirmed. A reduction ratio of specific gravity when compared to a non-foam molded product prepared by the same material was 25%. Subsequently, the foamed cells of the cross-section of the foam molded product were observed by the SEM. The average cell diameter of the foamed cells was about 30 μm and no foam breakage was confirmed. Any great difference was not confirmed in the cell diameters of the foamed cells positioned in the vicinity of the gate of the mold and positioned at the end of the flow. From the above results, it was found out that it was possible to mold a molded product having a smooth surface and minute and uniform foamed cells at the inside thereof by the method in this Example.

<Electroless Plating Process>

Subsequently, the foam molded product in this Example was subjected to a plating process. The foam molded product was immersed in 2.5N hydrochloric acid solution for 5 minutes, followed by immersed in 1,3-butanediol aqueous solution (concentration 70 vol %) at 80 degrees Celsius for 5 minutes, and thereafter immersed in an electroless plating solution (produced by OKUNO CHEMICAL INDUSTRIES CO., LTD, Top Nicoron RCH) at 80 degrees Celsius to form an electroless nickel-phosphorus film on the entire surface of the foam molded product in 5 minutes. Thereafter, 20 μm of bright electroplating film, 20 μm of electroplating nickel film, and 0.3 μm of electroplating chromium film were formed in this order on the electroless nickel-phosphorus film to prepare a decorative plating part (decorative plating element or component). The surface of the obtained decorative plating part was bright and a texture (quality or feel of material) equivalent to that of any commercially available bright plating part was obtained.

Meanwhile, the foam molded product of this Example was cut in half and was subjected to the electroless plating similarly. As a result, growth of the plating in the cutting surface was not confirmed. From this result, it was found out that metallic palladium functioning as the catalyst cores of the plating was segregated in the vicinity of the surface of the foam molded product and that a small amount of metallic palladium was included in the inside of the foam molded product. According to investigation by the inventors of the present invention, it has been found out that the palladium metal becomes ultrafine particles of nano to sabnano in the molding technique of this Example using pressurized carbon dioxide. Therefore, it is inferred that the bleed out of low-molecular fine particles (palladium metal) on the surface occurs at the time of the injection and charging, and the low-molecular fine particles are unevenly distributed on the surface of the foam molded product.

Further, the inventors of the present invention have found out that, since foaming gas moves to the surface of the molded product in the foam injection molding using the physical foaming agent, the concentration of palladium on the surface of the molded product is increased and the plating reactivity is enhanced. Therefore, in the molding method of this Example, pressurized carbon dioxide functions as the foaming agent forming the foamed cells at the inside of the molded product, a solvent in which the metallic fine particles are dispersed, and a gas for pushing up the metallic fine particles on the surface of the molded product.

<Evaluation of Decorative Plating Part>

As described above, the surface of the decorative plating part prepared in this Example was bright, and the texture equivalent to that of any commercially available bright plating part was obtained. Further, the specific gravity of the decorative plating part was 0.8 g/cm$^3$, which was lightweight. The specific gravity of a plating part using a conventional ABS resin is approximately 1.1 to 1.2 g/cm$^3$. Thus, it was found out that the weight of the decorative plating part in this Example was reduced by about 30% when compared to the conventional plating part.

Subsequently, the decorative plating part of this Example was subjected to a heat shock test. In the heat shock test, a cycle test in which the decorative plating part was exposed to the environments at −35 degrees Celsius and 120 degrees Celsius alternately was repeated for 50 cycles. As a result, it was found out that the film blister, exfoliation, and the like were not caused in the plating film of the decorative plating part of this Example. From this result, it was found out that the decorative part of this Example was lightweight and had high level of design, heat resistance, and reliability.

Example 8

In this Example, pressurized nitrogen was used as the physical foaming agent and the physical foaming agent was supplied to the plasticizing cylinder 710 from a nitrogen bomb instead of the physical foaming agent supply apparatus 600 provided with the syringe pump. That is, in this Example, the physical foaming agent was supplied to the plasticizing cylinder 710 without measuring the introduction amount of the physical foaming agent. Further, in this Example, only the physical foaming agent was introduced into the resin and the metallic fine particles were not dissolved in the physical foaming agent. Other than those, the foam injection molding was performed by the same method as Example 7 using an injection molding apparatus similar to that of Example 7.

At first, similar to Example 7, the thermoplastic resin was plasticized and melted by the screw 70 and the molten resin was allowed to follow to the high pressure kneading zone 72. Subsequently, similar to Example 7, the screw 70 was reversely rotated and the high pressure kneading zone 72 was disconnected from the pressure reduction zone 73 and the plasticizing zone 71 by the upstream side and downstream side seal mechanisms S1, S2. After the screw 70 was stopped, the physical foaming agent was supplied to the high pressure kneading zone 72. Nitrogen as the physical foaming agent was supplied from a nitrogen bomb (not shown) in which the pressure at the time of the fill-up was 14 MPa. The pressure of the physical foaming agent was reduced to 10 MPa as the preset pressure of a pressure-reducing valve by the pressure-reducing valve (not shown) provided between the nitrogen bomb and the plasticizing cylinder 710, and then the physical foaming agent was introduced from the introducing valve 712 to the plasticizing cylinder 710. A period of time during which the introducing valve 712 was opened was allowed to be long (about 5 seconds), thereby introducing a large quantity of nitrogen gas into the plasticizing cylinder 710. At that time, the pressure in the high pressure kneading zone 72 rose from 4 MPa to 9 to 10 MPa. The introduction amount of the physical foaming agent was not weighed.

Next, similar to Example 7, the high pressure kneading zone 72 was communicated with the pressure reduction zone 73 by the downstream side seal mechanism S2, and the molten resin into which the physical foaming agent was introduced was allowed to flow to the pressure reduction zone 73 on the downstream.

The molten resin and the physical foaming agent which flowed to the pressure reduction zone 73 were subject to the pressure reduction, and any surplus physical foaming agent was discharged from the vent 703, similar to Example 7. Further, similar to Example 7, the molten resin was fed to the zone for again raising pressure 74 on the downstream and was plasticized and weighed. Then, the physical foaming agent was discharged from the physical foaming agent discharge mechanism 3 of the nozzle unit 750, in parallel with the weighing of the molten resin, in a similar method as Example 7. Thereafter, the resin was injected and charged in the mold 955, the foaming was caused by the core-back molding method, and a foam molded product was obtained in a similar method as Example 7.

The surface of the foam molded product obtained in this Example was bright and no swirl mark was confirmed. A reduction ratio of specific gravity when compared to a non-foam molded product prepared by the same material was 28%. Subsequently, the foamed cells of the cross-section of the foam molded product were observed by the SEM. The average cell diameter of the foamed cells was about 25 μm and no foam breakage was confirmed. Any great difference was not confirmed in the cell diameters of the foamed cells positioned in the vicinity of the gate of the mold and positioned at the end of the flow. From the above results, it was found out that it was possible to mold a foam molded product having a smooth surface and minute and uniform foamed cells at the inside thereof by the method in this Example.

Further, in this Example, the nitrogen gas in the nitrogen bomb as the physical foaming agent was introduced into the plasticizing cylinder 710 without being pressurized and without performing any strict flow rate control. In this Example, any surplus physical foaming agent was discharged in the pressure reduction zone 73. Therefore, it is unnecessary to strictly control the introduction amount of physical foaming agent at the stage of introduction of the physical foaming agent into the plasticizing cylinder 710. Further, it is also unnecessary to provide the introduction pressure at a high pressure. Therefore, it is unnecessary for the injection molding apparatus to have the flow rate control apparatus and the pressurizing apparatus, and thereby making it possible to realize the low cost.

In Examples 7 and 8 described above, the physical foaming agent was discharged not only from the nozzle unit 750 but also from the vent 703 of the plasticizing cylinder 710. The present teaching, however, is not limited thereto, and the physical foaming agent may be discharged only from the nozzle unit 750 of the injection molding apparatus 3000. In this case, the vent 703 of the plasticizing cylinder 710 is unnecessary, thereby making it possible to simplify the construction of the apparatus.

Example 9

In this Example, foam molding was performed by replacing the forward end portion of the plasticizing cylinder of a general-purpose physical foaming injection molding apparatus with the nozzle unit of the present teaching. In this Example, pressurized nitrogen was used as the physical foaming agent and polycarbonate containing glass fiber by 30% was used as the resin.

<Nozzle Unit>

An explanation will be made about the nozzle unit used in this Example. As shown in FIG. 14, the nozzle unit 760 used in this Example was positioned between the mold (not shown) and the plasticizing cylinder (not shown) of a general-purpose physical foaming injection molding apparatus (produced by The Japan Steel Works, LTD., J40ELIII-DK-MuCell), and the resin channel 6 ranging from the plasticizing cylinder to the mold was formed therein. The nozzle unit 760 includes the temperature control mechanism 7 performing temperature control of the resin in the resin channel 6 and the physical foaming agent discharge mechanism 745 discharging the physical foaming agent from the resin in the resin channel. The resin channel 6 of the nozzle unit 760 has a cylindrical shape, and the circular cross-section of the resin channel 6 was φ 4 mm.

The physical foaming agent discharge mechanism 745 includes a function for controlling the flow rate and the pressure of the physical foaming agent to be discharged. The physical foaming agent discharge mechanism 745 includes the resin holding section 10 forming a part of the wall surface of the resin channel 6, the piston 4 connected to the resin holding section 10 and moving the resin holding section 10 backward to widen the resin channel 6, and the discharge channel 5 configured to communicate with the resin channel 6 by moving the piston 4 backward. On the downstream of the discharge channel 5, the back pressure valve 743, the pressure-reducing valve 742, and the flow rate control device 741 are provided. Further, pressure gauges 739 and 740 for displaying the pressure controlled by the back pressure valve 743 and the pressure-reducing valve 742 are provided.

The temperature control mechanism 7 of this Example is constructed of the temperature adjustment channel 2 circulating water and provided in the nozzle unit 760; and the copper pipe 1 provided to coil around the channel 6. The temperature adjustment channel 2 is a cooling mechanism for cooling the resin, and the copper pipe 1 is an electromagnetic induction heating mechanism in which the resin is heated by the electromagnetic induction heating.

<Molding Method>

At first, the resin was plasticized and melted in the plasticizing cylinder and the physical foaming agent was introduced into the resin by a general method using a general-purpose physical foaming injection molding apparatus. Thereafter, the resin was fed to the frontward portion of the screw and the nozzle unit 760, and weighing of the resin was started. The introduction pressure of the physical foaming agent was 20 MPa and the introduction amount of the physical foaming agent was 0.1 wt % with respect to the resin amount for 1 shot. The resin internal pressure at the time of the weighing was 18 MPa and controlled by back pressure.

Similar to Example 7, the discharge of the physical foaming agent was started in a procedure described below in parallel with the plasticizing and weighing. At first, an unillustrated temperature-regulated machine circulated water at 30 degrees Celsius through the temperature adjustment channel 2 at jetting pressure of 4 kg/cm$^2$, cooled the piston 4 and the resin holding section 10 rapidly, and performed water conduction until a resin temperature lowered from 300 degrees Celsius to 220 degrees Celsius. Accordingly, the resin contacting with the surface of the resin holding section 10 was solidified in the resin channel 6. In a case that a plurality of shots are performed continuously during the injection molding, the cooling of the resin in the nozzle unit 760 is started immediately after the resin provided one shot before has been charged in the mold and pressure keeping has been completed.

Subsequently, the piston 4 was driven to move the resin holding section 10 backward, so that the resin channel 6 was communicated with the discharge channel 5. Accordingly, 3 mm gap was provided between the resin holding section 10 and the solidified resin. At first, the pressure of nitrogen discharged via the discharge channel 5 was controlled to 3 MPa by the back pressure valve 743, and then controlled to 0.5 MPa by the pressure-reducing valve 742. Thereafter, nitrogen was discharged while controlling the flow rate thereof by the flow rate control device 741 disposed on the further downstream. In this Example, about 40 seconds were required until the concentration of nitrogen at the flow front of the molten resin staying in the nozzle unit 760 was lowered.

According to the method for discharging the high pressure physical foaming agent in this Example, the high pressure physical foaming agent is discharged while controlling the pressure and the flow rate, and thus there is an advantage such that the amount of discharge of the physical foaming agent from the forward end of the nozzle unit is less likely to change. Although the physical foaming agent at the flow front portion was discharged by the physical foaming agent discharge mechanism 745 to decrease the concentration of the physical foaming agent at the flow front portion in this Example, the physical foaming agent dissolved in the flow front portion was not completely discharged.

Immediately after discharging the physical foaming agent, the piston 4 was driven to move the resin holding section 10, thereby shutting off the communication between the resin channel 6 and the discharge channel 5. Then, the high frequency of the electrical current was allowed to pass through the copper pipe 1 embedded in the nozzle unit 760, and the resin in the resin channel 6 was remelted by the high-frequency induction heating similar to Example 7. In this Example, the resin temperature rose to 300 degrees Celsius in about 10 seconds.

Then, the shutoff valve 36 was opened to inject and charge the resin into the mold (not shown). After applying the pressure keeping, the foamed cells were formed at the inside of the molded product by a core-back molding method in which the mold cavity was opened by a thickness of 1.5 to 3 mm to obtain a foam molded product.

The surface of the foam molded product in this Example was bright and no swirl mark was confirmed. A reduction ratio of specific gravity when compared to a non-foam molded product prepared by the same material was 25%. Subsequently, the foamed cells of the cross-section of the foam molded product were observed by the SEM. The average cell diameter of the foamed cells was about 20 μm and no foam breakage was confirmed. Any great difference was not confirmed in the cell diameters of the foamed cells at positioned in the vicinity of the gate of the mold and positioned at the end of the flow. From the above results, it was found out that it was possible to mold a molded product having a smooth surface and minute and uniform foamed cells at the inside thereof by the method in this Example.

Further, it was found out that the surface property of the foam molded product was excellent even when the physical foaming agent was not completely discharged from the flow front portion of the resin. The reason thereof is considered as follows. That is, by decreasing the concentration of the physical foaming agent at the flow front portion, the amount of gas existing at the gap between the mold and the surface of the molded product is decreased, and thereby making it possible to remelt the gas in the resin under the molding in the mold.

Although the foam molded product was molded by using a general-purpose thermoplastic resin pellet in Examples 7 to 9 described above, the foam molded product can be molded by using the resin pellet of the block copolymer containing the functional material, the resin pellet in which the metallic fine particles are dispersed in the thermoplastic resin, explained in the first to third embodiments of the present teaching.

Comparative Example 3

In this Comparative Example, foam injection molding was performed by the same method as Example 8 using an injection molding apparatus similar to that of Example 8, except that the injection molding apparatus did not include the nozzle unit 750. That is, the injection molding apparatus used in this Comparative Example is provided with the shutoff valve at the forward end of the plasticizing cylinder 710 and the mold 955 is provided in a close contact with the forward end of the plasticizing cylinder 710.

For the foam molded product molded in this Comparative Example, swirl mark was confirmed on the surface thereof. The surface roughness was deteriorated remarkably as compared with the foam molded products obtained in Examples 7 to 9. The average cell diameter of the foamed cells at the inside of the molded product was about 18 to 20 μm, and a reduction ratio of specific gravity when compared to a non-foam molded product prepared by the same material was 28%. From this Comparative Example, it was confirmed that no discharge of the physical foaming agent from the flow front portion provided slightly advantageous results for miniaturization of the cell diameters of the foamed cells and improvement of the expansion ratio of the foaming, but deterioration of the surface property was unavoidable.

By using the resin pellet of the block copolymer including the functional material or the resin pellet in which the metallic fine particles are dispersed in the thermoplastic resin of the present teaching, it is possible to produce the molded product in which the plating film can be formed without any chemical agent having heavy environmental burden by using the molding machine such as a general-purpose injection molding machine or extrusion molding machine. Therefore, it is possible to provide the environmentally-friendly production method without any investment for facilities such as introduction of a new molding machine.

In a case that the foam molded product is produced using the molding machine provided with the nozzle unit of the present teaching, the foam molded product has the smooth surface and it is possible to suppress the occurrence of the poor appearance such as the swirl mark. By solving the problem of the poor appearance, the foam molded product can be easily applied to the decorative plating and the like, and added-value thereof can be increased.

What is claimed is:

1. A method for producing a molded product, the method comprising:
   mixing a block copolymer having a hydrophilic segment with a functional material;
   mixing the block copolymer, which has been mixed with the functional material, with a thermoplastic resin;
   molding the thermoplastic resin in which the functional material and the block copolymer are mixed; and
   contacting a surface of the molded product with a solution, thereby dissolving and removing a part of the block copolymer included in the molded product.

2. The method for producing the molded product according to claim 1, wherein the mixing of the functional material with the block copolymer is performed by making pressurized carbon dioxide in which the functional material is dissolved or dispersed come into contact with the block copolymer.

3. The method for producing the molded product according to claim 1, wherein the mixing of the functional material with the block copolymer includes:
   plasticizing and melting the block copolymer;
   mixing pressurized carbon dioxide in which the functional material is dissolved with the block copolymer plasticized and melted;
   molding the block copolymer mixed with the functional material by extrusion molding; and
   crushing the molded block copolymer mixed with the functional material to obtain a pellet.

4. The method for producing the molded product according to claim 1, wherein the hydrophilic segment of the block copolymer is polyether.

5. The method for producing the molded product according to claim 4, wherein the hydrophilic segment of the block copolymer is polyethylene oxide.

6. The method for producing the molded product according to claim 1, wherein the thermoplastic resin has an amide group.

7. The method for producing the molded product according to claim 6, wherein the thermoplastic resin having the amide group is Nylon 6 or Nylon 6.6.

8. The method for producing the molded product according to claim 1, wherein the molding of the thermoplastic resin is molding by injection molding or extrusion molding.

9. The method for producing the molded product according to claim 1, wherein the molding of the thermoplastic resin includes:
   plasticizing and melting the thermoplastic resin;
   mixing a physical foaming agent including at least one of pressurized carbon dioxide and pressurized nitrogen with the thermoplastic resin plasticized and melted; and
   foaming the thermoplastic resin including the physical foaming agent to mold a foam molded product.

10. The method for producing the molded product according to claim 1, wherein the functional material is metallic fine particles.

11. The method for producing the molded product according to claim 10, wherein the metallic fine particles contain palladium.

12. The method for producing the molded product according to claim 10, wherein the metallic fine particles contain silver.

* * * * *